US012763259B2

(12) United States Patent
Morita et al.

(10) Patent No.: US 12,763,259 B2
(45) Date of Patent: Oct. 13, 2026

(54) ELECTRONIC COMPONENT

(71) Applicant: TDK Corporation, Tokyo (JP)

(72) Inventors: Ken Morita, Tokyo (JP); Yasuhiro Okui, Tokyo (JP); Yuichi Nagai, Tokyo (JP); Kazuyuki Hasebe, Tokyo (JP); Shinya Onodera, Tokyo (JP)

(73) Assignee: TDK CORPORATION, Tokyo (JP)

( * ) Notice: Subject to any disclaimer, the term of this patent is extended or adjusted under 35 U.S.C. 154(b) by 131 days.

(21) Appl. No.: 18/775,472

(22) Filed: Jul. 17, 2024

(65) Prior Publication Data

US 2025/0095921 A1 Mar. 20, 2025

(30) Foreign Application Priority Data

Sep. 20, 2023 (JP) ................................ 2023-152026

(51) Int. Cl.
*H01G 4/248* (2006.01)
*H01G 4/012* (2006.01)
*H01G 4/30* (2006.01)

(52) U.S. Cl.
CPC ............. *H01G 4/248* (2013.01); *H01G 4/012* (2013.01); *H01G 4/30* (2013.01)

(58) Field of Classification Search
CPC .......... H01G 4/30; H01G 4/012; H01G 4/248; H01G 4/228; H01G 4/005; H01G 4/232; H01G 4/008
USPC ............. 361/301.4, 303, 321.1, 306.3, 321.3
See application file for complete search history.

(56) References Cited

U.S. PATENT DOCUMENTS 11,705,279 B2 * 7/2023 Kim ....................... H01G 4/012 361/301.4
2010/0039749 A1 * 2/2010 Ritter ..................... H01G 4/005 29/25.42
2015/0114700 A1 * 4/2015 Park ....................... H01G 4/012 361/301.4
2018/0090273 A1 * 3/2018 Hwang ................ H01G 4/2325
2020/0243265 A1 * 7/2020 Berolini ................... H01G 4/12
2020/0312551 A1 * 10/2020 Nagai ...................... H01G 4/30
2021/0125783 A1 * 4/2021 Onodera ................ H01G 4/012
2022/0084752 A1 * 3/2022 Kato ...................... H01G 4/008

FOREIGN PATENT DOCUMENTS

JP 2018-006501 A 1/2018

* cited by examiner

*Primary Examiner* — Arun Ramaswamy
(74) *Attorney, Agent, or Firm* — Oliff PLC

(57) ABSTRACT

An element body includes a main surface and a pair of end surfaces. Each external electrode includes a conductive resin layer on the main surface. Each auxiliary internal electrode is disposed in the same layer as a corresponding internal electrode of a plurality of internal electrodes and is electrically connected to the external electrode to which the corresponding internal electrode is not electrically connected. Each auxiliary internal electrode includes first and second electrode portions. The first electrode portion is exposed to a corresponding end surface of the pair of end surfaces and is electrically and physically connected to the external electrode to which the corresponding internal electrode is not electrically connected. The second electrode portion is positioned between the conductive resin layer of the external electrode to which the corresponding internal electrode is not electrically connected and the corresponding internal electrode.

19 Claims, 28 Drawing Sheets

ELECTRONIC COMPONENT

CROSS-REFERENCE TO RELATED APPLICATIONS

This application is based upon and claims the benefit of priority from Japanese Patent Application No. 2023-152026, filed on Sep. 20, 2023, the entire contents of which are incorporated herein by reference.

BACKGROUND

Field

The present disclosure relates to an electronic component.

Description of the Related Art

Known electronic components include an element body of a rectangular parallelepiped shape, a plurality of external electrodes, and a plurality of internal electrodes (see, for example, Japanese Unexamined Patent Publication No. 2018-6501). The element body includes a first main surface arranged to constitute a mounting surface, a second main surface opposing the first main surface in a first direction, a pair of end surfaces opposing each other in a second direction, and a pair of side surfaces opposing each other in a third direction. The plurality of external electrodes are disposed on both ends of the element body in the second direction. The plurality of internal electrodes are disposed in the element body to be distributed in the third direction and are each electrically connected to a corresponding external electrode of the plurality of external electrodes. The external electrode includes a conductive resin layer.

SUMMARY

The conductive resin layer includes, for example, a plurality of metal particles and a resin. In a configuration in which the external electrode includes the conductive resin layer, migration may occur in the external electrode. The migration is considered to occur due to the following events, for example.

Electric field or heat acts on the conductive resin layer, and the metal particle is ionized. Generated metal ion is attracted by electric field between the external electrodes and migrates from the conductive resin layer. The electric field acting on the metal particle includes, for example, electric field between the external electrode and the internal electrode in the element body. The metal ion migrating from the conductive resin layer react with, for example, an electron supplied from the internal electrode or the external electrode, and is deposited as metal on a surface of the element body.

One aspect of the present disclosure provides an electronic component reducing occurrence of migration even in a configuration in which an external electrode includes a conductive resin layer.

An electronic component according to one aspect of the present disclosure includes an element body of a rectangular parallelepiped shape, a plurality of external electrodes, a plurality of internal electrodes, and a plurality of auxiliary internal electrodes. The element body includes a first main surface arranged to constitute a mounting surface, a second main surface opposing the first main surface in a first direction, a pair of end surfaces opposing each other in a second direction, and a pair of side surfaces opposing each other in a third direction. The plurality of external electrodes are disposed on both ends of the element body in the second direction. The plurality of internal electrodes are disposed in the element body to be distributed in the third direction and are each electrically connected to a corresponding external electrode of the plurality of external electrodes. The plurality of auxiliary internal electrodes are each disposed in the same layer as a corresponding internal electrode of the plurality of internal electrodes and are each electrically connected to the external electrode to which the corresponding internal electrode is not electrically connected. Each of the plurality of external electrodes includes a conductive resin layer positioned on the first main surface. Each of the plurality of auxiliary internal electrodes includes a first electrode portion and a second electrode portion. The first electrode portion is exposed to a corresponding end surface of the pair of end surfaces and is electrically and physically connected to the external electrode to which the corresponding internal electrode is not electrically connected. The second electrode portion is positioned between the conductive resin layer included in the external electrode to which the corresponding internal electrode is not electrically connected and the corresponding internal electrode.

In the one aspect described above, the auxiliary internal electrode is electrically connected to the external electrode to which the corresponding internal electrode is not electrically connected. The second electrode portion of the auxiliary internal electrode is positioned between the conductive resin layer on the first main surface included in the external electrode to which the auxiliary internal electrode is electrically connected and the internal electrode in the same layer as the auxiliary internal electrode. The second electrode portion of the auxiliary internal electrode is positioned between the conductive resin layer on the first main surface and the internal electrode that are not electrically connected to each other. Therefore, electric field tends not to be generated between the conductive resin layer on the first main surface and the internal electrode that are not electrically connected to each other. Consequently, the one aspect described above reduces occurrence of migration.

In the one aspect described above, the first electrode portion may be exposed to the corresponding end surface with a width larger than a width of the second electrode portion.

A configuration in which the first electrode portion is exposed to the corresponding end surface with the width larger than a width of the second electrode portion increases a physical connection length between the first electrode portion and the external electrode, as compared with, for example, a configuration in which the first electrode portion is exposed to the corresponding end surface with the same width as the width of the second electrode portion. Therefore, the configuration in which the first electrode portion is exposed to the corresponding end surface with the width larger than the width of the second electrode portion improves connectivity between the external electrode and the auxiliary internal electrode.

In the one aspect described above, each of the plurality of internal electrodes may include: a third electrode portion including a first end exposed to a corresponding end surface of the pair of end surfaces, the third electrode portion having a first width and being separated from the first main surface by a first distance; and a fourth electrode portion including a second end positioned in the element body and opposing the first end in the second direction, the fourth electrode portion having a second width smaller than the first width and being separated from the first main surface by a second distance larger than the first distance. The second electrode portion may be positioned between the conductive resin layer included in the external electrode to which the corresponding internal electrode is not electrically connected and the fourth electrode portion.

A configuration in which the auxiliary internal electrode is disposed in the same layer as the internal electrode tends to decrease an area of the internal electrode. A decrease in the area of the internal electrode may lead to a decrease in capacitance.

A configuration in which the internal electrode includes the third electrode portion and the fourth electrode portion, and the second electrode portion is positioned between the conductive resin layer and the fourth electrode portion that are not electrically connected to each other prevents a decrease in an area of the internal electrode.

In the one aspect described above, each of the plurality of external electrodes may include a conductive resin layer positioned on the second main surface, the third electrode portion may be separated from the second main surface by a third distance, and the fourth electrode portion may be separated from the second main surface by a fourth distance larger than the third distance. Each of the plurality of auxiliary internal electrodes may include an electrode portion positioned between the conductive resin layer on the second main surface included in the external electrode to which the corresponding internal electrode is not electrically connected and the fourth electrode portion.

The above-described electrode portion of the auxiliary internal electrode is positioned between the conductive resin layer on the second main surface and the internal electrode that are not electrically connected to each other. Therefore, electric field tends not to be generated between the conductive resin layer on the second main surface and the internal electrode that are not electrically connected to each other. Consequently, even in a configuration in which the external electrode includes the conductive resin layer on the second main surface, a configuration in which the auxiliary internal electrode includes the above-described electrode portion reduces occurrence of migration.

A configuration in which the internal electrode includes the third electrode portion and the fourth electrode portion, and the above-described electrode portion of the auxiliary internal electrode is positioned between the conductive resin layer on the second main surface and the fourth electrode portion that are not electrically connected to each other prevents a decrease in an area of the internal electrode.

In the one aspect described above, the conductive resin layer may include an end edge positioned on the first main surface, and the second electrode portion may include an end opposing an end included in the first electrode portion and exposed to the corresponding end surface in the second direction. With a plane including the corresponding end surface as a reference plane, the auxiliary internal electrode and the conductive resin layer that are electrically connected to each other may have a relationship in which a length from the reference plane to the end included in the second electrode portion is larger than a length from the reference plane to the end edge included in the conductive resin layer.

In a configuration in which the auxiliary internal electrode and the conductive resin layer that are electrically connected to each other have the above-described relationship, the electric field tends not to be reliably generated between the conductive resin layer on the first main surface and the internal electrode that are not electrically connected to each other. Therefore, this configuration reliably reduces the occurrence of the migration.

In the one aspect described above, when the auxiliary internal electrode and the conductive resin layer that are electrically connected to each other are viewed from a direction orthogonal to the first main surface, the second electrode portion may include a portion exposed from the conductive resin layer.

In a configuration in which the second electrode portion includes the portion exposed from the conductive resin layer when the auxiliary internal electrode and the conductive resin layer that are electrically connected to each other are viewed from the direction orthogonal to the first main surface, the electric field tends not to be reliably generated between the conductive resin layer on the first main surface and the internal electrode that are not electrically connected to each other. Therefore, this configuration reliably reduces the occurrence of the migration.

In the one aspect described above, with a plane including the corresponding end surface to which the auxiliary internal electrode is exposed as a reference plane, the internal electrode and the auxiliary internal electrode that are disposed in the same layer may have a relationship in which a length of the auxiliary internal electrode from the reference plane is larger than a length from the reference plane to the internal electrode.

In a configuration in which the internal electrode and the auxiliary internal electrode that are disposed in the same layer have the above-described relationship, the electric field tends not to be reliably generated between the conductive resin layer on the first main surface and the internal electrode that are not electrically connected to each other. Therefore, this configuration reliably reduces the occurrence of the migration.

In this configuration, the internal electrode and the auxiliary internal electrode that are disposed in the same layer may have a relationship in which the length from the reference plane to the internal electrode is smaller than the length of the auxiliary internal electrode from the reference plane. This configuration can increase a length of the internal electrode in the second direction. Therefore, this configuration can increase capacitance.

In the one aspect described above, the conductive resin layer may include an end edge positioned on the first main surface. With a plane including the end surface to which the internal electrode is exposed as a reference plane, the internal electrode and the conductive resin layer that are not electrically connected to each other may have a relationship in which a length of the internal electrode from the reference plane is larger than a length from the reference plane to the end edge included in the conductive resin layer.

A configuration in which the internal electrode and the conductive resin layer that are not electrically connected to each other have the above-described relationship can increase a length of the internal electrode in the second direction. Therefore, this configuration can increase capacitance.

In the one aspect described above, each of the plurality of external electrodes may include a conductive resin layer positioned on the side surface. The plurality of internal electrodes may include an outermost internal electrode adjacent to the conductive resin layer on the side surface in the third direction and electrically connected to the conductive resin layer on the side surface. The conductive resin layer on the side surface not electrically connected to the outermost internal electrode and the outermost internal electrode may not overlap each other when viewed from a direction orthogonal to the side surface.

In a configuration in which the outermost internal electrode is adjacent to the conductive resin layer on the side surface in the third direction and is electrically connected to the conductive resin layer on the side surface, the outermost internal electrode is positioned between the conductive resin layer on the side surface and the internal electrode adjacent to and not electrically connected to the outermost internal electrode. The outermost internal electrode is positioned between the conductive resin layer on the side surface and the internal electrode that are not electrically connected to each other. Therefore, electric field tends not to be generated between the conductive resin layer on the side surface and the internal electrode that are not electrically connected to each other.

In a configuration in which the conductive resin layer on the side surface not electrically connected to the outermost internal electrode and the outermost internal electrode do not overlap each other when viewed from a direction orthogonal to the side surface, electric field tends not to be generated between the conductive resin layer on the side surface and the outermost internal electrode that are not electrically connected to each other.

Consequently, these configurations reduce occurrence of migration even in a configuration in which the external electrode includes the conductive resin layer on the side surface.

In the one aspect described above, each of the plurality of external electrodes further may include a conductive resin layer positioned on the side surface, and the conductive resin layer on the side surface and the internal electrode that are not electrically connected to each other may not overlap each other when viewed from a direction orthogonal to the side surface.

In a configuration in which the conductive resin layer on the side surface and the internal electrode that are not electrically connected to each other do not overlap each other when viewed from the direction orthogonal to the side surface, electric field tends not to be generated between the conductive resin layer on the side surface and the internal electrode that are not electrically connected to each other. Therefore, this configuration reduces occurrence of migration even in a configuration in which the external electrode includes the conductive resin layer on the side surface.

In the one aspect described above, each of the plurality of external electrodes may include a conductive resin layer positioned on the end surface. When the conductive resin layer positioned on the end surface and the end surface are viewed from a direction orthogonal to the end surface, the end surface may include: a first region covered with the conductive resin layer on the end surface; and a second region exposed from the conductive resin layer on the end surface and closer to the second main surface than the first region.

A configuration in which the end surface includes the first region and the second region when the conductive resin layer positioned on the end surface and the end surface are viewed from the direction orthogonal to the end surface reduces ESR (equivalent series resistance), as compared with a configuration in which the conductive resin layer covers the entire end surface.

In the one aspect described above, the conductive resin layer may include a plurality of silver particles.

DETAILED DESCRIPTION

In the following description, with reference to the drawings, the same reference numbers are assigned to the same components or to similar components having the same function, and overlapping description is omitted.

First Example

Figure 1:
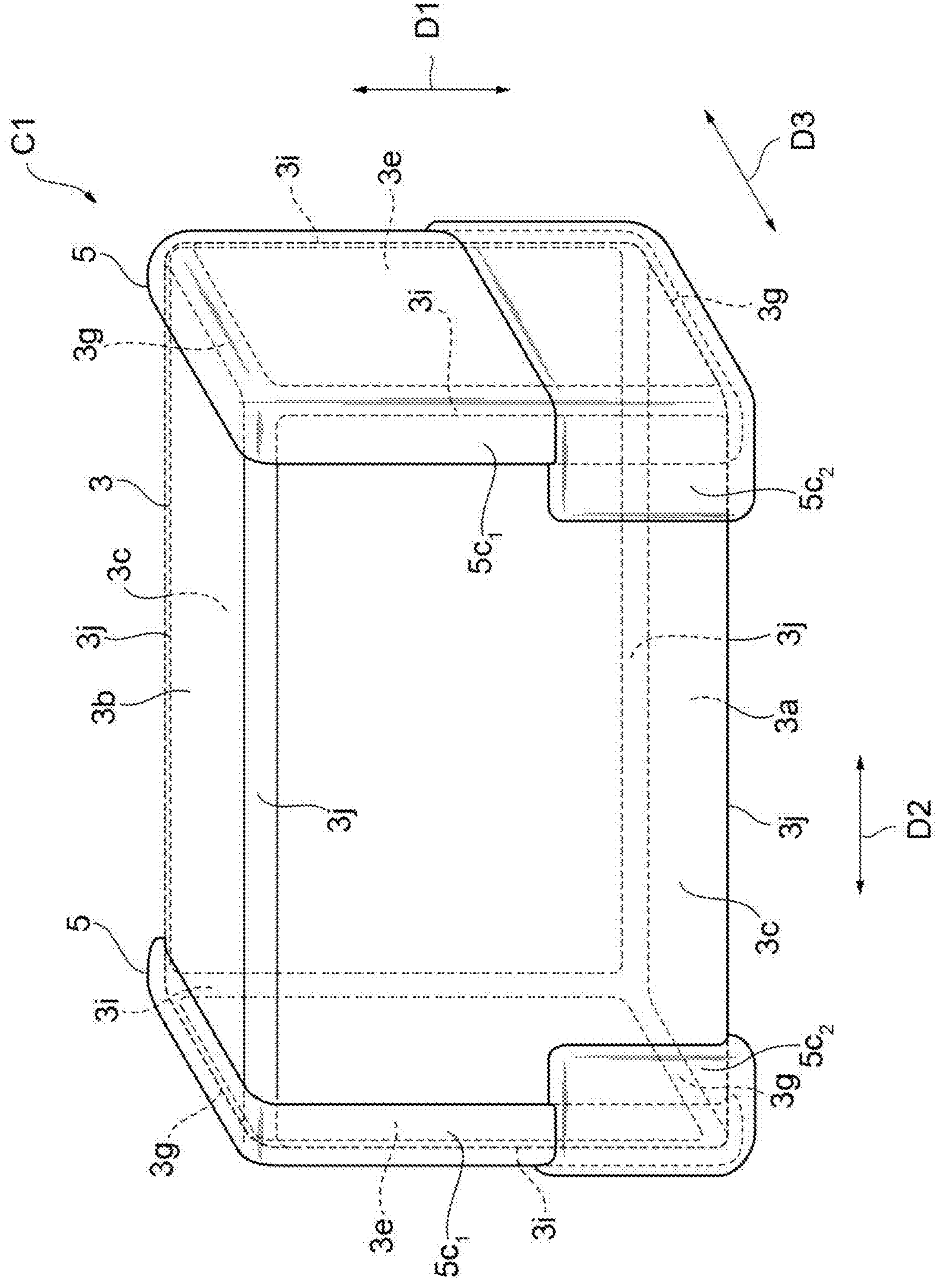
FIG. 1 is a perspective view of a multilayer capacitor according to a first example.

A configuration of a multilayer capacitor C1 according to the first example will be described with reference to FIGS. 1 to 5. FIG. 1 is a perspective view of a multilayer capacitor according to the first example. FIGS. 2, 3, 4, and 5 are views illustrating a cross-sectional configuration of the multilayer capacitor according to the first example.

In the first example, an electronic component includes, for example, the multilayer capacitor C1.

As illustrated in FIG. 1, the multilayer capacitor C1 includes an element body 3 of a rectangular parallelepiped shape, a plurality of external electrodes 5. For example, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, or a rectangular parallelepiped shape in which the corners and ridges are rounded.

The element body 3 includes a pair of main surfaces 3*a* and 3*b* opposing each other, a pair of side surfaces 3*c* opposing each other, and a pair of end surfaces 3*e* opposing each other. The pair of main surfaces 3*a* and 3*b*, the pair of side surfaces 3*c*, and the pair of end surfaces 3*e* each have a substantially rectangular shape. A direction in which the pair of main surfaces 3*a* and 3*b* oppose each other includes a first direction D1. A direction in which the pair of side surfaces 3*c* oppose each other includes a third direction D3. A direction in which the pair of end surfaces 3*e* oppose each other includes a second direction D2.

The multilayer capacitor C1 is solder-mounted on an electronic device, for example. The electronic device includes, for example, a circuit board or an electronic component. In the multilayer capacitor C1, for example, the main surfaces 3*a* opposes the electronic device. The main surface 3*a* is arranged to constitute a mounting surface. The main surface 3*a* includes the mounting surface. For example, when the main surface 3*a* includes the first main surface, the main surface 3*b* includes the second main surface.

The first direction D1 includes a direction orthogonal to the main surfaces 3*a* and 3*b*, and is orthogonal to the third direction D3. The second direction D2 includes a direction parallel to the main surfaces 3*a* and 3*b* and the side surfaces 3*c*, and is orthogonal to the first direction D1 and the third direction D3. The third direction D3 includes a direction orthogonal to the side surfaces 3*c*, and the second direction D2 includes a direction orthogonal to the end surfaces 3*e*.

The pair of side surfaces 3*c* extend in the first direction D1 to couple the pair of main surfaces 3*a* and 3*b*. The pair of side surfaces 3*c* also extend in the second direction D2. The pair of end surfaces 3*e* extend in the first direction D1 to couple the pair of main surfaces 3*a* and 3*b*. The pair of end surfaces 3*e* also extend in the third direction D3.

For example, a length of the element body 3 in the second direction D2 is larger than a length of the element body 3 in the first direction D1 and larger than a length of the element body 3 in the third direction D3. The second direction D2 includes a longitudinal direction of the element body 3. The length of the element body 3 in the first direction D1 and the length of the element body 3 in the third direction D3 may be equal to each other. The length of the element body 3 in the first direction D1 and the length of the element body 3 in the third direction D3 may be different from each other.

The length of the element body 3 in the first direction D1 defines, for example, a height of the element body 3. The length of the element body 3 in the third direction D3 defines, for example, a width of the element body 3. The length of the element body 3 in the second direction D2 defines, for example, a longitudinal length of the element body 3. For example, the height of the element body 3 is 0.1 to 3.2 mm, the width of the element body 3 is 0.1 to 6.3 mm, and the longitudinal length of the element body 3 is 0.2 to 7.5 mm. For example, the height of the element body 3 is 2.5 mm, the width of the element body 3 is 2.5 mm, and the longitudinal length of the element body 3 is 3.2 mm.

The element body 3 includes four ridge portions 3*g*, four ridge portions 3*i*, and four ridge portions 3*j*. The ridge portions 3*g* are positioned between the end surfaces 3*e* and the main surfaces 3*a* and 3*b*. The ridge portions 3*i* are positioned between the end surfaces 3*e* and the side surfaces 3*c*. The ridge portions 3*j* are positioned between the main surfaces 3*a* and 3*b* and the side surfaces 3*c*. For example, the ridge portions 3*g*, 3*i*, and 3*j* are rounded to be curved. For example, the element body 3 is subjected to what is called a round chamfering process. Each of the end surfaces 3*e* and each of the main surfaces 3*a* and 3*b* are indirectly adjacent to each other with the ridge portion 3*g* interposed therebetween. Each of the end surfaces 3*e* and each of the side surfaces 3*c* are indirectly adjacent to each other with the ridge portion 3*i* interposed therebetween. Each of the main surfaces 3*a* and 3*b* and each of the side surfaces 3*c* are indirectly adjacent to each other with the ridge portion 3*j* interposed therebetween.

The element body 3 is configured through laminating a plurality of dielectric layers in the third direction D3. The element body 3 includes a plurality of laminated dielectric layers. In the element body 3, a lamination direction of the plurality of dielectric layers coincides with the third direction D3. Each dielectric layer includes, for example, a sintered body of a ceramic green sheet containing a dielectric material. Examples of the dielectric material include dielectric ceramics. Examples of the dielectric ceramics include $BaTiO_3$-based, $Ba(Ti, Zr)O_3$-based, or $(Ba, Ca)TiO_3$-based dielectric ceramics. In the actual element body 3, each of the dielectric layers is integrated to such an extent that a boundary between the dielectric layers cannot be visually recognized.

As illustrated in FIG. 1, the external electrodes 5 are disposed at both ends of the element body 3 in the second direction D2. Each external electrode 5 is disposed on a corresponding end surface 3*e* of the pair of end surfaces 3*e*.

Figure 2:
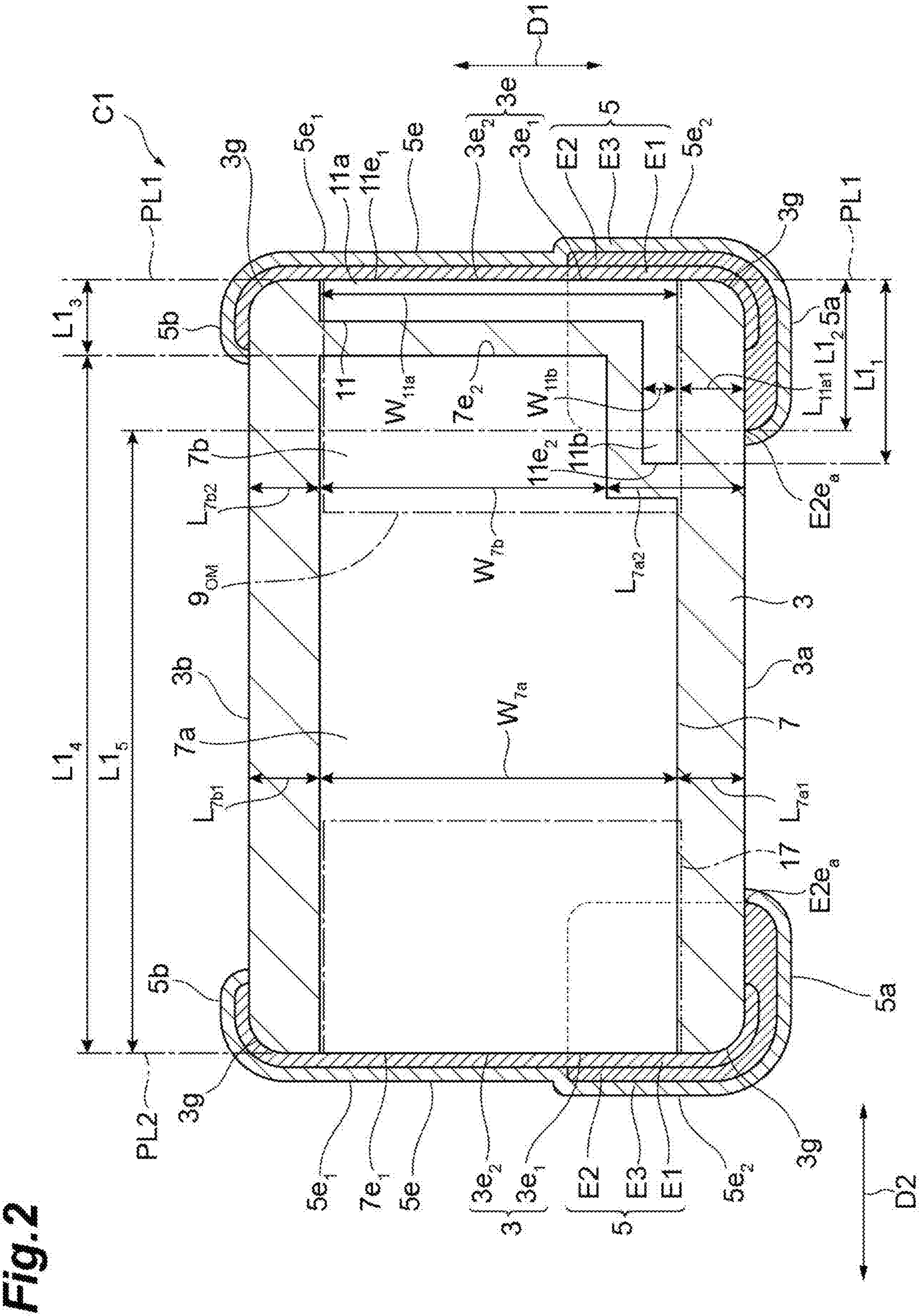
FIG. 2 is a view illustrating a cross-sectional configuration of the multilayer capacitor according to the first example.
Figure 3:
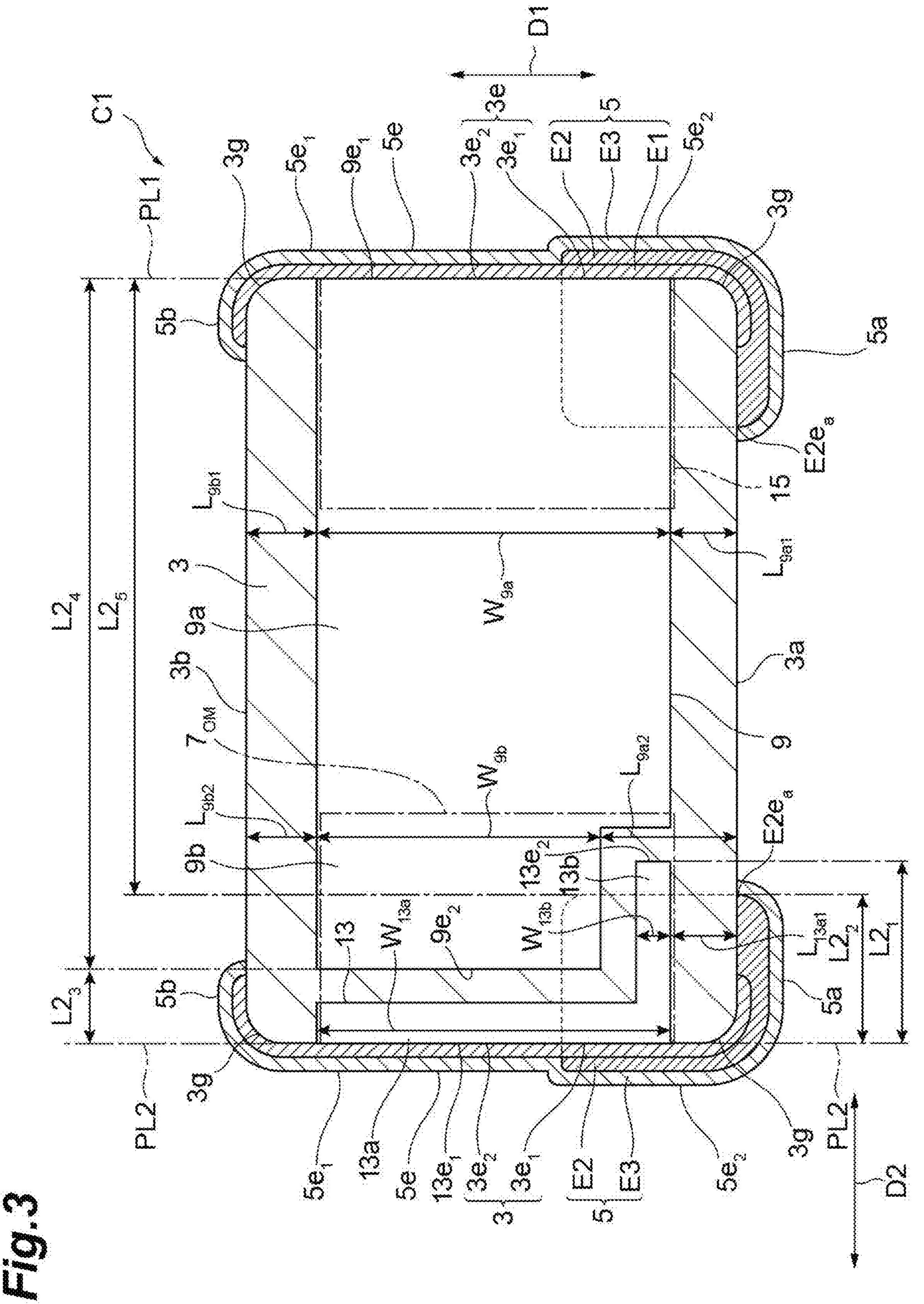
FIG. 3 is a view illustrating a cross-sectional configuration of the multilayer capacitor according to the first example.
Figure 4:
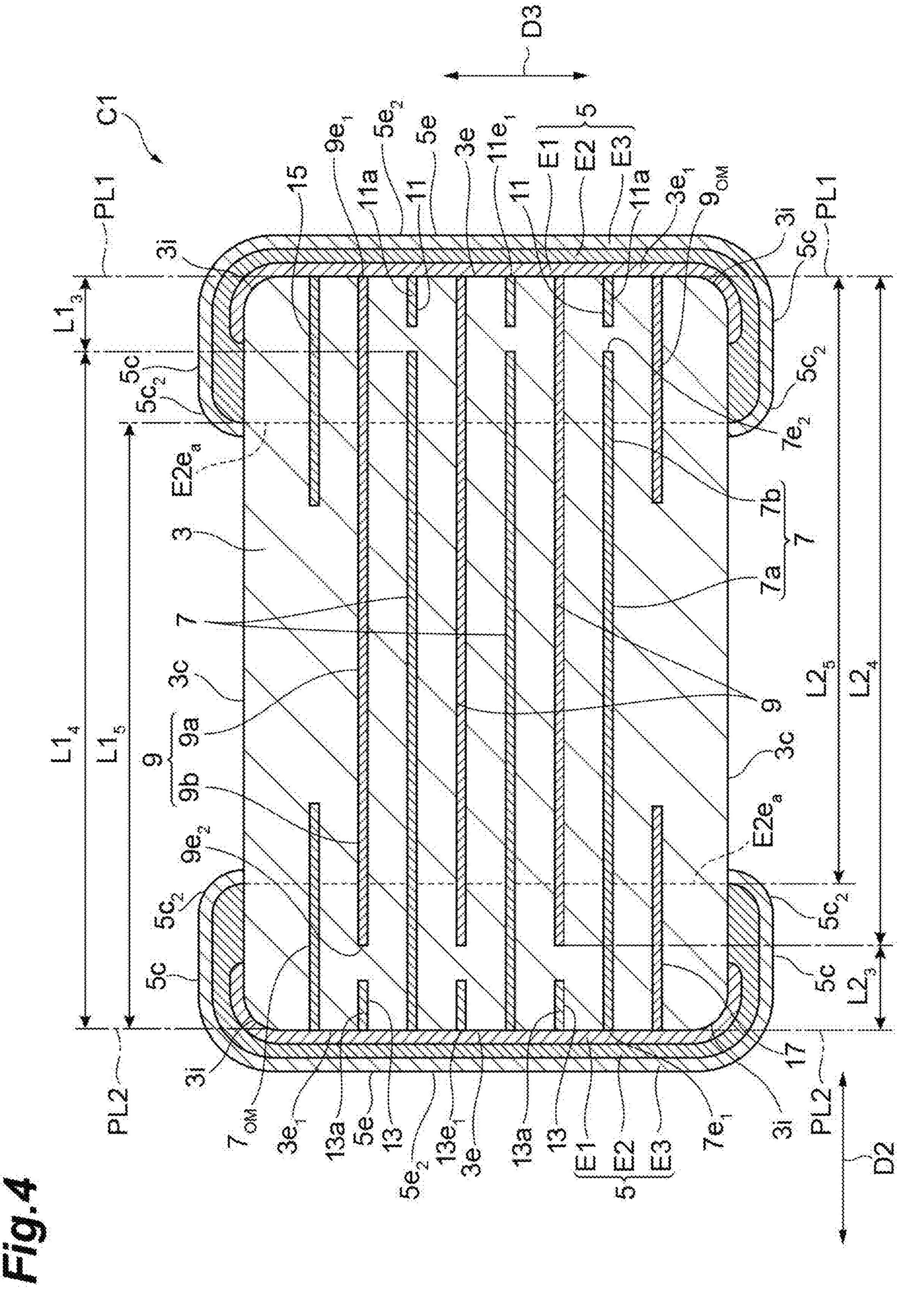
FIG. 4 is a view illustrating a cross-sectional configuration of the multilayer capacitor according to the first example.
Figure 5:
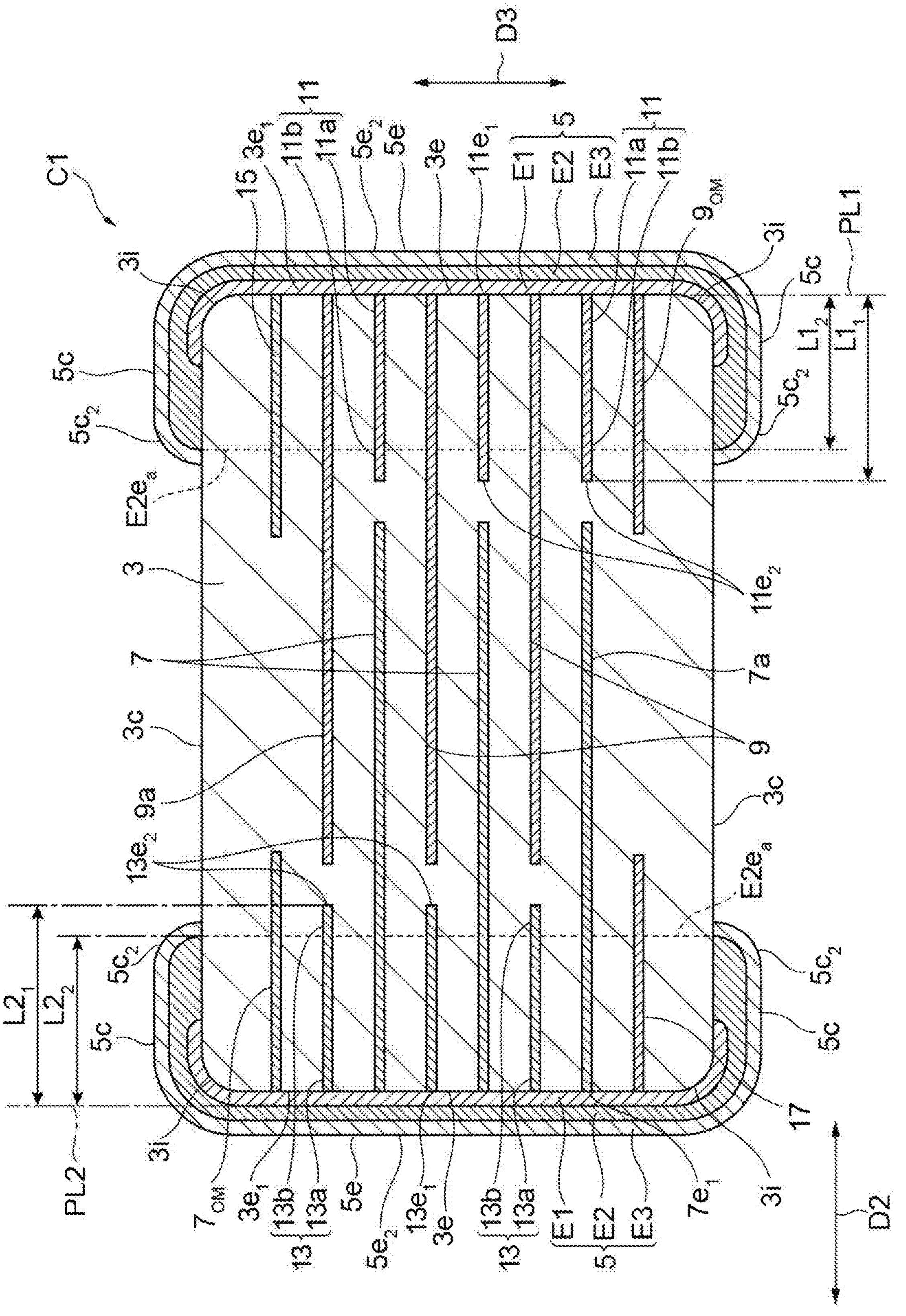
FIG. 5 is a view illustrating a cross-sectional configuration of the multilayer capacitor according to the first example.

For example, each external electrode 5 is disposed on the pair of main surfaces 3*a* and 3*b*, the pair of side surfaces 3*c*, and the end surface 3*e*. The external electrode 5 includes a plurality of electrode portions 5*a*, 5*b*, 5*c*, and 5*e*, as illustrated in FIGS. 2 to 4. The electrode portion 5*a* is disposed on the main surface 3*a*. The electrode portion 5*a* may be disposed on the ridge portion 3*g*. The electrode portion 5*b* is disposed on the main surface 3*b*. The electrode portion 5*b* may be disposed on the ridge portion 3*g*. The electrode portion 5*c* is disposed on the side surface 3*c*. The electrode portion 5*c* may be disposed on the ridge portion 3*i*. The electrode portion 5*e* is disposed on the end surface 3*e*. The external electrode 5 also includes an electrode portion disposed on the ridge portion 3*j*.

Each external electrode 5 is formed on five surfaces of the pair of main surfaces 3*a* and 3*b*, the pair of side surfaces 3*c*, and the end surface 3*e* as well as the ridge portions 3*g*, 3*i*, and 3*j*. The electrode portions 5*a*, 5*b*, 5*c*, and 5*e* adjacent to each other are coupled and are electrically connected to each other. As illustrated in FIGS. 2 to 4, the external electrode 5 includes a first electrode layer E1, a second electrode layer E2, and a third electrode layer E3. The third electrode layer E3 is arranged to include the outermost layer of the external electrode 5. Each of the electrode portions 5*a*, 5*c*, and 5*e* includes the first electrode layer E1, the second electrode layer E2, and the third electrode layer E3. The electrode portions 5*b* includes the first electrode layer E1 and the third electrode layer E3.

The first electrode layer E1 of the electrode portion 5*a* is disposed on the main surface 3*a*. The first electrode layer E1 of the electrode portion 5*a* covers a partial region of the main surface 3*a*. The first electrode layer E1 of the electrode portion 5*a* is in contact with the partial region of the main surface 3*a*. In the electrode portion 5*a*, the first electrode layer E1 is in direct contact with the element body 3. The main surface 3*a* is covered with the first electrode layer E1 at the partial region, and is exposed from the first electrode layer E1 at the remaining region excluding the partial region. The partial region of the main surface 3*a* is positioned closer to the end surface 3*e*. The first electrode layer E1 of the electrode portion 5*a* is positioned on the main surface 3*a*. The first electrode layer E1 may not be disposed on the main surface 3*a*.

The second electrode layer E2 of the electrode portion 5*a* is disposed on both the first electrode layer E1 and the main surface 3*a*. The second electrode layer E2 of the electrode portion 5*a* is formed on the first electrode layer E1 to cover the first electrode layer E1 of the electrode portion 5*a*, and is formed on the main surface 3*a* to cover a part of the main surface 3*a*. The second electrode layer E2 of the electrode portion 5*a* is in contact with substantially the entire first electrode layer E1 and the above-described part of the main surface 3*a*. In the electrode portion 5*a*, the second electrode layer E2 is in direct contact with the first electrode layer E1 and the main surface 3*a*. In the electrode portion 5*a*, the second electrode layer E2 indirectly covers the main surface 3*a* such that the first electrode layer E1 is positioned between the second electrode layer E2 and the main surface 3*a*. The second electrode layer E2 of the electrode portion 5*a* is positioned on the main surface 3*a*. The second electrode layer E2 of the electrode portion 5*a* includes an end edge E2$e_a$ positioned on the main surface 3*a*.

The third electrode layer E3 of the electrode portion 5*a* is disposed on the second electrode layer E2. In the electrode portion 5*a*, the third electrode layer E3 covers the second electrode layer E2. In the electrode portion 5*a*, the third electrode layer E3 is in contact with the second electrode layer E2. In the electrode portion 5*a*, the third electrode layer E3 is in direct contact with the second electrode layer E2. In the electrode portion 5*a*, the third electrode layer E3 is not in direct contact with the first electrode layer E1. The third electrode layer E3 of the electrode portion 5*a* is positioned on the main surface 3*a*.

The first electrode layer E1 of the electrode portion 5*b* is disposed on the main surface 3*b*. The first electrode layer E1 of the electrode portion 5*b* covers a partial region of the main surface 3*b*. The first electrode layer E1 of the electrode portion 5*b* is in contact with the partial region of the main surface 3*b*. In the electrode portion 5*b*, the first electrode layer E1 is in direct contact with the element body 3. The main surface 3*b* is covered with the first electrode layer E1 at the partial region, and is exposed from the first electrode layer E1 at the remaining region excluding the partial region. The partial region of the main surface 3*b* is positioned closer to the end surface 3*e*. The first electrode layer E1 of the electrode portion 5*b* is positioned on the main surface 3*b*. The first electrode layer E1 may not be disposed on the main surface 3*b*.

The third electrode layer E3 of the electrode portion 5*b* is disposed on the first electrode layer E1. In the electrode portion 5*b*, the third electrode layer E3 covers the first electrode layer E1. In the electrode portion 5*b*, the third electrode layer E3 is in contact with the first electrode layer E1. In the electrode portion 5*b*, the third electrode layer E3 is in direct contact with the first electrode layer E1. The third electrode layer E3 of the electrode portion 5*b* is positioned on the main surface 3*b*. The electrode portion 5*b* does not include the second electrode layer E2. The main surface 3*b* is not covered with the second electrode layer E2.

The first electrode layer E1 of the electrode portion 5*c* is disposed on the side surface 3*c*. The first electrode layer E1 of the electrode portion 5*c* covers a partial region of the side surface 3*c*. The first electrode layer E1 of the electrode portion 5*c* is in contact with the partial region of the side surface 3*c*. In the electrode portion 5*c*, the first electrode layer E1 is in direct contact with the element body 3. The side surface 3*c* is covered with the first electrode layer E1 at the partial region, and is exposed from the first electrode layer E1 at the remaining region excluding the partial region. The partial region of the side surface 3*c* is positioned closer to the end surface 3*e*. The first electrode layer E1 of the electrode portion 5*c* is positioned on the side surface 3*c*. The first electrode layer E1 may not be disposed on the side surface 3*c*.

The second electrode layer E2 of the electrode portion 5*c* is disposed on both the first electrode layer E1 and the side surface 3*c*. In the electrode portion 5*c*, the second electrode layer E2 covers a part of the first electrode layer E1 and a part of the side surface 3*c*. In the electrode portion 5*c*, the second electrode layer E2 is in direct contact with the above-described part of the first electrode layer E1 and the above-described part of the side surface 3*c*. The second electrode layer E2 of the electrode portion 5*c* covers the above-described part of the first electrode layer E1 of the electrode portion 5*c*. A region included in the side surface 3*c* and covered with the second electrode layer E2 is positioned closer to the main surface 3*a* and the end surface 3*e*, for example. In the electrode portion 5*c*, the second electrode layer E2 indirectly covers the side surface 3*c* such that the first electrode layer E1 is positioned between the second electrode layer E2 and the side surface 3*c*. The first electrode layer E1 of the electrode portion 5*c* is covered with the second electrode layer E2 at the above-described part, and is exposed from the second electrode layer E2 at the remaining part excluding the above-described part. The second electrode layer E2 of the electrode portion 5*c* is positioned on the side surface 3*c*.

The third electrode layer E3 of the electrode portion 5*c* is disposed on both the second electrode layer E1 and the second electrode layer E2. In the electrode portion 5*c*, the third electrode layer E3 covers the entire second electrode layer E2 and covers an entire portion, of the first electrode layer E1, exposed from the second electrode layer E2. In the electrode portion 5*c*, the third electrode layer E3 is in contact with substantially the entire second electrode layer E2 and is in contact with substantially the entire portion, of the first electrode layer E1, exposed from the second electrode layer E2. In the electrode portion 5*c*, the third electrode layer E3 is in direct contact with the first electrode layer E1 and the second electrode layer E2. The third electrode layer E3 of the electrode portion 5*a* is positioned on the side surface 3*c*.

The electrode portion 5*c* includes a plurality of regions $5c_1$ and $5c_2$. For example, the electrode portion 5*c* includes only two regions $5c_1$ and $5c_2$. The region $5c_2$ is positioned closer to the main surface 3*a* than the region $5c_1$. The region $5c_1$ includes the first electrode layer E1 and the third electrode layer E3. The region $5c_1$ does not include the second electrode layer E2. The region 502 includes the first electrode layer E1, the second electrode layer E2, and the third electrode layer E3. The region $5c_1$ includes a region where the first electrode layer E1 is exposed from the second electrode layer E2. The region $5c_2$ includes a region where the first electrode layer E1 is covered with the second electrode layer E2.

The first electrode layer E1 of the electrode portion 5*e* is disposed on the end surface 3*e*. The first electrode layer E1 of the electrode portion 5*e* covers the entire end surface 3*e*. The first electrode layer E1 of the electrode portion 5*e* is in contact with substantially the entire end surface 3*e*. In the electrode portion 5*e*, the first electrode layer E1 is in direct contact with the end surface 3*e*.

The second electrode layer E2 of the electrode portion 5*e* is disposed on the first electrode layer E1. In the electrode portion 5*e*, the second electrode layer E2 covers a part of the first electrode layer E1. In the electrode portion 5*e*, the second electrode layer E2 is in direct contact with the above-described part of the first electrode layer E1. The second electrode layer E2 of the electrode portion 5*e* is formed to cover the above-described part of the first electrode layer E1 of the electrode portion 5*e*. In the electrode portion 5*e*, the second electrode layer E2 indirectly covers a part of the end surface 3*e* such that the first electrode layer E1 is positioned between the second electrode layer E2 and the end surface 3*e*. The above-described part of the end surface 3*e* is positioned closer to the main surface 3*a*, for example. The first electrode layer E1 of the electrode portion 5*e* is covered with the second electrode layer E2 at the above-described part, and is exposed from the second electrode layer E2 at the remaining part excluding the above-described part. The second electrode layer E2 of the electrode portion 5*e* is positioned on the end surface 3*e*.

The third electrode layer E3 of the electrode portion 5*e* is disposed on both the first electrode layer E1 and the second electrode layer E2. In the electrode portion 5*e*, the third electrode layer E3 covers the entire second electrode layer E2 and covers an entire portion, of the first electrode layer E1, exposed from the second electrode layer E2. In the electrode portion 5*e*, the third electrode layer E3 is in direct contact with substantially the entire second electrode layer E2 and is in direct contact with substantially the entire portion, of the first electrode layer E1, exposed from the second electrode layer E2. In the electrode portion 5*e*, the third electrode layer E3 is in direct contact with the first electrode layer E1 and the second electrode layer E2. The third electrode layer E3 of the electrode portion 5*e* is positioned on the end surface 3*e*.

The electrode portion 5*e* may not include the second electrode layer E2. In a configuration in which the electrode portion 5*e* does not include the second electrode layer E2, the third electrode layer E3 included in the electrode portion 5*e* covers the entire first electrode layer E1 and is in direct contact with the first electrode layer E1.

The electrode portion 5*e* includes a plurality of regions $5e_1$ and $5e_2$. For example, the electrode portion 5*e* includes only two regions $5e_1$ and $5e_2$. The region $5e_2$ is positioned closer to the main surface 3*a* than the region $5e_1$. The region $5e_1$ includes the first electrode layer E1 and the third electrode layer E3. The region $5e_1$ does not include the second electrode layer E2. The region $5e_2$ includes the first electrode layer E1, the second electrode layer E2, and the third electrode layer E3. In the electrode portion 5*e*, the third electrode layer E3 covers the entire end surface 3*e* when viewed from the second direction D2. For example, the third electrode layer E3 indirectly covers the entire end surface 3*e*. The region $5e_1$ includes a region where the first electrode layer E1 is exposed from the second electrode layer E2. The region $5e_2$ includes a region where the first electrode layer E1 is covered with the second electrode layer E2.

When the end surface 3*e* and the second electrode layer E2 positioned on the end surface 3*e* are viewed from the second direction D2, the end surface 3*e* includes a region $3e_1$ covered with the second electrode layer E2 positioned on the end surface 3*e*, and a region $3e_2$ exposed from the second electrode layer E2 positioned on the end surface 3*e*. The region $3e_2$ is closer to the main surface 3*b* than the region $3e_1$. For example, when the region $3e_1$ includes a first region, the region $3e_2$ includes a second region.

The first electrode layer E1 is formed from sintering electrically conductive paste applied onto the surface of the element body 3. The first electrode layer E1 is formed to cover the above-described part of each of the main surfaces 3*a* and 3*b*, the above-described part of each of the side surfaces 3*c*, the end surface 3*e*, and the ridge portions 3*g*, 3*i*, and 3*j*. The first electrode layer E1 is formed from sintering a metal component included in the electrically conductive paste. The metal component included in the electrically conductive paste includes, for example, metal particles. The first electrode layer E1 includes a sintered metal layer. The first electrode layer E1 includes the sintered metal layer formed on the element body 3. For example, the first electrode layer E1 includes a sintered metal layer made of Cu. The first electrode layer E1 may include a sintered metal layer made of Ni. The first electrode layer E1 includes a base metal. The electrically conductive paste includes, for example, particles made of Cu or Ni, a glass component, an organic binder, and an organic solvent. The first electrode layers E1 included in the electrode portions 5*a*, 5*b*, 5*c*, and 5*e* are integrally formed.

The second electrode layer E2 is formed from curing electrically conductive resin paste applied onto the first electrode layer E1. The second electrode layer E2 is formed on both the first electrode layer E1 and the element body 3. The first electrode layer E1 includes an underlying metal layer for forming the second electrode layer E2. The second electrode layer E2 includes an electrically conductive resin layer that covers the first electrode layer E1. The conductive resin paste includes, for example, a resin, an electrically conductive material, and an organic solvent. The resin includes, for example, a thermosetting resin. The conductive material includes, for example, metal particles. The metal particles include, for example, silver particles. For example, the second electrode layer E2 includes a plurality of silver particles. The thermosetting resin includes, for example, a phenol resin, an acrylic resin, a silicone resin, an epoxy resin, or a polyimide resin. The second electrode layer E2 is in contact with a part of the ridge portion 3*j*. The second electrode layers E2 included in the electrode portions 5*a*, 5*c*, and 5*e* are integrally formed.

The third electrode layer E3 is formed on the second electrode layer E2 through a plating method. The third electrode layer E3 may have a multilayer structure. In this case, the third electrode layer E3 includes, for example, an Ni plating layer and a solder plating layer. The Ni plating layer is formed on both the second electrode layer E2 and the first electrode layer E1. The solder plating layer is formed on the Ni plating layer. The solder plating layer covers the Ni plating layer. The Ni plating layer has better solder leach resistance than the metal included in the second electrode layer E2. The third electrode layer E3 may include an Sn plating layer, a Cu plating layer, or an Au plating layer instead of the Ni plating layer. The solder plating layer includes, for example, an Sn plating layer, an Sn—Ag alloy plating layer, an Sn—Bi alloy plating layer, or an Sn—Cu alloy plating layer. The third electrode layers E3 included in the electrode portions 5*a*, 5*c*, and 5*e* are integrally formed.

In the multilayer capacitor C1, the second electrode layer E2 continuously covers only a part of the main surface 3*a*, only a part of the end surface 3*e*, and only a part of each of the pair of side surfaces 3*c*. The second electrode layer E2 includes a portion continuously covering only a part of the main surface 3*a*, only a part of the end surface 3*e*, and only a part of each of the pair of side surfaces 3*c*. The above-described part, of the end surface 3*e*, covered with the second electrode layer E2 is positioned closer to the main surface 3*a*. The above-described part, of the side surface 3*c*, covered with the second electrode layer E2 is positioned closer to the main surface 3*a*. The second electrode layer E2 covers the entire one ridge portion 3*g*, only a part of the ridge portion 3*i*, and only a part of the ridge portion 3*j*. A part of a portion, of the first electrode layer E1, covering the ridge portion 3*i* is exposed from the second electrode layer E2. For example, the first electrode layer E1 included in the regions 5$c_1$ and 5$e_1$ is exposed from the second electrode layer E2.

In a configuration in which the electrode portion 5*e* does not include the second electrode layer E2, the second electrode layer E2 continuously covers only a portion of the main surface 3*a* and only a portion of each of the pair of side surfaces 3*c*. The second electrode layer E2 includes a portion continuously covering only a part of the main surface 3*a* and only a part of each of the pair of side surface 3*c*.

As illustrated in FIGS. 2 to 5, the multilayer capacitor C1 includes a plurality of internal electrodes 7 and a plurality of internal electrodes 9. Each of the internal electrodes 7 and 9 is included in an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. For example, the internal electrodes 7 and 9 are made of Ni.

The internal electrodes 7 and the internal electrodes 9 are disposed in different positions (layers) in the third direction D3. The internal electrodes 7 and the internal electrodes 9 are alternately disposed in the element body 3 to oppose each other in the third direction D3 with an interval therebetween. The plurality of internal electrodes 7 and the plurality of internal electrodes 9 are alternately disposed in the third direction D3. The internal electrodes 7 and the internal electrodes 9 have different polarities from each other. An end of each of the internal electrodes 7 and 9 is exposed to a corresponding end surface 3*e* of the pair of end surfaces 3*e*. The internal electrode 7 includes the end 7$e_1$ exposed to the corresponding end surface 3*e*. The internal electrode 9 includes the end 9$e_1$ exposed to the corresponding end surface 3*e*. Each of the internal electrodes 7 and 9 is exposed only to the corresponding end surface 3*e*. Each of the end 7$e_1$ and the end 9$e_1$ is covered with the electrode portion 5*e* included in a corresponding external electrode 5 of the pair of external electrodes 5. Each of the end 7$e_1$ and the end 9$e_1$ is directly connected to the electrode portion 5*e* included in the corresponding external electrode 5. Each of the internal electrodes 7 and 9 is electrically connected to the corresponding external electrode 5.

The internal electrode 7 includes an end 7$e_2$ opposing the end 7$e_1$ in the second direction D2. The end 7$e_2$ is positioned in the element body 3. The end 7$e_2$ is closer to the end surface 3*e* to which the internal electrode 9 is exposed than the end 7$e_1$. The internal electrode 7 includes the pair of ends 7$e_1$ and 7$e_2$ opposing each other in the second direction D2. For example, when the end 7$e_1$ includes a first end, the end 7$e_2$ includes a second end.

The internal electrode 9 includes an end 9$e_2$ opposing the end 9$e_1$ in the second direction D2. The end 9$e_2$ is positioned in the element body 3. The end 9$e_2$ is closer to the end surface 3*e* to which the internal electrode 7 is exposed than the end 9$e_1$. The internal electrode 9 includes the pair of ends 9$e_1$ and 9$e_2$ opposing each other in the second direction D2. For example, when the end 9$e_1$ includes a first end, the end 9$e_2$ includes a second end.

The plurality of internal electrodes 7 and the plurality of internal electrodes 9 are disposed in the element body 3 to be distributed in the third direction D3. Each of the internal electrodes 7 and 9 is positioned in a plane substantially parallel to the side surfaces 3*c*. Each of the internal electrodes 7 and 9 is disposed to extend in a direction intersecting the main surface 3*a*. For example, each of the internal electrodes 7 and 9 is disposed to extend in a direction substantially orthogonal to the main surface 3*a*. The internal electrode 7 and the internal electrode 9 oppose each other in the third direction D3. The internal electrode 7 includes a region opposing the internal electrode 9 in the third direction D3. The internal electrode 9 includes a region opposing the internal electrode 7 in the third direction D3. The direction in which the internal electrode 7 and the internal electrode 9 oppose each other, that is, the third direction D3 is orthogonal to a direction parallel to the side surfaces 3*c* (first direction D1 and second direction D2).

As illustrated in FIG. 2, the internal electrode 7 includes a plurality of electrode portion 7*a* and 7*b*. For example, the internal electrode 7 includes a pair of electrode portion 7*a* and 7*b*. For example, when the electrode portion 7*a* includes a third electrode portion, the electrode portion 7*b* includes a fourth electrode portion.

The electrode portion 7*a* includes the end $7e_1$. The electrode portion 7*a* has a width $W_{7a}$. The width $W_{7a}$ includes a length, in the first direction D1, of the region included in the electrode portion 7*a* and opposing the internal electrode 9 in the third direction D3, for example. The electrode portion 7*a* is separated from the main surface 3*a* by a distance $L_{7a1}$. The distance $L_{7a1}$ includes a length in the first direction D1 between the electrode portion 7*a* and the main surface 3*a*, for example.

The electrode portion 7*b* includes the end $7e_2$. The electrode portion 7*b* is closer to the end surface 3*e* to which the internal electrode 9 is exposed than the electrode portion 7*a*. The electrode portion 7*b* has a width $W_{7b}$. The width $W_{7b}$ includes a length, in the first direction D1, of the electrode portion 7*b*, for example. The width $W_{7b}$ is smaller than the width $W_{7a}$. The electrode portion 7*b* is separated from the main surface 3*a* by a distance $L_{7a2}$. The distance $L_{7a2}$ includes a length in the first direction D1 between the electrode portion 7*b* and the main surface 3*a*, for example. The distance $L_{7a2}$ is larger than the distance $L_{7a1}$. The electrode portion 7*b* is farther from the main surface 3*a* in the first direction D1 than the electrode portion 7*a*. For example, when the width $W_{7a}$ includes a first width, the width $W_{7b}$ includes a second width. For example, when the distance $L_{7a1}$ includes a first distance, the distance $L_{7a2}$ includes a second distance.

As illustrated in FIG. 3, the internal electrode 9 includes a plurality of electrode portion 9*a* and 9*b*. For example, the internal electrode 9 includes a pair of electrode portion 9*a* and 9*b*. For example, when the electrode portion 9*a* includes a third electrode portion, the electrode portion 9*b* includes a fourth electrode portion.

The electrode portion 9*a* includes the end $9e_1$. The electrode portion 9*a* has a width $W_{9a}$. The width $W_{9a}$ includes a length, in the first direction D1, of the region included in the electrode portion 9*a* and opposing the internal electrode 7 in the third direction D3, for example. The electrode portion 9*a* is separated from the main surface 3*a* by a distance $L_{9a1}$. The distance $L_{9a1}$ includes a length in the first direction D1 between the electrode portion 9*a* and the main surface 3*a*, for example. The width $W_{9a}$ may be equal to the width $W_{7a}$ or may be different from the width $W_{7a}$. The distance $L_{9a1}$ may be equal to the distance $L_{7a1}$ or may be different from the distance $L_{7a1}$.

The electrode portion 9*b* includes the end $9e_2$. The electrode portion 9*b* is closer to the end surface 3*e* to which the internal electrode 7 is exposed than the electrode portion 9*a*. The electrode portion 9*b* has a width $W_{9b}$. The width $W_{9b}$ includes a length, in the first direction D1, of the electrode portion 9*b*, for example. The width $W_{9b}$ is smaller than the width $W_{9a}$. The electrode portion 9*b* is separated from the main surface 3*a* by a distance $L_{9a2}$. The distance $L_{9a2}$ includes a length in the first direction D1 between the electrode portion 9*b* and the main surface 3*a*, for example. The distance $L_{9a2}$ is larger than the distance $L_{9a1}$. The electrode portion 9*b* is farther from the main surface 3*a* in the first direction D1 than the electrode portion 9*a*. The width $W_{9b}$ may be equal to the width $W_{7b}$ or may be different from the width $W_{7b}$. The distance $L_{9b2}$ may be equal to the distance $L_{7a2}$ or may be different from the distance $L_{7a2}$. For example, when the width $W_{9a}$ includes a first width, the width $W_{9b}$ includes a second width. For example, when the distance $L_{9a1}$ includes a first distance, the distance $L_{9a2}$ includes a second distance.

The electrode portion 7*a* is separated from the main surface 3*b* by a distance $L_{7b1}$. The distance $L_{7b1}$ includes a length in the first direction D1 between the electrode portion 7*a* and the main surface 3*b*, for example. The electrode portion 7*b* is separated from the main surface 3*b* by a distance $L_{7b2}$. The distance $L_{7b2}$ includes a length in the first direction D1 between the electrode portion 7*b* and the main surface 3*b*, for example. For example, the distance $L_{7b2}$ is substantially equal to the distance $L_{7b1}$.

The electrode portion 9*a* is separated from the main surface 3*b* by a distance $L_{9b1}$. The distance $L_{9b1}$ includes a length in the first direction D1 between the electrode portion 9*a* and the main surface 3*b*, for example. The electrode portion 9*b* is separated from the main surface 3*b* by a distance $L_{9b2}$. The distance $L_{9b2}$ includes a length in the first direction D1 between the electrode portion 9*b* and the main surface 3*b*, for example. For example, the distance $L_{9b2}$ is substantially equal to the distance $L_{9b1}$. The distance $L_{9b1}$ may be equal to the distance $L_{7b1}$ or may be different from the distance $L_{7b1}$. The distance $L_{9b2}$ may be equal to the distance $L_{7b2}$ or may be different from the distance $L_{7b2}$.

The plurality of internal electrode 7 include, for example, one internal electrode $\mathbf{7}_{OM}$ positioned on the outermost side in the third direction D3. The internal electrode $\mathbf{7}_{OM}$ is adjacent to one side surface 3*c* of the pair of side surface 3*c* in the third direction D3. The internal electrode $\mathbf{7}_{OM}$ is closest to the one side surface 3*c* among the plurality of internal electrodes 7. The internal electrode $\mathbf{7}_{OM}$ includes an outermost internal electrode.

The plurality of internal electrode 9 include, for example, one internal electrode $\mathbf{9}_{OM}$ positioned on the outermost side in the third direction D3. The internal electrode $\mathbf{9}_{OM}$ is adjacent to an other side surface 3*c* of the pair of side surface 3*c* in the third direction D3. The internal electrode $\mathbf{9}_{OM}$ is closest to the other side surface 3*c* among the plurality of internal electrodes 9. The internal electrode $\mathbf{9}_{OM}$ includes an outermost internal electrode.

As illustrated in FIGS. 2 to 5, the multilayer capacitor C1 includes a plurality of auxiliary internal electrodes 11 and a plurality of auxiliary internal electrodes 13. Each of the auxiliary internal electrodes 11 and 13 is included in an internal conductor disposed in the element body 3. Similar to the internal electrodes 7 and 9, the auxiliary internal electrodes 11 and 13 are made of an electrically conductive material that is commonly used as an internal conductor of a multilayer electronic component. The electrically conductive material includes, for example, a base metal. The electrically conductive material includes, for example, Ni or Cu. Each of the auxiliary internal electrodes 11 and 13 is configured as a sintered body of an electrically conductive paste containing the electrically conductive material described above. For example, the auxiliary internal electrodes 11 and 13 are made of Ni.

Each of the plurality of auxiliary internal electrodes 11 is disposed in the same layer as a corresponding internal electrode 7 of the plurality of internal electrodes 7. Each of the plurality of auxiliary internal electrodes 11 is disposed between the corresponding internal electrode 7 and the end surface 3*e* to which the internal electrode 7 is not exposed. For example, one internal electrode 7 and one auxiliary internal electrode 11 are positioned in the same layer. One internal electrode 7 and one auxiliary internal electrode 11 oppose each other in the second direction D2, in the same layer. The internal electrode 7 and the auxiliary internal electrode 11 that are disposed in the same layer are separated from each other in the second direction D2. The auxiliary internal electrodes 11 are separated from the main surfaces 3*a* and 3*b* and are not exposed to the main surfaces 3*a* and 3*b*.

As illustrated in FIG. 2, the auxiliary internal electrode 11 includes a plurality of electrode portions 11$a$ and 11$b$. For example, the auxiliary internal electrode 11 includes a pair of electrode portions 11$a$ and 11$b$. For example, when the electrode portion 11$a$ includes a first electrode portion, the electrode portion 11$b$ includes a second electrode portion.

The electrode portion 11$a$ is exposed to a corresponding end surface 3$e$ of the pair of end surfaces 3$e$. The electrode portion 11$a$ is exposed to the end surface 3$e$ to which the internal electrode 7 is not exposed. The electrode portion 11$a$ includes an end 11$e_1$ exposed to the end surface 3$e$ to which the internal electrode 7 is not exposed.

The electrode portion 11$a$ is directly connected to the electrode portion 5$e$ included in a corresponding external electrode 5 of the pair of external electrodes 5, at the end 11$e_1$. The electrode portion 11$a$ is electrically and physically connected to the electrode portion 5$e$ included in the corresponding external electrode 5. The electrode portion 5$e$ to which the electrode portion 11$a$ is electrically and physically connected is different from the electrode portion 5$e$ to which the internal electrode 7 is electrically and physically connected. The internal electrode 7 is not electrically connected to the electrode portion 5$e$ to which the electrode portion 11$a$ is electrically and physically connected. The electrode portion 11$a$ is electrically and physically connected to the external electrode 5 to which the internal electrode 7 is not electrically connected.

The electrode portion 11$b$ is positioned between the internal electrode 7 and the second electrode layer E2 included in the electrode portion 5$a$ of the external electrode 5 that is not electrically and physically connected to the internal electrode 7 positioned in the same layer. The electrode portion 11$b$ is positioned between the electrode portion 7$b$ included in the internal electrode 7 positioned in the same layer and the second electrode layer E2 of the electrode portion 5$a$, in the first direction D1. The electrode portion 7$b$ and the electrode portion 11$b$ that are positioned in the same layer are separated from each other in the first direction D1. The electrode portion 7$a$ and the electrode portion 11$b$ that are positioned in the same layer are separated from each other in the second direction D2.

The electrode portion 11$a$ has a width $W_{11a}$. The electrode portion 11$a$ is exposed to the end surface 3$e$ to which the internal electrode 7 is not exposed with a width $W_{11a}$. The width $W_{11a}$ includes, for example, a length of the electrode portion 11$a$ in the first direction D1. The electrode portion 11$b$ has a width $W_{11b}$. The width $W_{11b}$ includes, for example, a length of the electrode portion 11$b$ in the first direction D1. The width $W_{11a}$ is larger than the width $W_{11b}$.

The electrode portion 11$b$ is separated from the main surface 3$a$ by a distance $L_{11a1}$. The distance $L_{11a1}$ includes, for example, a length in the first direction D1 between the electrode portion 11$b$ and the main surface 3$a$. The distance $L_{11a1}$ may be equal to the distance $L_{7a1}$ or may be different from the distance $L_{7a1}$.

The electrode portion 11$b$ includes an end 11$e_2$ opposing the end 11$e_1$ in the second direction D2. The end 11$e_2$ is positioned in the element body 3. The end 11$e_2$ is closer to the end surface 3$e$ to which the internal electrode 7 is exposed than the end 11$e_1$. The auxiliary internal electrode 11 includes a pair of ends 11$e_1$ and 11$e_2$ opposing each other in the second direction D2.

Figure 6:
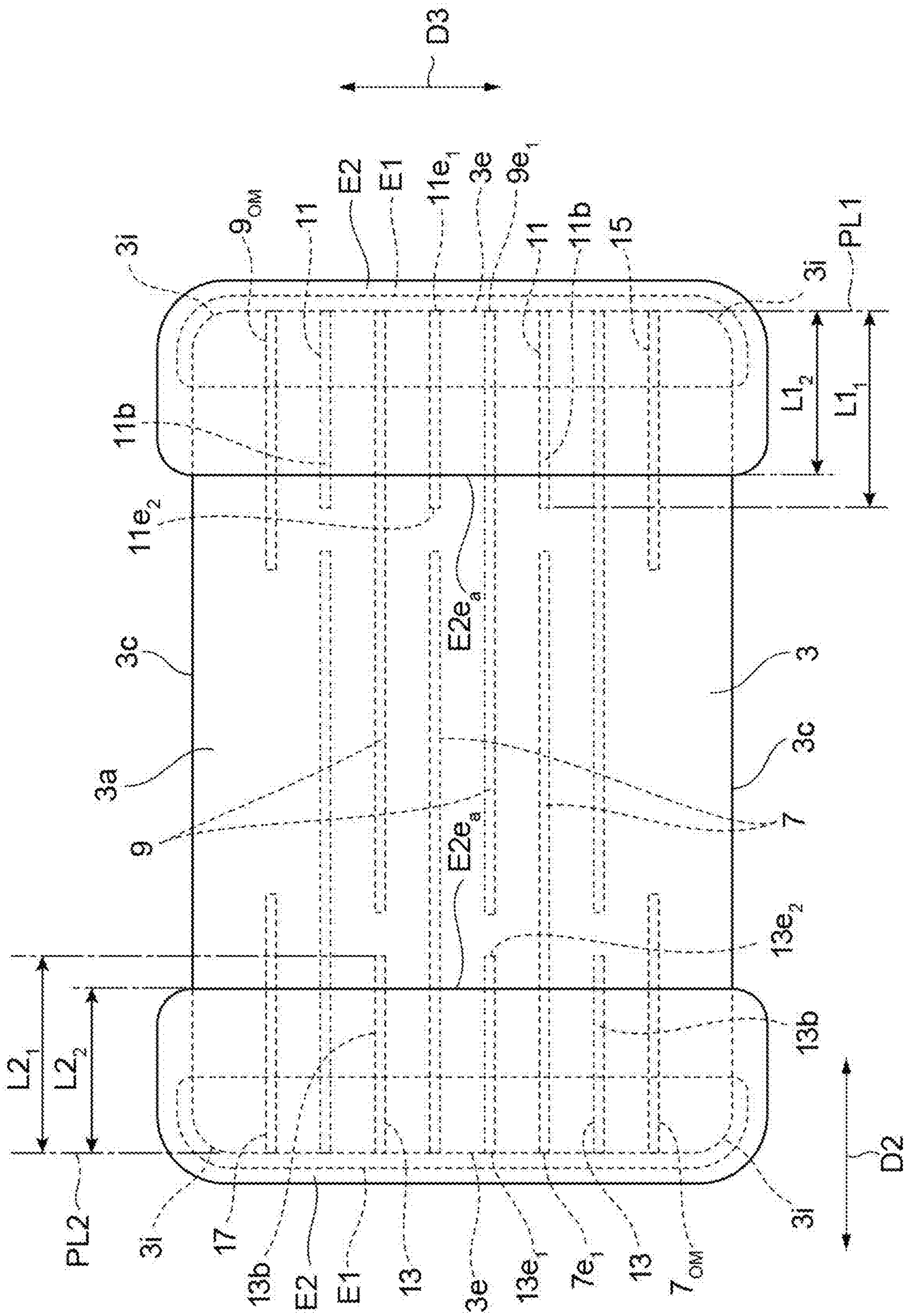
FIG. 6 is a view illustrating a relationship among an internal electrode, an auxiliary internal electrode, and a second electrode layer.

The auxiliary internal electrode 11 and the second electrode layer E2 of the electrode portion 5$a$ that are electrically connected to each other have a relationship in which a length L1$_1$ from a reference surface PL1 to the end 11$e_2$ is larger than a length L1$_2$ from the reference surface PL1 to the end edge E2$e_a$. The reference surface PL1 includes the end surface 3$e$ to which the auxiliary internal electrode 11 (end 11$e_1$) is exposed. The length L1$_1$ includes a maximum length of the auxiliary internal electrode 11 in the second direction D2. As illustrated in FIG. 6, when the auxiliary internal electrode 11 and the second electrode layer E2 of the electrode portion 5$a$ electrically connected to the auxiliary internal electrode 11 are viewed from the first direction D1, the electrode portion 11$b$ includes a portion exposed from the second electrode layer E2 of the electrode portion 5$a$ electrically connected to the auxiliary internal electrode 11. FIG. 6 is a view illustrating a relationship among an internal electrode, an auxiliary internal electrode, and a second electrode layer.

The internal electrode 7 and the auxiliary internal electrode 11 that are disposed in the same layer have a relationship in which a length of the auxiliary internal electrode 11 from the reference plane PL1 is larger than a length from the reference plane PL1 to the internal electrode 7. The length of the auxiliary internal electrode 11 from the reference plane PL1 is defined by, for example, a maximum length of the auxiliary internal electrode 11 in the second direction D2. That is, the length of the auxiliary internal electrode 11 from the reference plane PL1 is defined by, for example, the length L1$_1$. The length from the reference plane PL1 to the internal electrode 7 is defined by, for example, a minimum length L1$_3$ in the second direction D2 from the reference plane PL1 to the internal electrode 7.

The internal electrode 7 and the second electrode layer E2 of the electrode portion 5$a$ that are not electrically connected to each other have a relationship in which a length of the internal electrode 7 from a reference plane PL2 is larger than a length from the reference plane PL2 to the and edge E2$e_a$ of the second electrode layer E2 of the electrode portion 5$a$ that is not electrically connected to the internal electrode 7. The length of the internal electrode 7 from the reference plane PL2 is defined by, for example, a maximum length L1$_4$ of the internal electrode 7 in the second direction D2. The length from the reference plane PL2 to the above-described end edge E2$e_a$ is defined by, for example, a length L1$_5$ from the reference plane PL2 to the above-described end edge E2$e_a$ in the second direction D2. The reference surface PL2 includes the end surface 3$e$ to which the internal electrode 7 (end 7$e_1$) is exposed.

Each of the plurality of auxiliary internal electrodes 13 is disposed in the same layer as a corresponding internal electrode 9 of the plurality of internal electrodes 9. Each of the plurality of auxiliary internal electrodes 13 is disposed between the corresponding internal electrode 9 and the end surface 3$e$ to which the internal electrode 9 is not exposed. For example, one internal electrode 9 and one auxiliary internal electrode 13 are positioned in the same layer. One internal electrode 9 and one auxiliary internal electrode 13 oppose each other in the second direction D2, in the same layer. The internal electrode 9 and the auxiliary internal electrode 13 that are disposed in the same layer are separated from each other in the second direction D2. The auxiliary internal electrodes 13 are separated from the main surfaces 3$a$ and 3$b$ and are not exposed to the main surfaces 3$a$ and 3$b$.

As illustrated in FIG. 3, the auxiliary internal electrode 13 includes a plurality of electrode portions 13$a$ and 13$b$. For example, the auxiliary internal electrode 13 includes a pair of electrode portions 13$a$ and 13$b$. For example, when the electrode portion 13$a$ includes a first electrode portion, the electrode portion 13$b$ includes a second electrode portion.

The electrode portion 13*a* is exposed to a corresponding end surface 3*e* of the pair of end surfaces 3*e*. The electrode portion 13*a* is exposed to the end surface 3*e* to which the internal electrode 9 is not exposed. The electrode portion 13*a* includes an end $\mathbf{13}e_1$ exposed to the end surface 3*e* to which the internal electrode 9 is not exposed.

The electrode portion 13*a* is directly connected to the electrode portion 5*e* included in a corresponding external electrode 5 of the pair of external electrodes 5, at the end $\mathbf{13}e_1$. The electrode portion 13*a* is electrically and physically connected to the electrode portion 5*e* included in the corresponding external electrode 5. The electrode portion 5*e* to which the electrode portion 13*a* is electrically and physically connected is different from the electrode portion 5*e* to which the internal electrode 9 is electrically and physically connected. The internal electrode 9 is not electrically connected to the electrode portion 5*e* to which the electrode portion 13*a* is electrically and physically connected. The electrode portion 13*a* is electrically and physically connected to the external electrode 5 to which the internal electrode 9 is not electrically connected.

The electrode portion 13*b* is positioned between the internal electrode 9 and the second electrode layer E2 included in the electrode portion 5*a* of the external electrode 5 that is not electrically and physically connected to the internal electrode 9 positioned in the same layer. The electrode portion 13*b* is positioned between the electrode portion 9*b* included in the internal electrode 9 positioned in the same layer and the second electrode layer E2 of the electrode portion 5*a*, in the first direction D1. The electrode portion 9*b* and the electrode portion 13*b* that are positioned in the same layer are separated from each other in the first direction D1. The electrode portion 9*a* and the electrode portion 13*b* that are positioned in the same layer are separated from each other in the second direction D2.

The electrode portion 13*a* has a width $W_{13a}$. The electrode portion 13*a* is exposed to the end surface 3*e* to which the internal electrode 9 is not exposed with a width $W_{13a}$. The width $W_{13a}$ includes, for example, a length of the electrode portion 13*a* in the first direction D1. The electrode portion 13*b* has a width $W_{13b}$. The width $W_{13b}$ includes, for example, a length of the electrode portion 13*b* in the first direction D1. The width $W_{13a}$ is larger than the width $W_{13b}$.

The electrode portion 13*b* is separated from the main surface 3*a* by a distance $L_{13a1}$. The distance $L_{13a1}$ includes, for example, a length in the first direction D1 between the electrode portion 13*b* and the main surface 3*a*. The distance $L_{13a1}$ may be equal to the distance $L_{9a1}$ or may be different from the distance $L_{9a1}$.

The electrode portion 13*b* includes an end $\mathbf{13}e_2$ opposing the end $\mathbf{13}e_1$ in the second direction D2. The end $\mathbf{13}e_2$ is positioned in the element body 3. The end $\mathbf{13}e_2$ is closer to the end surface 3*e* to which the internal electrode 9 is exposed than the end $\mathbf{13}e_1$. The auxiliary internal electrode 13 includes a pair of ends $\mathbf{13}e_1$ and $\mathbf{13}e_2$ opposing each other in the second direction D2.

The auxiliary internal electrode 13 and the second electrode layer E2 of the electrode portion 5*a* that are electrically connected to each other have a relationship in which a length $L2_1$ from the reference surface PL2 to the end $\mathbf{13}e_2$ is larger than a length $L2_2$ from the reference surface PL2 to the end edge $E2e_a$. The reference surface PL2 includes the end surface 3*e* to which the auxiliary internal electrode 13 (end $\mathbf{13}e_1$) is exposed. The length $L2_1$ includes a maximum length of the auxiliary internal electrode 13 in the second direction D2. As illustrated in FIG. 6, when the auxiliary internal electrode 13 and the second electrode layer E2 of the electrode portion 5*a* electrically connected to the auxiliary internal electrode 13 are viewed from the first direction D1, the electrode portion 13*b* includes a portion exposed from the second electrode layer E2 of the electrode portion 5*a* electrically connected to the auxiliary internal electrode 13.

The internal electrode 9 and the auxiliary internal electrode 13 that are disposed in the same layer have a relationship in which a length of the auxiliary internal electrode 13 from the reference plane PL2 is larger than a length from the reference plane PL2 to the internal electrode 9. The length of the auxiliary internal electrode 13 from the reference plane PL2 is defined by, for example, a maximum length of the auxiliary internal electrode 13 in the second direction D2. That is, the length of the auxiliary internal electrode 13 from the reference plane PL2 is defined by, for example, the length $L2_1$. The length from the reference plane PL2 to the internal electrode 9 is defined by, for example, a minimum length $L2_3$ in the second direction D2 from the reference plane PL2 to the internal electrode 9.

The internal electrode 9 and the second electrode layer E2 of the electrode portion 5*a* that are not electrically connected to each other have a relationship in which a length of the internal electrode 9 from the reference plane PL1 is larger than a length from the reference plane PL1 to the and edge $E2e_a$ of the second electrode layer E2 of the electrode portion 5*a* that is not electrically connected to the internal electrode 9. The length of the internal electrode 9 from the reference plane PL1 is defined by, for example, a maximum length $L2_4$ of the internal electrode 9 in the second direction D2. The length from the reference plane PL1 to the above-described end edge $E2e_a$ is defined by, for example, a length $L2_5$ from the reference plane PL1 to the above-described end edge $E2e_a$ in the second direction D2. The reference surface PL1 includes the end surface 3*e* to which the internal electrode 9 (end $\mathbf{9}e_1$) is exposed.

The internal electrode $\mathbf{7}_{OM}$ is adjacent to the second electrode layer E2 of the electrode portion 5*c* electrically connected to the internal electrode $\mathbf{7}_{OM}$, in the third direction D3. The internal electrode $\mathbf{7}_{OM}$ opposes the electrode portion 9*b* in the third direction D3. When viewed from the third direction D3, the internal electrode $\mathbf{7}_{OM}$ does not overlap the second electrode layer E2 of the electrode portion 5*c* that is not electrically connected to the internal electrode $\mathbf{7}_{OM}$. When viewed from the third direction D3, the internal electrode $\mathbf{7}_{OM}$ does not overlap the second electrode layer E2 of the electrode portion 5*c* electrically connected to the internal electrode 9. When the internal electrode $\mathbf{7}_{OM}$ and the second electrode layer E2 of the electrode portion 5*c* electrically connected to the auxiliary internal electrode 11 are viewed from the third direction D3, the internal electrode $\mathbf{7}_{OM}$ and the second electrode layer E2 of the electrode portion 5*c* electrically connected to the auxiliary internal electrode 11 are separated from each other in the second direction D2.

The internal electrode $\mathbf{9}_{OM}$ is adjacent to the second electrode layer E2 of the electrode portion 5*c* electrically connected to the internal electrode $\mathbf{9}_{OM}$, in the third direction D3. The internal electrode $\mathbf{9}_{OM}$ opposes the electrode portion 7*b* in the third direction D3. When viewed from the third direction D3, the internal electrode $\mathbf{9}_{OM}$ does not overlap the second electrode layer E2 of the electrode portion 5*c* that is not electrically connected to the internal electrode $\mathbf{9}_{OM}$. When viewed from the third direction D3, the internal electrode $\mathbf{9}_{OM}$ does not overlap the second electrode layer E2 of the electrode portion 5*c* electrically connected to the internal electrode 7. When the internal electrode $\mathbf{9}_{OM}$ and the second electrode layer E2 of the electrode portion 5*c* electrically connected to the auxiliary internal electrode 13 are viewed from the third direction D3, the internal electrode $\mathbf{9}_{OM}$ and the second electrode layer E2 of the electrode portion 5*c* electrically connected to the auxiliary internal electrode 13 are separated from each other in the second direction D2.

As illustrated in FIGS. 2 to 5, the multilayer capacitor C1 includes a plurality of conductors 15 and 17. For example, the multilayer capacitor C1 includes two conductors 15 and 17. In FIGS. 2 and 3, for the sake of explanation, the internal electrodes 7 and 9 (internal electrodes $\mathbf{7}_{OM}$ and $\mathbf{9}_{OM}$) and the conductors 15 and 17 are intentionally illustrated so as to deviate from each other in the first direction D1.

The conductor 15 is positioned in the same layer as the internal electrode $\mathbf{7}_{OM}$ and is separated from the internal electrode $\mathbf{7}_{OM}$. The conductor 15 includes one end exposed to the corresponding end surface 3*e*. The one end of the conductor 15 is exposed to the end surface 3*e* to which the internal electrode 9 (end $\mathbf{9}e_1$) is exposed. The one end of the conductor 15 is entirely covered by the corresponding electrode portion 5*e*. The conductor 15 is directly connected to the corresponding electrode portion 5*e*. The conductor 15 is electrically connected to the corresponding external electrode 5. In the multilayer capacitor C1, the conductor 15 is electrically connected to the external electrode 5 (electrode portion 5*e*) to which the internal electrode 9 is electrically connected. The conductor 15 is electrically connected to the external electrode 5 to which the internal electrode 7 is not electrically connected.

The conductor 17 is positioned in the same layer as the internal electrode $\mathbf{9}_{OM}$ and is separated from the internal electrode $\mathbf{9}_{OM}$. The conductor 17 includes one end exposed to the corresponding end surface 3*e*. The one end of the conductor 15 is exposed to the end surface 3*e* to which the internal electrode 7 (end $\mathbf{7}e_1$) is exposed. The one end of the conductor 17 is entirely covered by the corresponding electrode portion 5*e*. The conductor 17 is directly connected to the corresponding electrode portion 5*e*. The conductor 17 is electrically connected to the corresponding external electrode 5. In the multilayer capacitor C1, the conductor 17 is electrically connected to the external electrode 5 (electrode portion 5*e*) to which the internal electrode 7 is electrically connected. The conductor 17 is electrically connected to the external electrode 5 to which the internal electrode 9 is not electrically connected.

The conductor 15 opposes the internal electrode 9 and does not opposes the internal electrode 7, in the third direction D3. The conductor 17 opposes the internal electrode 7 and does not opposes the internal electrode 9, in the third direction D3. Each of the conductors 15 and 17 includes a dummy conductor that tends not to contribute to generation of capacitance.

When the multilayer capacitor C1 is solder-mounted on an electronic device, an external force acting on the multilayer capacitor C1 from the electronic device may act on the element body 3 through the external electrode 5. The external force is transmitted to the external electrode 5 from the solder fillet formed in solder-mounting. The electronic device includes, for example, a circuit board or an electronic component.

In the multilayer capacitor C1, the external electrode 5 includes the second electrode layer E2. Therefore, the external force tends not to act on the element body 3 from the external electrode 5. Consequently, the multilayer capacitor C1 prevents cracks from occurring in the element body 3.

In the multilayer capacitor C1, the auxiliary internal electrode 11 is electrically connected to the external electrode 5 to which the corresponding internal electrode 7 is not electrically connected. The electrode portion 11*b* is positioned between the second electrode layer E2 included in the electrode portion 5*a* of the external electrode 5 to which the auxiliary internal electrode 11 is electrically connected and the internal electrode 7 in the same layer as the auxiliary internal electrode 11. The electrode portion 11*b* is positioned between the second electrode layer E2 of the electrode portion 5*a* and the internal electrode 7 that are not electrically connected to each other. Therefore, electric field tends not to be generated between the second electrode layer E2 of the electrode portion 5*a* and the internal electrode 7 that are not electrically connected to each other.

In the multilayer capacitor C1, the auxiliary internal electrode 13 is electrically connected to the external electrode 5 to which the corresponding internal electrode 9 is not electrically connected. The electrode portion 13*b* is positioned between the second electrode layer E2 included in the electrode portion 5*a* of the external electrode 5 to which the auxiliary internal electrode 13 is electrically connected and the internal electrode 9 in the same layer as the auxiliary internal electrode 13. The electrode portion 13*b* is positioned between the second electrode layer E2 of the electrode portion 5*a* and the internal electrode 9 that are not electrically connected to each other. Therefore, electric field tends not to be generated between the second electrode layer E2 of the electrode portion 5*a* and the internal electrode 9 that are not electrically connected to each other.

Consequently, the multilayer capacitor C1 reduces occurrence of migration.

In the multilayer capacitor C1, the electrode portion 11*a* is exposed to the end surface 3*e* with the width $W_{11a}$ larger than the width $W_{11b}$ of the electrode portion 11*b*. The multilayer capacitor C1 increases a physical connection length between the electrode portion 11*a* and the external electrode 5, as compared with, for example, a configuration in which the width $W_{11a}$ is the same as the width $W_{11b}$. Therefore, the multilayer capacitor C1 improves connectivity between the external electrode 5 and the auxiliary internal electrode 11.

In the multilayer capacitor C1, the electrode portion 13*a* is exposed to the end surface 3*e* with the width $W_{13a}$ larger than the width $W_{13b}$ of the electrode portion 13*b*. The multilayer capacitor C1 increases a physical connection length between the electrode portion 13*a* and the external electrode 5, as compared with, for example, a configuration in which the width $W_{13a}$ is the same as the width $W_{13b}$. Therefore, the multilayer capacitor C1 improves connectivity between the external electrode 5 and the auxiliary internal electrode 13.

A configuration in which the auxiliary internal electrode 11 is disposed in the same layer as the internal electrode 7 tends to decrease an area of the internal electrode 7. A decrease in the area of the internal electrode 7 may lead to a decrease in capacitance.

In the multilayer capacitor C1, the internal electrode 7 includes the electrode portion 7*a* including the end $\mathbf{7}e_1$ and the electrode portion 7*b* including the end $\mathbf{7}e_2$. The electrode portion 7*a* has the width $W_{7a}$ and is separated from the main surface 3*a* by the distance $L_{7a1}$. The electrode portion 7*b* has the width $W_{7b}$ and is separated from the main surface 3*a* by the distance $L_{7a2}$. The electrode portion 11*b* is positioned between the second electrode layer E2 of the electrode portion 5*a* to which the internal electrode 7 is not electrically connected and the electrode portion 7*b*. Therefore, the multilayer capacitor C1 prevents a decrease in an area of the internal electrode 7.

A configuration in which the auxiliary internal electrode 13 is disposed in the same layer as the internal electrode 9 tends to decrease an area of the internal electrode 9. A decrease in the area of the internal electrode 9 may lead to a decrease in capacitance.

In the multilayer capacitor C1, the internal electrode 9 includes the electrode portion 9*a* including the end 9$e_1$ and the electrode portion 9*b* including the end 9$e_2$. The electrode portion 9*a* has the width $W_{9a}$ and is separated from the main surface 3*a* by the distance $L_{9a1}$. The electrode portion 9*b* has the width $W_{9b}$ and is separated from the main surface 3*a* by the distance $L_{9a2}$. The electrode portion 13*b* is positioned between the second electrode layer E2 of the electrode portion 5*a* to which the internal electrode 9 is not electrically connected and the electrode portion 9*b*. Therefore, the multilayer capacitor C1 prevents a decrease in an area of the internal electrode 9.

In the multilayer capacitor C1, the auxiliary internal electrode 11 and the second electrode layer E2 of the electrode portion 5*a* that are electrically connected to each other have a relationship in which the length L$1_1$ from the reference plane PL1 to the end 11$e_2$ is larger than the length L$1_2$ from the reference plane PL1 to the end edge E2$e_a$. Therefore, the electric field tends not to be reliably generated between the second electrode layer E2 of the electrode portion 5*a* and the internal electrode 7 that are not electrically connected to each other.

In the multilayer capacitor C1, the auxiliary internal electrode 13 and the second electrode layer E2 of the electrode portion 5*a* that are electrically connected to each other have a relationship in which the length L$2_1$ from the reference plane PL2 to the end 13$e_2$ is larger than the length L$2_2$ from the reference plane PL2 to the end edge E2$e_a$. Therefore, the electric field tends not to be reliably generated between the second electrode layer E2 of the electrode portion 5*a* and the internal electrode 9 that are not electrically connected to each other.

Consequently, the multilayer capacitor C1 reliably reduces the occurrence of the migration.

In the multilayer capacitor C1, when the auxiliary internal electrode 11 and the second electrode layer E2 of the electrode portion 5*a* electrically connected to the auxiliary internal electrode 11 are viewed from the first direction D1, the electrode portion 11*b* includes the portion exposed from the second electrode layer E2 of the electrode portion 5*a* electrically connected to the auxiliary internal electrode 11. Therefore, the electric field tends not to be reliably generated between the second electrode layer E2 of the electrode portion 5*a* and the internal electrode 7 that are not electrically connected to each other.

In the multilayer capacitor C1, when the auxiliary internal electrode 13 and the second electrode layer E2 of the electrode portion 5*a* electrically connected to the auxiliary internal electrode 13 are viewed from the first direction D1, the electrode portion 13*b* includes the portion exposed from the second electrode layer E2 of the electrode portion 5*a* electrically connected to the auxiliary internal electrode 13. Therefore, the electric field tends not to be reliably generated between the second electrode layer E2 of the electrode portion 5*a* and the internal electrode 9 that are not electrically connected to each other.

Consequently, the multilayer capacitor C1 reliably reduces the occurrence of the migration.

In the multilayer capacitor C1, the internal electrode 7 and the auxiliary internal electrode 11 that are disposed in the same layer have a relationship in which the length of the auxiliary internal electrode 11 from the reference plane PL1 is larger than the length from the reference plane PL1 to the internal electrode 7. Therefore, the electric field tends not to be reliably generated between the second electrode layer E2 of the electrode portion 5*a* and the internal electrode 7 that are not electrically connected to each other.

In the multilayer capacitor C1, the internal electrode 9 and the auxiliary internal electrode 13 that are disposed in the same layer have a relationship in which the length of the auxiliary internal electrode 13 from the reference plane PL2 is larger than the length from the reference plane PL2 to the internal electrode 9. Therefore, the electric field tends not to be reliably generated between the second electrode layer E2 of the electrode portion 5*a* and the internal electrode 9 that are not electrically connected to each other.

Consequently, the multilayer capacitor C1 reliably reduces the occurrence of the migration.

In the multilayer capacitor C1, the internal electrode 7 and the auxiliary internal electrode 11 that are disposed in the same layer have a relationship in which the length from the reference plane PL1 to the internal electrode 7 is smaller than the length of the auxiliary internal electrode 11 from the reference plane PL1. The multilayer capacitor C1 can increase a length of the internal electrode 7 in the second direction D2. Therefore, the multilayer capacitor C1 can increase capacitance.

In the multilayer capacitor C1, the internal electrode 9 and the auxiliary internal electrode 13 that are disposed in the same layer have a relationship in which the length from the reference plane PL2 to the internal electrode 9 is smaller than the length of the auxiliary internal electrode 13 from the reference plane PL2. The multilayer capacitor C1 can increase a length of the internal electrode 9 in the second direction D2. Therefore, the multilayer capacitor C1 can increase capacitance.

In the multilayer capacitor C1, the internal electrode 7 and the second electrode layer E2 of the electrode portion 5*a* that are not electrically connected to each other have a relationship in which the length of the internal electrode 7 from the reference plane PL2 is larger than the length from the reference plane PL2 to the end edge E2$e_a$ of the second electrode layer E2 of the electrode portion 5*a* not electrically connected to the internal electrode 7. The multilayer capacitor C1 can increase a length of the internal electrode 7 in the second direction D2. Therefore, the multilayer capacitor C1 can increase capacitance.

In the multilayer capacitor C1, the internal electrode 9 and the second electrode layer E2 of the electrode portion 5*a* that are not electrically connected to each other have a relationship in which the length of the internal electrode 9 from the reference plane PL1 is larger than the length from the reference plane PL1 to the end edge E2$e_a$ of the second electrode layer E2 of the electrode portion 5*a* not electrically connected to the internal electrode 9. The multilayer capacitor C1 can increase a length of the internal electrode 9 in the second direction D2. Therefore, the multilayer capacitor C1 can increase capacitance.

In the multilayer capacitor C1, the internal electrode $\mathbf{7}_{OM}$ does not overlap the second electrode layer E2 of the electrode portion 5*c* not electrically connected to the internal electrode $\mathbf{7}_{OM}$ when viewed from the third direction D3. Therefore, electric field tends not to be generated between the internal electrode $\mathbf{7}_{OM}$ and the second electrode layer E2 of the electrode portion 5*c* that are not electrically connected to each other.

In the multilayer capacitor C1, the internal electrode $\mathbf{9}_{OM}$ does not overlap the second electrode layer E2 of the electrode portion 5*c* not electrically connected to the internal electrode $9_{OM}$ when viewed from the third direction D3. Therefore, electric field tends not to be generated between the internal electrode $9_{OM}$ and the second electrode layer E2 of the electrode portion 5*c* that are not electrically connected to each other.

Consequently, the multilayer capacitor C1 reduces the occurrence of migration even in a configuration in which the electrode portion 5*c* of the external electrode 5 includes the second electrode layer E2.

In the multilayer capacitor C1, when the second electrode layer E2 positioned on the end surface 3*e* and the end surface 3*e* are viewed from the second direction D2, the end surface 3*e* includes the region $3e_1$ covered with the second electrode layer E2 positioned on the end surface 3*e* and the region $3e_2$ exposed from the second electrode layer E2 positioned on the end surface 3*e*. The region $3e_2$ is closer to the main surface 3*b* than the region $3e_1$.

The multilayer capacitor C1 reduces ESR, as compared with a configuration in which the second electrode layer E2 covers the entire end surface 3*e*.

The second electrode layer E2 includes the plurality of silver particles. The silver particle tends to cause migration than, for example, copper particle.

The multilayer capacitor C1 reliably reduces the occurrence of the migration even in a configuration in which the second electrode layer E2 includes the plurality of silver particles.

Figure 7:
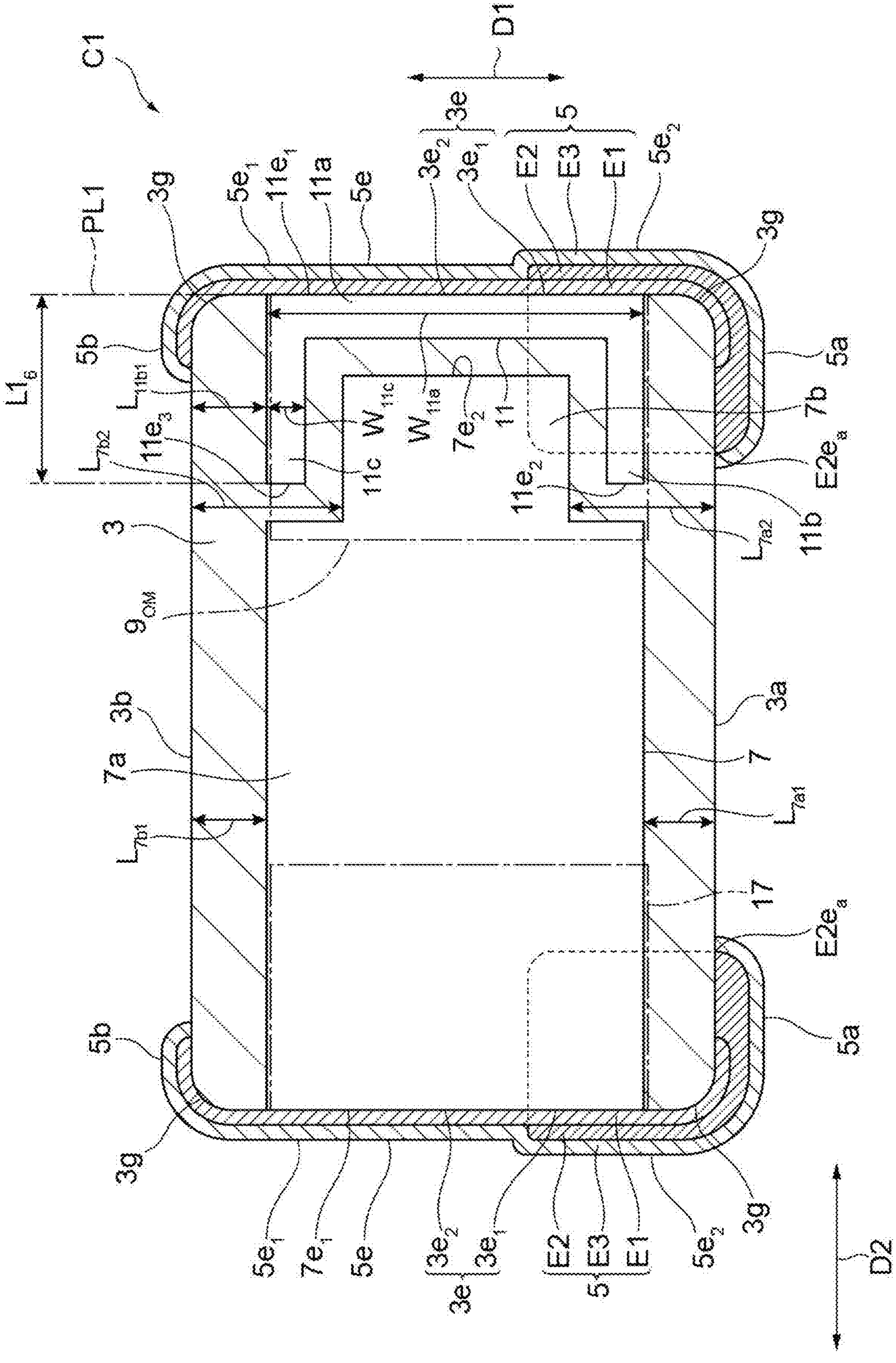
FIG. 7 is a view illustrating a cross-sectional configuration of a multilayer capacitor according to a modified example of the first example.
Figure 8:
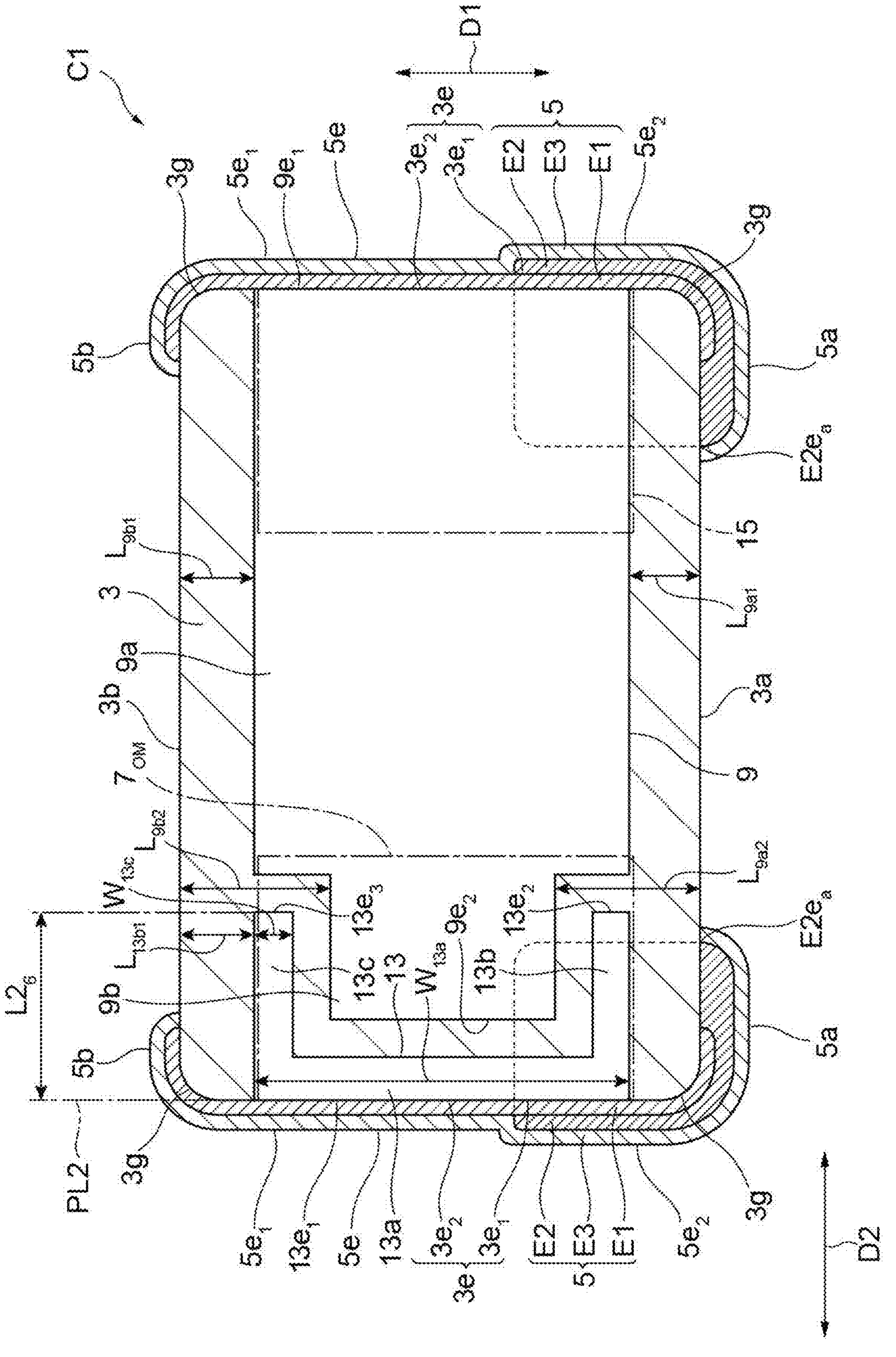
FIG. 8 is a view illustrating a cross-sectional configuration of the multilayer capacitor according to the modified example of the first example.

Next, a configuration of a multilayer capacitor according to a modified example of the first example will be described with reference to FIGS. 7 and 8. FIGS. 7 and 8 are views illustrating a cross-sectional configuration of a multilayer capacitor according to the modified example of the first example. The multilayer capacitor according to the modified example is generally similar to or the same as the above-described multilayer capacitor C1. However, the modified example is different from the above-described first example in a configuration of the internal electrodes 7 and 9 and the auxiliary internal electrodes 11 and 13. Hereinafter, differences between the above-described first example and the modified example will be mainly described.

In FIG. 7, the lengths $L1_1$, $L1_2$, $L1_3$, $L1_4$, and $L1_5$, the distance $L_{11a1}$, and the widths $W_{7a}$, $W_{7b}$, and $W_{11b}$ illustrated in FIG. 2 are omitted. The lengths $L1_1$, $L1_2$, $L1_3$, $L1_4$, and $L1_5$, the distance $L_{11a1}$, and the widths $W_{7a}$, $W_{7b}$, and $W_{11b}$ are defined in the same manner as in the above-described first example.

In FIG. 8, the lengths $L2_1$, $L2_2$, $L2_3$, $L2_4$, and $L2_5$, the distance $L_{13a1}$, and the widths $W_{9a}$, $W_{9b}$, and $W_{13b}$ illustrated in FIG. 3 are omitted. The lengths $L2_1$, $L2_2$, $L2_3$, $L2_4$, and $L2_5$, the distance $L_{13a1}$, and the widths $W_{9a}$, $W_{9b}$, and $W_{13b}$ are defined in the same manner as in the above-described first example.

As illustrated in FIG. 7, the distance $L_{7b2}$ is larger than the distance $L_{7b1}$. The electrode portion 7*b* is farther from the main surface 3*b* in the first direction D1 than the electrode portion 7*a*. The distance $L_{7b2}$ is, for example, substantially equal to the distance $L_{7a2}$. The distance $L_{7b2}$ may be different from the distance $L_{7a2}$.

As illustrated in FIG. 8, the distance $L_{9b2}$ is larger than the distance $L_{9b1}$. The electrode portion 9*b* is farther from the main surface 3*b* in the first direction D1 than the electrode portion 9*a*. The distance $L_{9b2}$ is, for example, substantially equal to the distance $L_{9a2}$. The distance $L_{9b2}$ may be different from the distance $L_{9a2}$.

As illustrated in FIG. 7, the auxiliary internal electrode 11 includes an electrode portion 11*c*. The electrode portion 11*c* and the electrode portion 11*b* are separated from each other in the first direction D1. The electrode portion 11*c* is positioned between the internal electrode 7 positioned in the same layer and the main surface 3*b*. The electrode portion 11*c* is positioned between the main surface 3*b* and the electrode portion 7*b* included in the internal electrode 7 positioned in the same layer, in the first direction D1. The electrode portion 7*b* is positioned between the electrode portion 11*c* and the electrode portion 11*b*, in the first direction D1. The electrode portion 7*b* and the electrode portion 11*c* that are positioned in the same layer are separated from each other in the first direction D1. The electrode portion 7*a* and the electrode portion 11*c* that are positioned in the same layer are separated from each other in the second direction D2.

The electrode portion 11*c* has a width $W_{11c}$. The width $W_{11c}$ is, for example, a length of the electrode portion 11*c* in the first direction D1. The width $W_{11a}$ is greater than the width $W_{11c}$. The width $W_{11c}$ is substantially equal to the width $W_{11b}$, for example. The width $W_{11c}$ may be different from the width $W_{11b}$.

The electrode portion 11*c* is separated from the main surface 3*b* by a distance $L_{11b1}$. The distance $L_{11b1}$ includes, for example, a length in the first direction D1 between the electrode portion 11*c* and the main surface 3*b*. The distance $L_{11b1}$ may be equal to the distance $L_{7b1}$ or may be different from the distance $L_{7b1}$.

The electrode portion 11*c* includes an end $11e_3$ opposing the end $11e_1$ in the second direction D2. The end $11e_3$ is positioned in the element body 3. The end $11e_3$ is closer to the end surface 3*e* to which the internal electrode 7 is exposed than the end $11e_1$.

A length $L1_6$ from the reference plane PL1 to the end $11e_3$ is substantially equal to the length $L1_1$, for example. The length $L1_6$ may be different from the length $L1_1$. The length $L1_6$ is, for example, greater than the length $L1_2$.

As illustrated in FIG. 8, the auxiliary internal electrode 13 includes an electrode portion 13*c*. The electrode portion 13*c* and the electrode portion 13*b* are separated from each other in the first direction D1. The electrode portion 13*c* is positioned between the internal electrode 9 positioned in the same layer and the main surface 3*b*. The electrode portion 13*c* is positioned between the main surface 3*b* and the electrode portion 9*b* included in the internal electrode 9 positioned in the same layer, in the first direction D1. The electrode portion 9*b* is positioned between the electrode portion 13*c* and the electrode portion 13*b*, in the first direction D1. The electrode portion 9*b* and the electrode portion 13*c* that are positioned in the same layer are separated from each other in the first direction D1. The electrode portion 9*a* and the electrode portion 13*c* that are positioned in the same layer are separated from each other in the second direction D2.

The electrode portion 13*c* has a width $W_{13c}$. The width $W_{13c}$ is, for example, a length of the electrode portion 13*c* in the first direction D1. The width $W_{13a}$ is greater than the width $W_{13c}$. The width $W_{13c}$ is substantially equal to the width $W_{13b}$, for example. The width $W_{13c}$ may be different from the width $W_{13b}$.

The electrode portion 13*c* is separated from the main surface 3*b* by a distance $L_{13b1}$. The distance $L_{13b1}$ includes, for example, a length in the first direction D1 between the electrode portion 13*c* and the main surface 3*b*. The distance $L_{13b1}$ may be equal to the distance $L_{9b1}$ or may be different from the distance $L_{9b1}$.

The electrode portion 13*c* includes an end $13e_3$ opposing the end $13e_1$ in the second direction D2. The end $13e_3$ is positioned in the element body 3. The end 13$e_3$ is closer to the end surface 3*e* to which the internal electrode 9 is exposed than the end 13$e_1$.

A length L2$_6$ from the reference plane PL2 to the end 13$e_3$ is substantially equal to the length L2$_1$, for example. The length L2$_6$ may be different from the length L2$_1$. The length L2$_6$ is, for example, greater than the length L2$_2$.

In this modification, the element body 3 has no directionality in the first direction D1 at forming the external electrode 5 on the element body 3. That is, the external electrode 5 (second electrode layer E2) may be formed on the element body 3 so that the main surface 3*a* constitutes the mounting surface, or may be formed on the element body 3 so that the main surface 3*b* constitutes the mounting surface. The second electrode layer E2 is formed to continuously cover only a part of the main surface 3*b*, only a part of the end surface 3*e*, and only a part of each of the pair of side surfaces 3*c* at forming the external electrode 5 on the element body 3 so that the main surface 3*b* constitutes the mounting surface.

The multilayer capacitor C1 reduces occurrence of migration even in a configuration in which the external electrode 5 (second electrode layer E2) is formed on the element body 3 so that the main surface 3*b* constitutes the mounting surface.

Second Example

Figure 9:
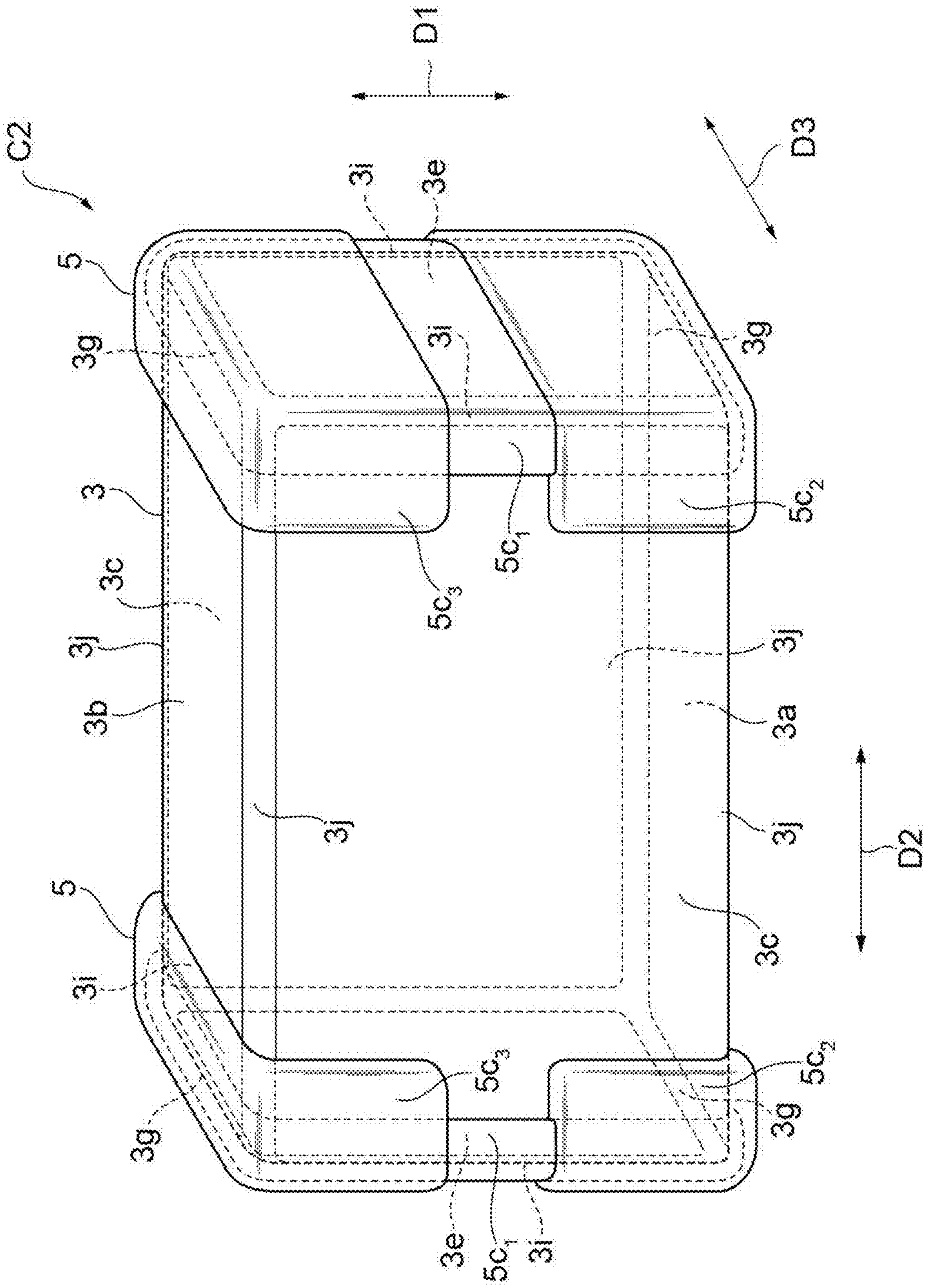
FIG. 9 is a perspective view of a multilayer capacitor according to a second example.

A configuration of a multilayer capacitor C2 according to the second example will be described with reference to FIGS. 9 to 13. FIG. 9 is a perspective view of a multilayer capacitor according to the second example. FIGS. 10, 11, 12, and 13 are views illustrating a cross-sectional configuration of the multilayer capacitor according to the second example. The multilayer capacitor C2 is generally similar to or the same as the above-described modified example of the first example. However, the multilayer capacitor C2 is different from the above-described modified example of the first example in a configuration of the external electrodes 5. Hereinafter, differences between the multilayer capacitor C1 according to the first example and modified example of the first example and the multilayer capacitor C2 will be mainly described.

Also in the second example, an electronic component includes, for example, the multilayer capacitor C2.

Figure 10:
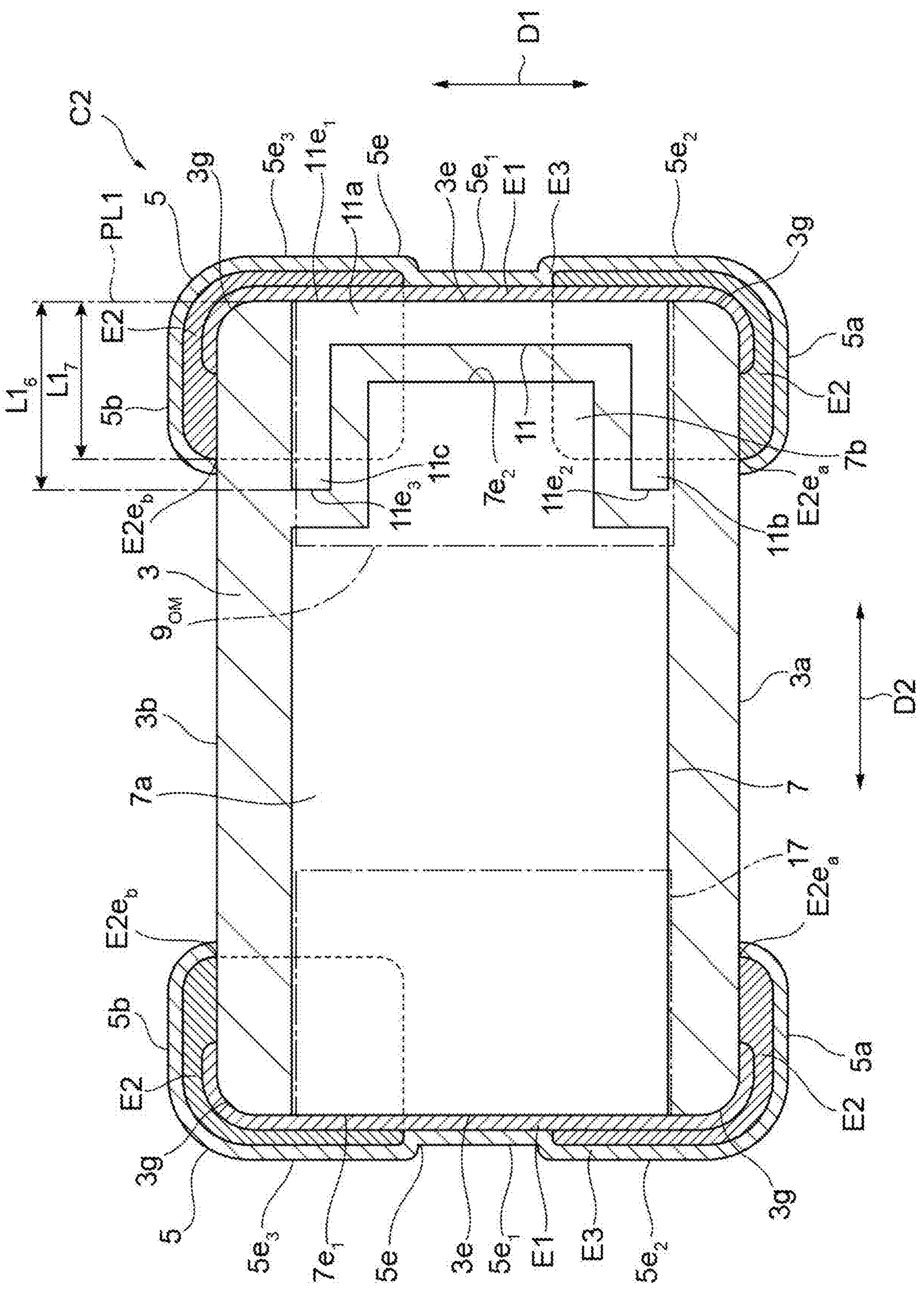
FIG. 10 is a view illustrating a cross-sectional configuration of the multilayer capacitor according to the second example.

In FIG. 10, the lengths L1$_1$, L1$_2$, L1$_3$, L1$_4$, and L1$_5$, the distances $L_{7a1}$, $L_{7a2}$, $L_{7b1}$, $L_{7b2}$, $L_{11a1}$, and $L_{11b1}$, and the widths $W_{7a}$, $W_{7b}$, $W_{11a}$, $W_{11b}$, and $W_{11c}$ illustrated in FIGS. 2 and 7 are omitted. The lengths L1$_1$, L1$_2$, L1$_3$, L1$_4$, and L1$_5$, the distances $L_{7a1}$, $L_{7a2}$, $L_{7b1}$, $L_{7b2}$, $L_{11a1}$, and $L_{11b1}$, and the widths $W_{7a}$, $W_{7b}$, $W_{11a}$, $W_{11b}$, and $W_{11c}$ are defined in the same manner as in the first example and the modified example of the first example.

Figure 11:
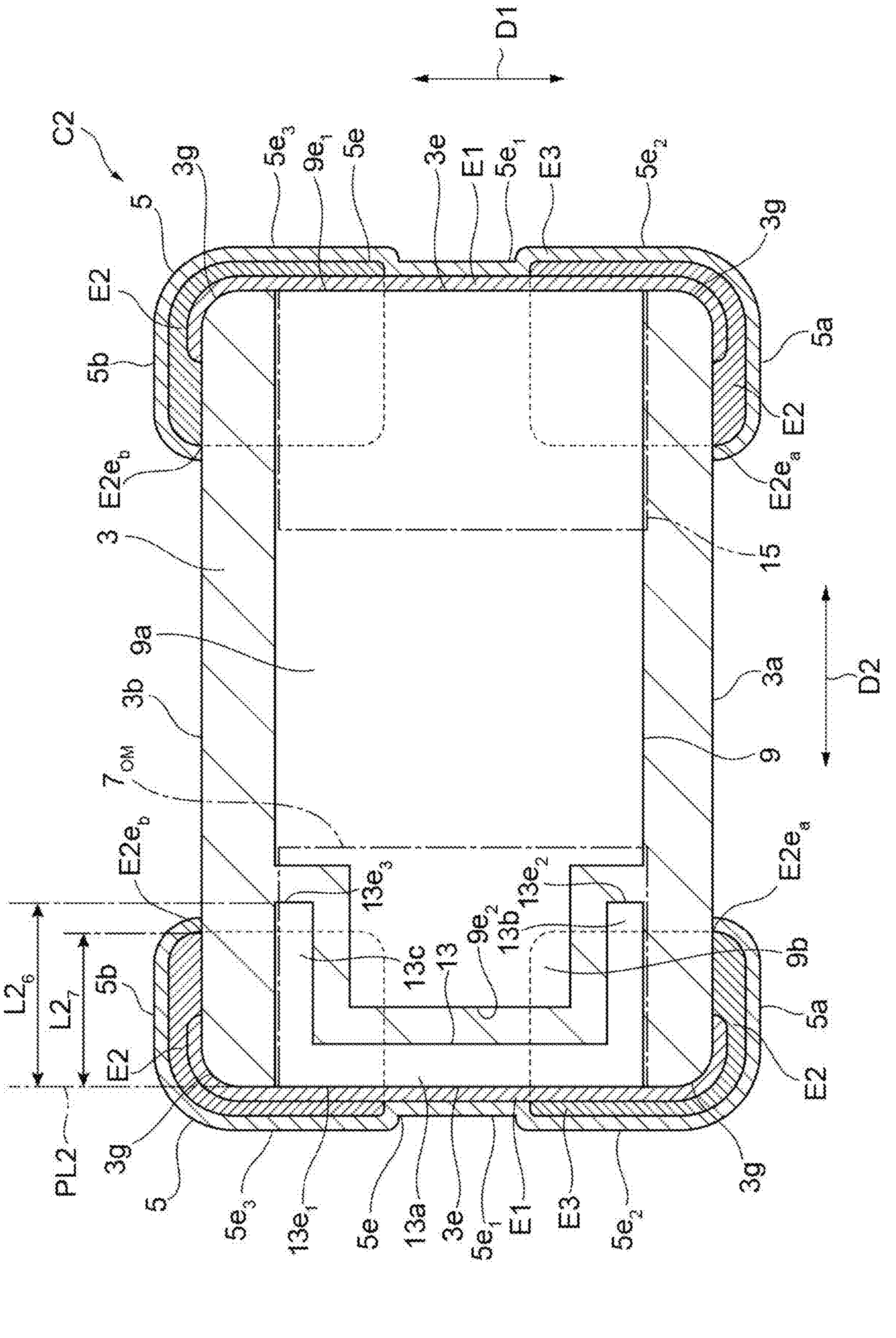
FIG. 11 is a view illustrating a cross-sectional configuration of the multilayer capacitor according to the second example.
Figure 12:
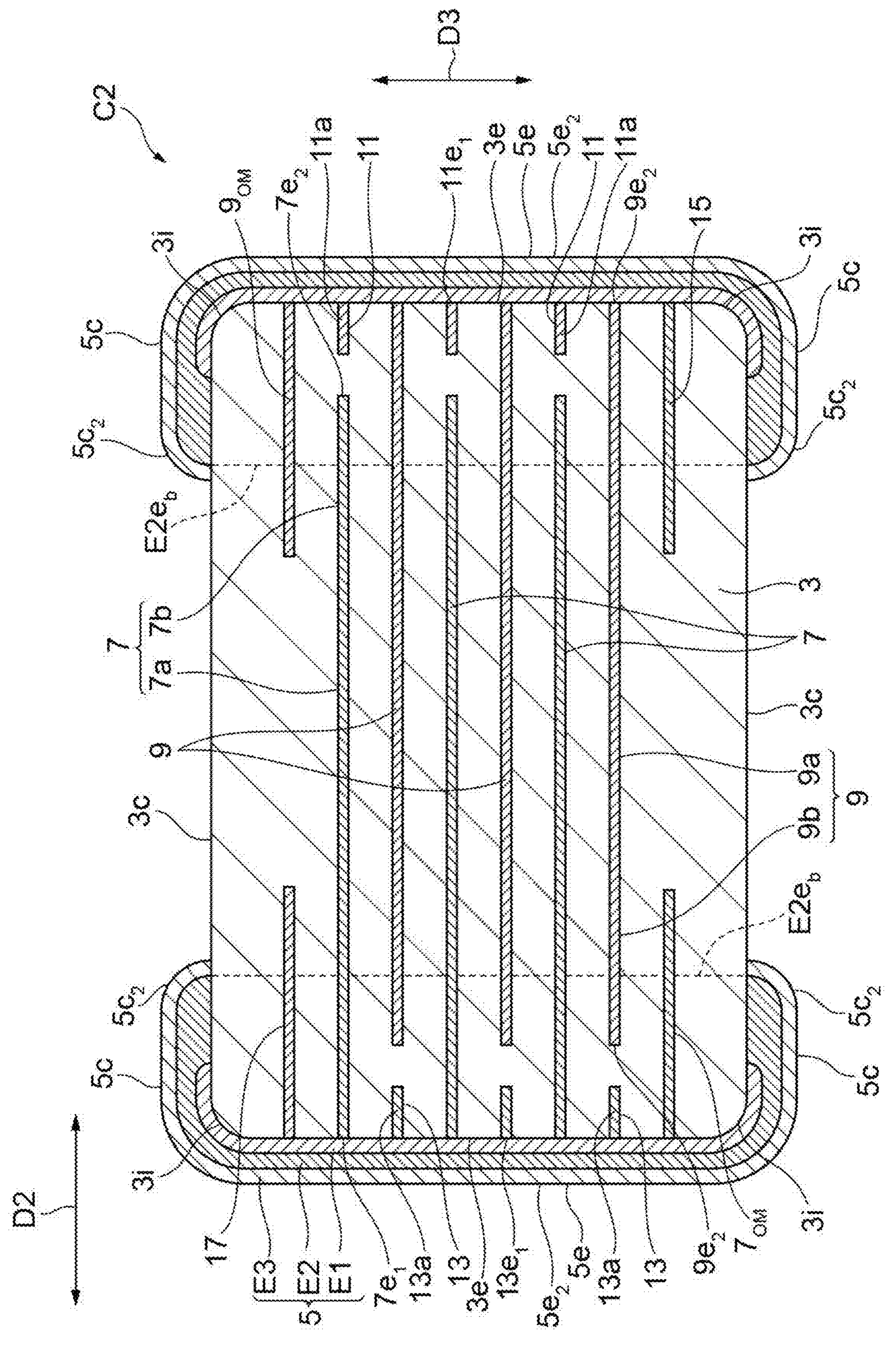
FIG. 12 is a view illustrating a cross-sectional configuration of the multilayer capacitor according to the second example.
Figure 13:
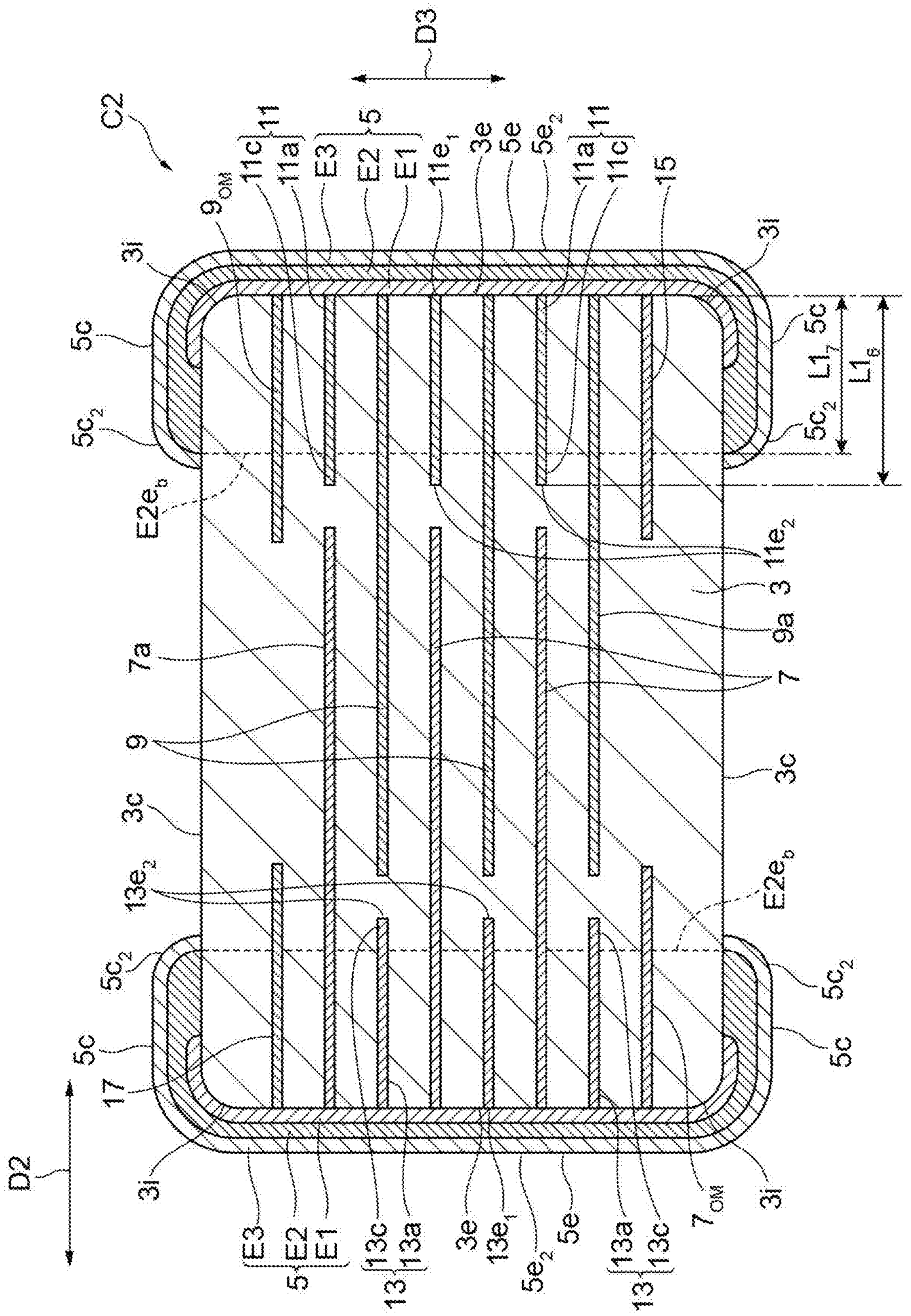
FIG. 13 is a view illustrating a cross-sectional configuration of the multilayer capacitor according to the second example.

In FIG. 11, the lengths L2$_1$, L2$_2$, L2$_3$, L2$_4$, and L2$_5$, the distances $L_{9a1}$, $L_{9a2}$, $L_{9b1}$, $L_{9b2}$, $L_{13a1}$, and $L_{13b1}$, and the widths $W_{9a}$, $W_{9b}$, $W_{13a}$, $W_{13b}$, and $W_{13c}$ illustrated in FIGS. 3 and 8 are omitted. The lengths L2$_1$, L2$_2$, L2$_3$, L2$_4$, and L2$_5$, the distances $L_{9a1}$, $L_{9a2}$, $L_{9b1}$, $L_{9b2}$, $L_{13a1}$, and $L_{13b1}$, and the widths $W_{9a}$, $W_{9b}$, $W_{13a}$, $W_{13b}$, and $W_{13c}$ are defined in the same manner as in the first example and the modified example of the first example.

As with the multilayer capacitor C1, the multilayer capacitor C2 includes the element body 3 of a rectangular parallelepiped shape, the plurality of external electrodes 5, the plurality of internal electrodes 7, the plurality of internal electrodes 9, the plurality of auxiliary internal electrodes 11, the plurality of auxiliary internal electrodes 13, and the plurality of conductors 15 and 17. In the multilayer capacitor C2, the main surface 3*a* or the main surface 3*b* is arranged to constitute a mounting surface.

The external electrode 5 includes the plurality of electrode portions 5*a*, 5*b*, 5*c*, and 5*e*. Each of the electrode portions 5*a*, 5*c*, and 5*e* includes the first electrode layer E1, the second electrode layer E2, and the third electrode layer E3. In the multilayer capacitor C2, each electrode portion 5*b* also includes the first electrode layer E1, the second electrode layer E2, and the third electrode layer E3.

The second electrode layer E2 of the electrode portion 5*b* is disposed on both the first electrode layer E1 and the main surface 3*b*. The second electrode layer E2 of the electrode portion 5*b* is formed on the first electrode layer E1 to cover the first electrode layer E1 of the electrode portion 5*b*, and is formed on the main surface 3*b* to cover a part of the main surface 3*b*. The second electrode layer E2 of the electrode portion 5*b* is in contact with substantially the entire first electrode layer E1 and the above-described part of the main surface 3*b*. In the electrode portion 5*b*, the second electrode layer E2 is in direct contact with the first electrode layer E1 and the main surface 3*b*. In the electrode portion 5*b*, the second electrode layer E2 indirectly covers the main surface 3*b* such that the first electrode layer E1 is positioned between the second electrode layer E2 and the main surface 3*b*. The second electrode layer E2 of the electrode portion 5*b* is positioned on the main surface 3*b*. The second electrode layer E2 of the electrode portion 5*b* includes an end edge E2$e_b$ positioned on the main surface 3*b*.

The third electrode layer E3 of the electrode portion 5*b* is disposed on the second electrode layer E2. In the electrode portion 5*b*, the third electrode layer E3 covers the second electrode layer E2. In the electrode portion 5*b*, the third electrode layer E3 is in contact with the second electrode layer E2. In the electrode portion 5*b*, the third electrode layer E3 is in direct contact with the second electrode layer E2. In the electrode portion 5*b*, the third electrode layer E3 is not in direct contact with the first electrode layer E1. The third electrode layer E3 of the electrode portion 5*b* is positioned on the main surface 3*b*.

In the electrode portion 5*c*, the second electrode layer E2 is formed to cover the above-described part of the first electrode layer E1 and the above-described part of the side surface 3*c* and to cover an other part of the first electrode layer E1 and an other part of the side surface 3*c*. In the electrode portion 5*c*, the second electrode layer E2 is in direct contact with the above-described other part of the first electrode layer E1 and the above-described other part of the side surface 3*c*. The second electrode layer E2 of the electrode portion 5*c* covers the above-described other part of the first electrode layer E1 of the electrode portion 5*c*. One region included in the side surface 3*c* and covered with the second electrode layer E2 is positioned closer to the main surface 3*a* and the end surface 3*e*, and an other region included in the side surface 3*c* and covered with the second electrode layer E2 is positioned closer to the main surface 3*b* and the end surface 3*e*, for example. In the electrode portion 5*c*, the second electrode layer E2 indirectly covers the above-described other part of the side surface 3*c* such that the first electrode layer E1 is positioned between the second electrode layer E2 and the side surface 3*c*. The first electrode layer E1 of the electrode portion 5*c* is covered with the second electrode layer E2 in the above-described part and the above-described other part, and is exposed from the second electrode layer E2 in the remaining part excluding the above-described part and the above-described other part.

As illustrated in FIG. 9, the electrode portion 5*c* includes a plurality of regions $5c_1$, $5c_2$, and 5*c*3. For example, the electrode portion 5*c* includes only three regions $5c_1$, $5c_2$, and $5c_3$. The region $5c_3$ is positioned closer to the main surface 3*b* than the region $5c_1$. The region $5C_3$ includes the first electrode layer E1, the second electrode layer E2, and the third electrode layer E3. The region $5c_3$ includes a region where the first electrode layer E1 is covered with the second electrode layer E2. In the first direction D1, the region $5c_1$ is positioned between the region $5c_2$ and the region $5c_3$.

In the electrode portion 5*e*, the second electrode layer E2 is formed to cover the above-described part of the first electrode layer E1, and covers an other part of the first electrode layer E1. In the electrode portion 5*e*, the second electrode layer E2 is in direct contact with the above-described other part of the first electrode layer E1. The second electrode layer E2 of the electrode portion 5*e* covers the above-described other part of the first electrode layer E1 of the electrode portion 5*c*. In the electrode portion 5*e*, the second electrode layer E2 indirectly covers an other part of the end surface 3*e* such that the first electrode layer E1 is positioned between the second electrode layer E2 and the end surface 3*e*. For example, the above-described other part of the end surface 3*e* is positioned closer to the main surface 3*b*, in the end surface 3*e*. The first electrode layer E1 of the electrode portion 5*e* is covered with the second electrode layer E2 in the above-described part and the above-described other part, and is exposed from the second electrode layer E2 in the remaining part excluding the above-described part and the above-described other part.

The electrode portion 5*e* includes a plurality of regions $5e_1$, $5e_2$, and $5e_3$. For example, the electrode portion 5*e* includes only three regions $5e_1$, $5e_2$, and $5e_3$. The region $5e_3$ is positioned closer to the main surface 3*b* than the region $5e_1$. The region $5e_3$ includes the first electrode layer E1, the second electrode layer E2, and the third electrode layer E3. The region $5e_3$ includes a region where the first electrode layer E1 is covered with the second electrode layer E2. In the first direction D1, the region $5e_1$ is positioned between the region $5e_2$ and the region $5e_3$.

In the multilayer capacitor C2, the second electrode layer E2 continuously covers only a part of the main surface 3*a*, only a part of the end surface 3*e*, and only a part of each of the pair of side surfaces 3*c*, and continuously covers only a part of the main surface 3*b*, only an other part of the end surface 3*e*, and only an other part of each of the pair of side surfaces 3*c*. The second electrode layer E2 includes a first portion disposed to continuously cover only a part of the main surface 3*a*, only a part of the end surface 3*e*, and only a part of each of the pair of side surfaces 3*c*, and a second portion disposed to continuously cover only a part of the main surface 3*b*, only an other part of the end surface 3*e*, and only an other part of each of the pair of side surfaces 3*c*. The above-described part of the end surface 3*e* is positioned closer to the main surface 3*a*. The above-described part of each side surface 3*c* is positioned closer to the main surface 3*a*. The above-described other part of the end surface 3*e* is positioned closer to the main surface 3*b*. The above-described other part of each side surface 3*c* is positioned closer to the main surface 3*b*. The second electrode layer E2 covers the whole of one ridge portion 3*g*, only a part of the ridge portion 3*i*, and only a part of the ridge portion 3*j*, and covers the whole of an other ridge portion 3*g*, only an other part of the ridge portion 3*i*, and only an other part of the ridge portion 3*j*.

Figure 14:
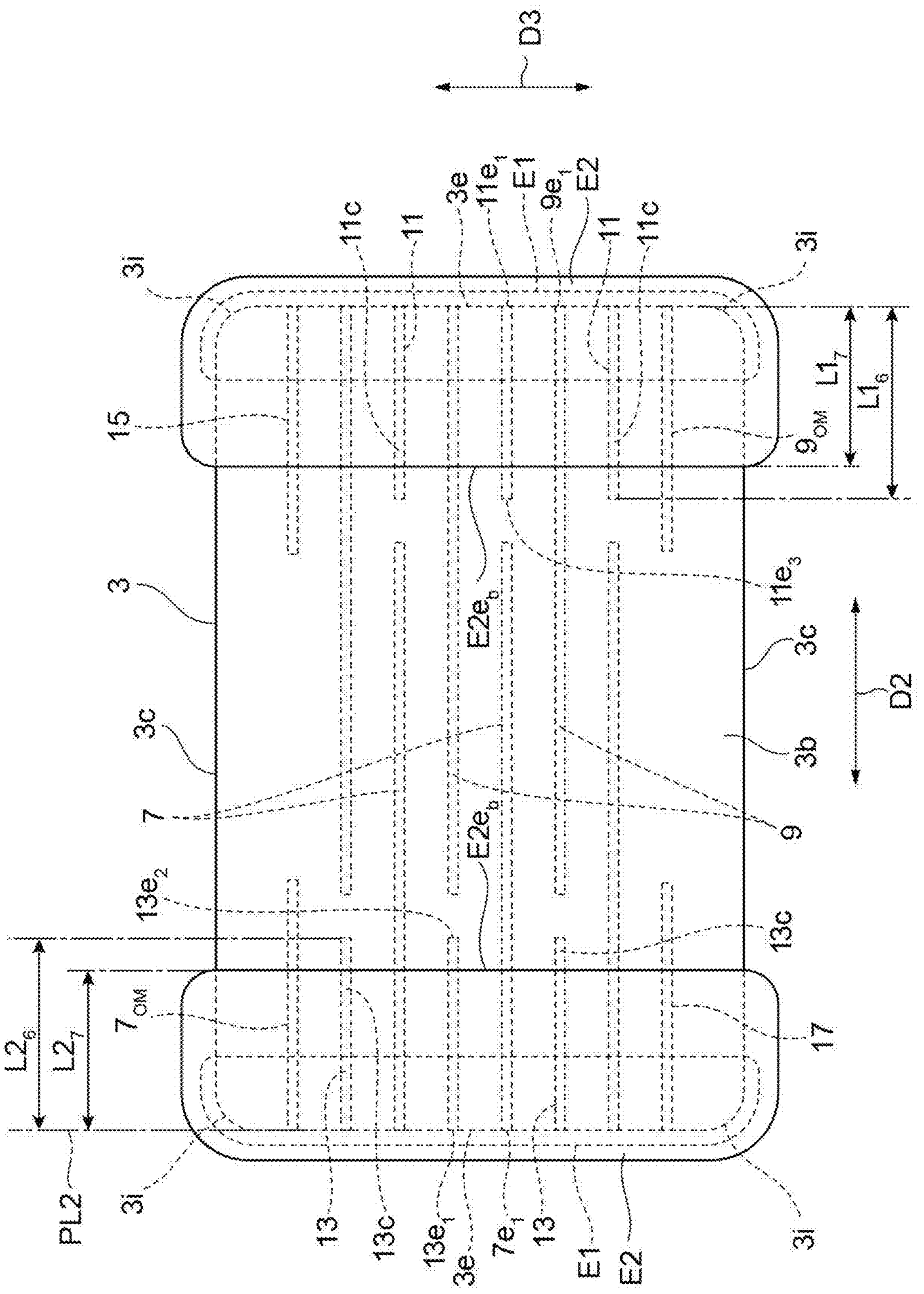
FIG. 14 is a view illustrating a relationship among an internal electrode, an auxiliary internal electrode, and a second electrode layer.

As illustrated in FIG. 10, the auxiliary internal electrode 11 and the second electrode layer 5*b* of the electrode portion E2 that are electrically connected to each other have a relationship in which the length $L1_6$ is larger than a length $L1_7$ from the reference surface PL1 to the edge $E2e_b$. The length $L1_6$ may be a maximum length of the auxiliary internal electrodes 11 in the second direction D2. As illustrated in FIG. 14, when the auxiliary internal electrode 11 and the second electrode layer E2 of the electrode portion 5*b* electrically connected to the auxiliary internal electrode 11 are viewed from the first direction D1, the electrode portion 11*c* includes a portion exposed from the second electrode layer E2 of the electrode portion 5*b* electrically connected to the auxiliary internal electrode 11. FIG. 14 is a view illustrating a relationship among an internal electrode, an auxiliary internal electrode, and a second electrode layer.

Also in the multilayer capacitor C2, the internal electrode 7 and the auxiliary internal electrode 11 that are disposed in the same layer have a relationship in which a length of the auxiliary internal electrode 11 from the reference plane PL1 is larger than a length from the reference plane PL1 to the internal electrode 7. The length of the auxiliary internal electrode 11 from the reference plane PL1 may be defined by, for example, the length $L1_6$.

The internal electrode 7 and the second electrode layer E2 of the electrode portion 5*b* that are not electrically connected to each other have a relationship in which a length of the internal electrode 7 from a reference plane PL2 is larger than a length from the reference plane PL2 to the and edge $E2e_b$ of the second electrode layer E2 of the electrode portion 5*b* that is not electrically connected to the internal electrode 7. The length from the reference plane PL2 to the above-described end edge $E2e_b$ is defined by, for example, a length from the reference plane PL2 to the above-described end edge $E2e_b$ in the second direction D2.

As illustrated in FIG. 11, the auxiliary internal electrode 13 and the second electrode layer E2 of the electrode portion 5*b* that are electrically connected to each other have a relationship in which the length $L1_6$ is larger than a length $L1_7$ from the reference surface PL2 to the end edge $E2e_b$. The length $L1_6$ may include a maximum length of the auxiliary internal electrode 13 in the second direction D2. As illustrated in FIG. 14, when the auxiliary internal electrode 13 and the second electrode layer E2 of the electrode portion 5*b* electrically connected to the auxiliary internal electrode 13 are viewed from the first direction D1, the electrode portion 11*c* includes a portion exposed from the second electrode layer E2 of the electrode portion 5*b* electrically connected to the auxiliary internal electrode 13.

Also in the multilayer capacitor C2, the internal electrode 9 and the auxiliary internal electrode 13 that are disposed in the same layer have a relationship in which a length of the auxiliary internal electrode 13 from the reference plane PL2 is larger than a length from the reference plane PL2 to the internal electrode 9. The length of the auxiliary internal electrode 13 from the reference plane PL2 may be defined by, for example, the length $L2_6$.

The internal electrode 9 and the second electrode layer E2 of the electrode portion 5*b* that are not electrically connected to each other have a relationship in which a length of the internal electrode 9 from a reference plane PL1 is larger than a length from the reference plane PL1 to the and edge $E2e_b$ of the second electrode layer E2 of the electrode portion 5*b* that is not electrically connected to the internal electrode 9. The length from the reference plane PL1 to the above-described end edge $E2e_b$ is defined by, for example, a length from the reference plane PL1 to the above-described end edge $E2e_b$ in the second direction D2.

In the multilayer capacitor C2, the electrode portion 11$c$ is positioned between the second electrode layer E2 included in the electrode portion 5$b$ of the external electrode 5 to which the auxiliary internal electrode 11 is electrically connected and the internal electrode 7 in the same layer as the auxiliary internal electrode 11. The electrode portion 11$c$ is positioned between the second electrode layer E2 of the electrode portion 5$b$ and the internal electrode 7 that are not electrically connected to each other. Therefore, electric field tends not to be generated between the second electrode layer E2 of the electrode portion 5$b$ and the internal electrode 7 that are not electrically connected to each other.

In the multilayer capacitor C2, the electrode portion 13$c$ is positioned between the second electrode layer E2 included in the electrode portion 5$b$ of the external electrode 5 to which the auxiliary internal electrode 13 is electrically connected and the internal electrode 9 in the same layer as the auxiliary internal electrode 13. The electrode portion 13$c$ is positioned between the second electrode layer E2 of the electrode portion 5$b$ and the internal electrode 9 that are not electrically connected to each other. Therefore, electric field tends not to be generated between the second electrode layer E2 of the electrode portion 5$b$ and the internal electrode 9 that are not electrically connected to each other.

Consequently, the multilayer capacitor C2 reduces occurrence of migration.

In the multilayer capacitor C2, the electrode portion 11$c$ is positioned between the second electrode layer E2 of the electrode portion 5$b$ to which the internal electrode 7 is not electrically connected and the electrode portion 7$b$. Therefore, the multilayer capacitor C2 prevents a decrease in an area of the internal electrode 7.

In the multilayer capacitor C2, the electrode portion 13$c$ is positioned between the second electrode layer E2 of the electrode portion 5$b$ to which the internal electrode 9 is not electrically connected and the electrode portion 9$b$. Therefore, the multilayer capacitor C2 prevents a decrease in an area of the internal electrode 9.

In the multilayer capacitor C2, the auxiliary internal electrode 11 and the second electrode layer E2 of the electrode portion 5$b$ that are electrically connected to each other have a relationship in which the length $L1_6$ from the reference plane PL1 to the end 11$e_3$ is larger than the length $L1_7$ from the reference plane PL1 to the end edge E2$e_b$. Therefore, the electric field tends not to be reliably generated between the second electrode layer E2 of the electrode portion 5$b$ and the internal electrode 7 that are not electrically connected to each other.

In the multilayer capacitor C2, the auxiliary internal electrode 13 and the second electrode layer E2 of the electrode portion 5$b$ that are electrically connected to each other have a relationship in which the length $L2_6$ from the reference plane PL2 to the end 13$e_3$ is larger than the length $L2_7$ from the reference plane PL2 to the end edge E2$e_b$. Therefore, the electric field tends not to be reliably generated between the second electrode layer E2 of the electrode portion 5$b$ and the internal electrode 9 that are not electrically connected to each other.

Consequently, the multilayer capacitor C2 reliably reduces the occurrence of the migration.

In the multilayer capacitor C2, when the auxiliary internal electrode 11 and the second electrode layer E2 of the electrode portion 5$b$ electrically connected to the auxiliary internal electrode 11 are viewed from the first direction D1, the electrode portion 11$c$ includes the portion exposed from the second electrode layer E2 of the electrode portion 5$b$ electrically connected to the auxiliary internal electrode 11. Therefore, the electric field tends not to be reliably generated between the second electrode layer E2 of the electrode portion 5$b$ and the internal electrode 7 that are not electrically connected to each other.

In the multilayer capacitor C2, when the auxiliary internal electrode 13 and the second electrode layer E2 of the electrode portion 5$b$ electrically connected to the auxiliary internal electrode 13 are viewed from the first direction D1, the electrode portion 13$c$ includes the portion exposed from the second electrode layer E2 of the electrode portion 5$b$ electrically connected to the auxiliary internal electrode 13. Therefore, the electric field tends not to be reliably generated between the second electrode layer E2 of the electrode portion 5$b$ and the internal electrode 9 that are not electrically connected to each other.

Consequently, the multilayer capacitor C2 reliably reduces the occurrence of the migration.

Also in the multilayer capacitor C2, the internal electrode 7 and the auxiliary internal electrode 11 that are disposed in the same layer have a relationship in which the length of the auxiliary internal electrode 11 from the reference plane PL1 is larger than the length from the reference plane PL1 to the internal electrode 7.

Also in the multilayer capacitor C2, the internal electrode 9 and the auxiliary internal electrode 13 that are disposed in the same layer have a relationship in which the length of the auxiliary internal electrode 13 from the reference plane PL2 is larger than the length from the reference plane PL2 to the internal electrode 9.

Therefore, the multilayer capacitor C2 reliably reduces the occurrence of the migration.

Also in the multilayer capacitor C2, the internal electrode 7 and the auxiliary internal electrode 11 that are disposed in the same layer have a relationship in which the length from the reference plane PL1 to the internal electrode 7 is smaller than the length of the auxiliary internal electrode 11 from the reference plane PL1. Therefore, the multilayer capacitor C2 can increase capacitance.

Also in the multilayer capacitor C2, the internal electrode 9 and the auxiliary internal electrode 13 that are disposed in the same layer have a relationship in which the length from the reference plane PL2 to the internal electrode 9 is smaller than the length of the auxiliary internal electrode 13 from the reference plane PL2. Therefore, the multilayer capacitor C2 can increase capacitance.

In the multilayer capacitor C2, the internal electrode 7 and the second electrode layer E2 of the electrode portion 5$b$ that are not electrically connected to each other have a relationship in which the length of the internal electrode 7 from the reference plane PL2 is larger than the length from the reference plane PL2 to the end edge E2$e_b$ of the second electrode layer E2 of the electrode portion 5$b$ not electrically connected to the internal electrode 7. The multilayer capacitor C2 can increase a length of the internal electrode 7 in the second direction D2. Therefore, the multilayer capacitor C2 can increase capacitance.

In the multilayer capacitor C2, the internal electrode 9 and the second electrode layer E2 of the electrode portion 5$b$ that are not electrically connected to each other have a relationship in which the length of the internal electrode 9 from the reference plane PL1 is larger than the length from the reference plane PL1 to the end edge E2$e_b$ of the second electrode layer E2 of the electrode portion 5$b$ not electrically connected to the internal electrode 9. The multilayer capacitor C2 can increase a length of the internal electrode 9 in the second direction D2. Therefore, the multilayer capacitor C2 can increase capacitance.

Third Example

Figure 15:
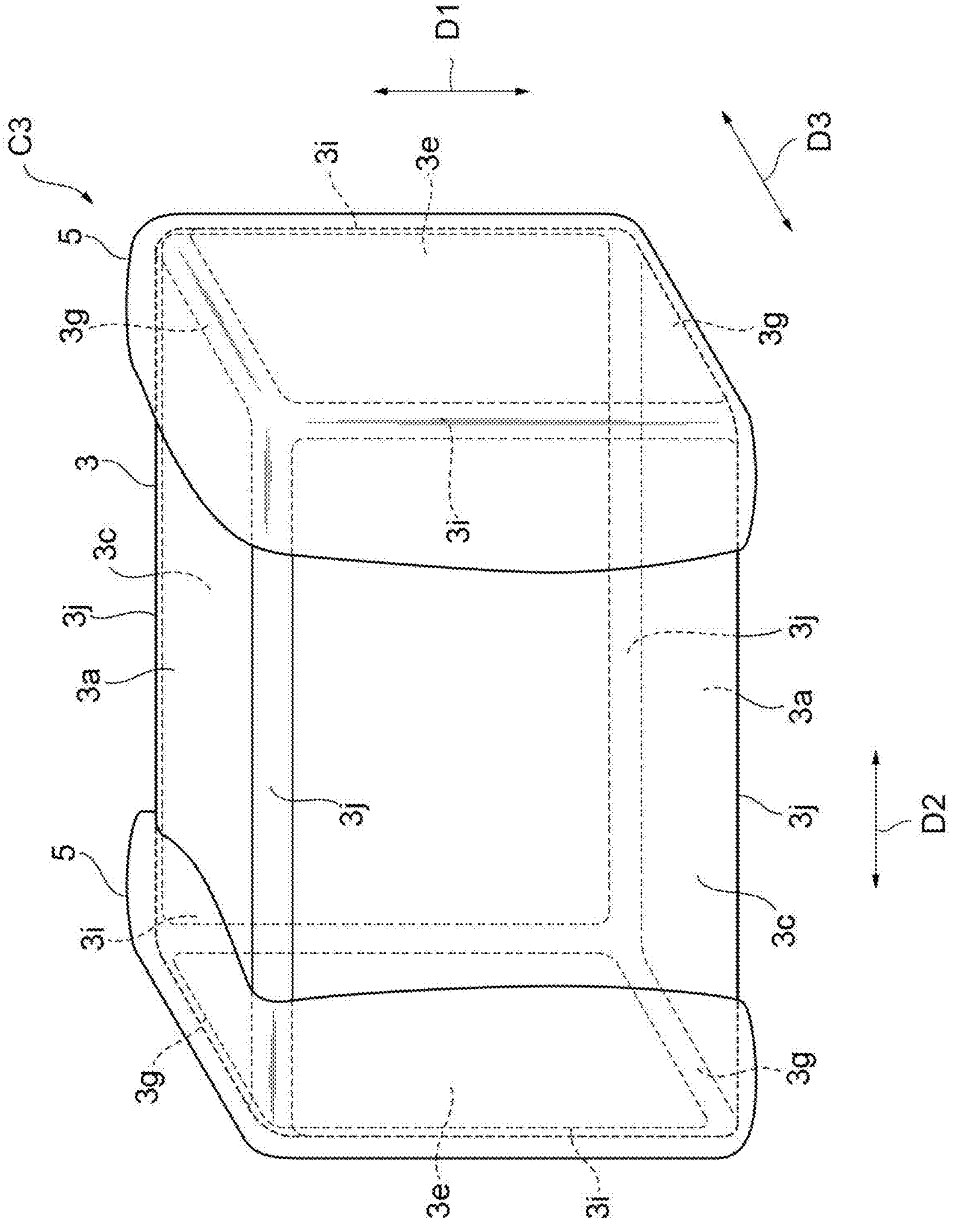
FIG. 15 is a perspective view of a multilayer capacitor according to a third example.
Figure 16:
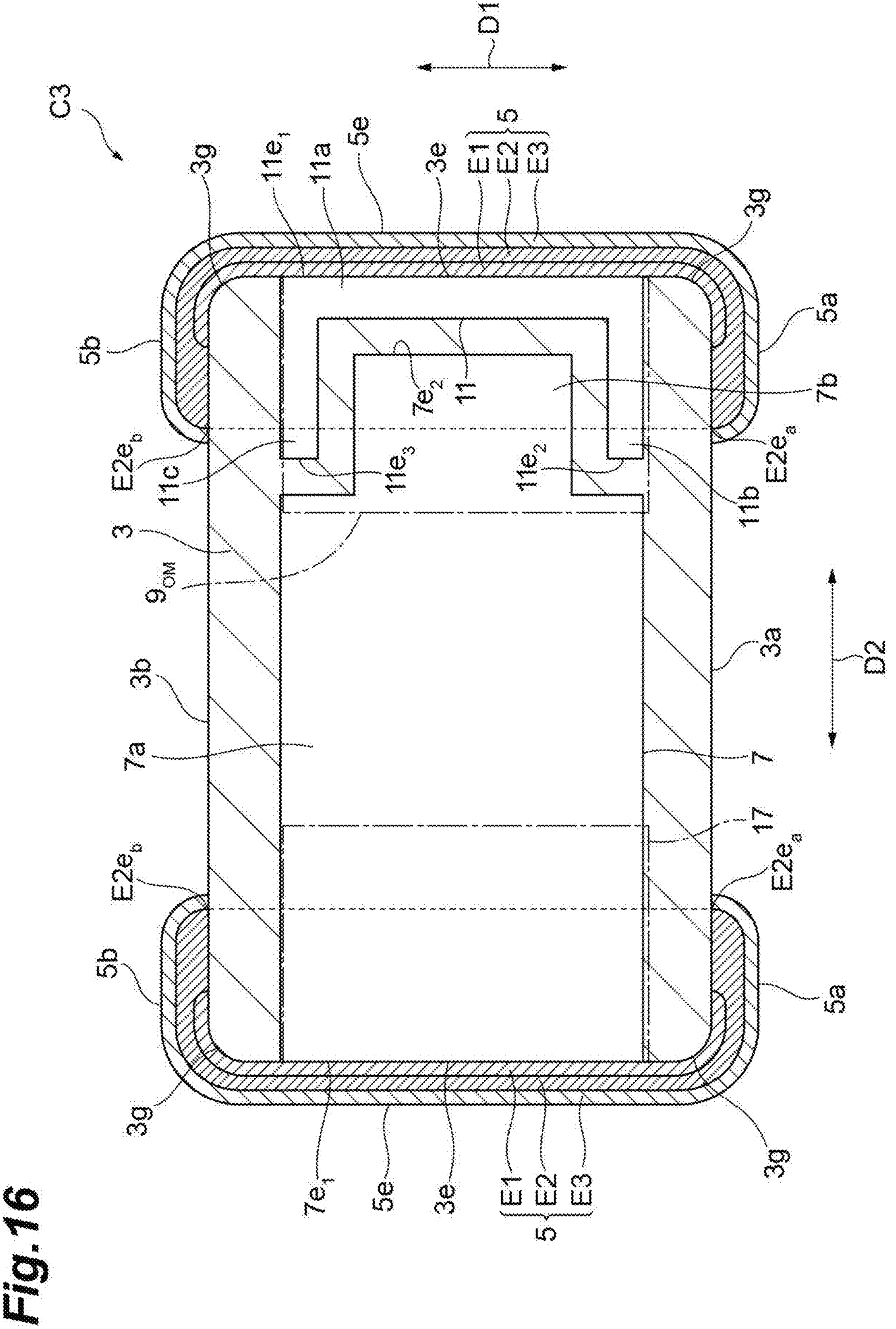
FIG. 16 is a view illustrating a cross-sectional configuration of the multilayer capacitor according to the third example.
Figure 17:
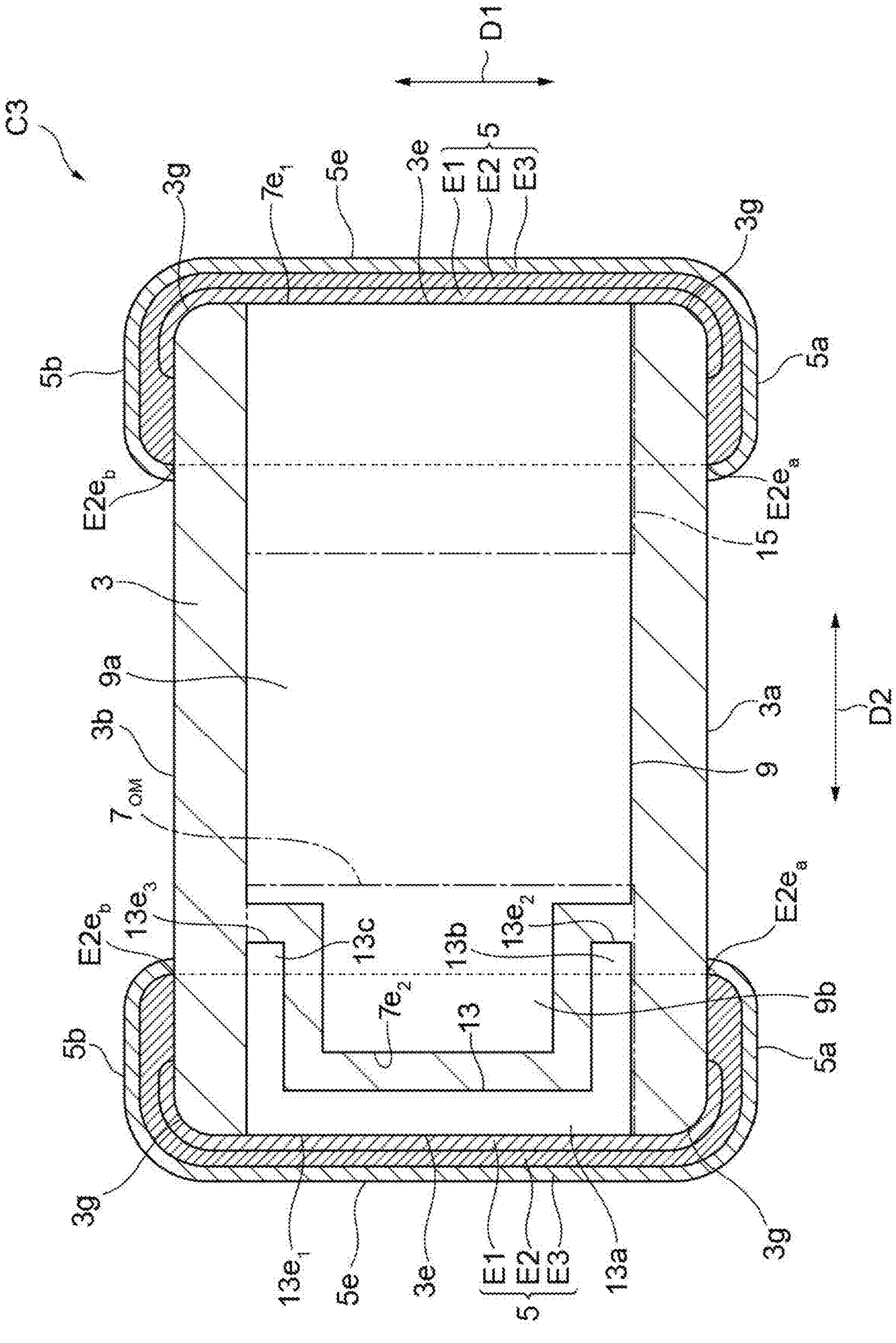
FIG. 17 is a view illustrating a cross-sectional configuration of the multilayer capacitor according to the third example.

A configuration of a multilayer capacitor C3 according to the third example will be described with reference to FIGS. 15 to 17. FIG. 15 is a perspective view of a multilayer capacitor according to the third example. FIGS. 16 and 17 are views illustrating a cross-sectional configuration of the multilayer capacitor according to the third example. The multilayer capacitor C3 is generally similar to or the same as the above-described multilayer capacitors C1 and C2. However, the multilayer capacitor C3 is different from the above-described multilayer capacitors C1 and C2 in a configuration of the external electrodes 5. Hereinafter, differences between the multilayer capacitors C1 and C2 and the multilayer capacitor C3 will be mainly described.

Also in the third example, an electronic component includes, for example, the multilayer capacitor C3.

In FIG. 16, the lengths $L1_1$, $L1_2$, $L1_3$, $L1_4$, $L1_5$, $L1_6$, and $L1_7$, the distances $L_{7a1}$, $L_{7a2}$, $L_{7b1}$, $L_{7b2}$, $L_{11a1}$, and $L_{11b1}$, and the widths $W_{7a}$, $W_{7b}$, $W_{11a}$, $W_{11b}$, and $W_{11c}$ illustrated in FIGS. 2, 7, and 10 are omitted. The lengths $L1_1$, $L1_2$, $L1_3$, $L1_4$, $L1_5$, $L1_6$, and $L1_7$, the distances $L_{7a1}$, $L_{7a2}$, $L_{7b1}$, $L_{7b2}$, $L_{11a1}$, and $L_{11b1}$, and the widths $W_{7a}$, $W_{7b}$, $W_{11a}$, $W_{11b}$, and $W_{11c}$ are defined in the same manner as in the first example, the modified example of the first example, and the second example.

In FIG. 17, the lengths $L2_1$, $L2_2$, $L2_3$, $L2_4$, $L2_5$, $L2_6$, and $L2_7$, the distances $L_{9a1}$, $L_{9a2}$, $L_{9b1}$, $L_{9b2}$, $L_{13a1}$, and $L_{13b1}$, and the widths $W_{9a}$, $W_{9b}$, $W_{13a}$, $W_{13b}$, and $W_{13c}$ illustrated in FIGS. 3, 8, and 11 are omitted. The lengths $L2_1$, $L2_2$, $L2_3$, $L2_4$, $L2_5$, $L2_6$, and $L2_7$, the distances $L_{9a1}$, $L_{9a2}$, $L_{9b1}$, $L_{9b2}$, $L_{13a1}$, and $L_{13b1}$, and the widths $W_{9a}$, $W_{9b}$, $W_{13a}$, $W_{13b}$, and $W_{13c}$ are defined in the same manner as in the first example, the modified example of the first example, and the second example.

As with the multilayer capacitors C1 and C2, the multilayer capacitor C3 includes the element body 3 of a rectangular parallelepiped shape, the plurality of external electrodes 5, the plurality of internal electrodes 7, the plurality of internal electrodes 9, the plurality of auxiliary internal electrodes 11, the plurality of auxiliary internal electrodes 13, and the plurality of conductors 15 and 17. In the multilayer capacitor C2, the main surface 3*a* or the main surface 3*b* is arranged to constitute a mounting surface.

The external electrode 5 includes the plurality of electrode portions 5*a*, 5*b*, 5*c*, and 5*e*. Each of the electrode portions 5*a*, 5*b*, 5*c*, and 5*e* includes the first electrode layer E1, the second electrode layer E2, and the third electrode layer E3.

The second electrode layer E2 of the electrode portion 5*c* is disposed both on the first electrode layer E1 and the side surface 3*c*. In the electrode portion 5*c*, the second electrode layer E2 is formed on the first electrode layer E1 to cover the first electrode layer E1 of the electrode portion 5*c*, and is formed on the side surface 3*c* to cover a part of the side surface 3*c*. In the electrode portion 5*c*, the second electrode layer E2 is in contact with the above-described part of the side surface 3*c*, and is in contact with substantially the entire first electrode layer E1. The first electrode layer E1 of the electrode portion 5*c* is entirely covered with the second electrode layer E2. The first electrode layer E1 of the electrode portion 5*c* does not include a region exposed from the second electrode layer E2.

The second electrode layer E2 of the electrode portion 5*e* is disposed on the first electrode layer E1. In the electrode portion 5*e*, the second electrode layer E2 is formed on the first electrode layer E1 to cover the first electrode layer E1 of the electrode portion 5*e*. In the electrode portion 5*e*, the second electrode layer E2 is in contact with substantially the entire first electrode layer E1. The first electrode layer 5*e* of the electrode portion E1 is entirely covered with the second electrode layer E2. The first electrode layer E1 of the electrode portion 5*e* does not include a region exposed from the second electrode layer E2.

Also in the multilayer capacitor C3, the electrode portion 11*b* is positioned between the second electrode layer E2 of the electrode portions 5*a* and the internal electrode 7 that are not electrically connected to each other. The electrode portion 11*c* is positioned between the second electrode layer E2 of the electrode portions 5*b* and the internal electrode 7 that are not electrically connected to each other. The electrode portion 13*b* is positioned between the second electrode layer E2 of the electrode portions 5*a* and the internal electrode 9 that are not electrically connected to each other. The electrode portion 11*c* is positioned between the second electrode layer E2 of the electrode portions 5*b* and the internal electrode 9 that are not electrically connected to each other.

Therefore, as with the multilayer capacitors C1 and C2, the multilayer capacitor C3 reduces occurrence of migration.

Fourth Example

Figure 18:
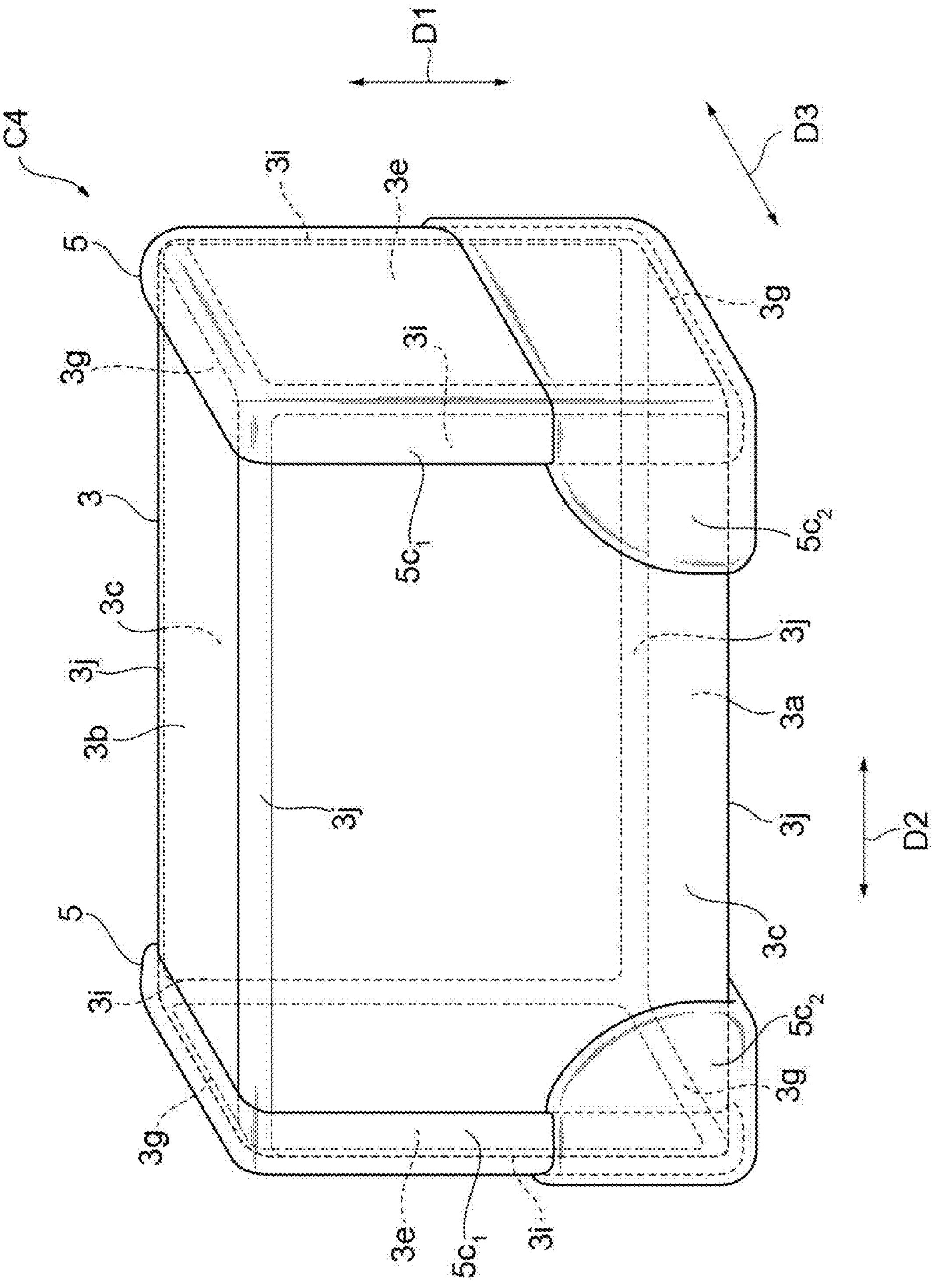
FIG. 18 is a perspective view of a multilayer capacitor according to a fourth example.
Figure 19:
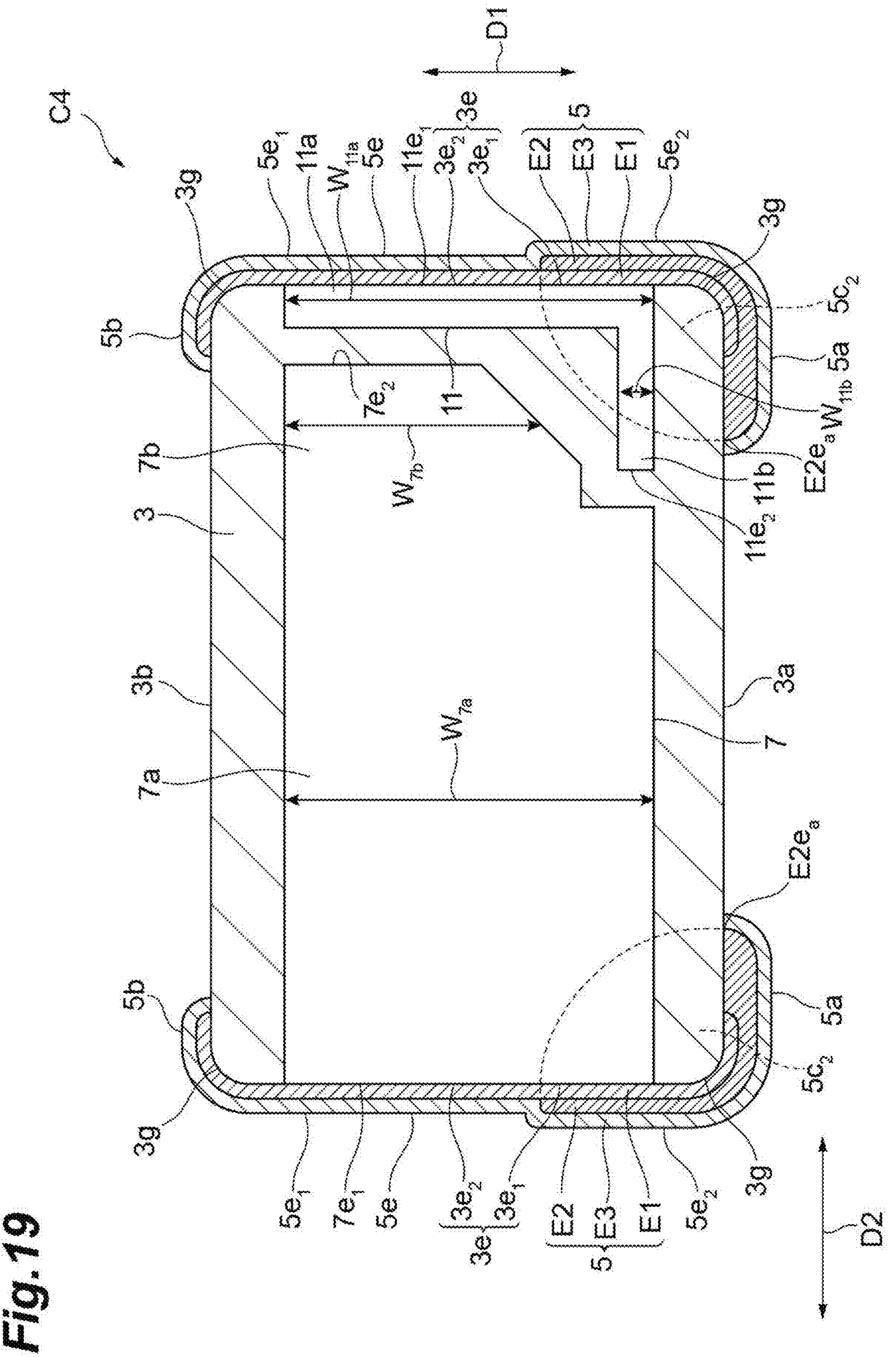
FIG. 19 is a view illustrating a cross-sectional configuration of the multilayer capacitor according to the fourth example.
Figure 20:
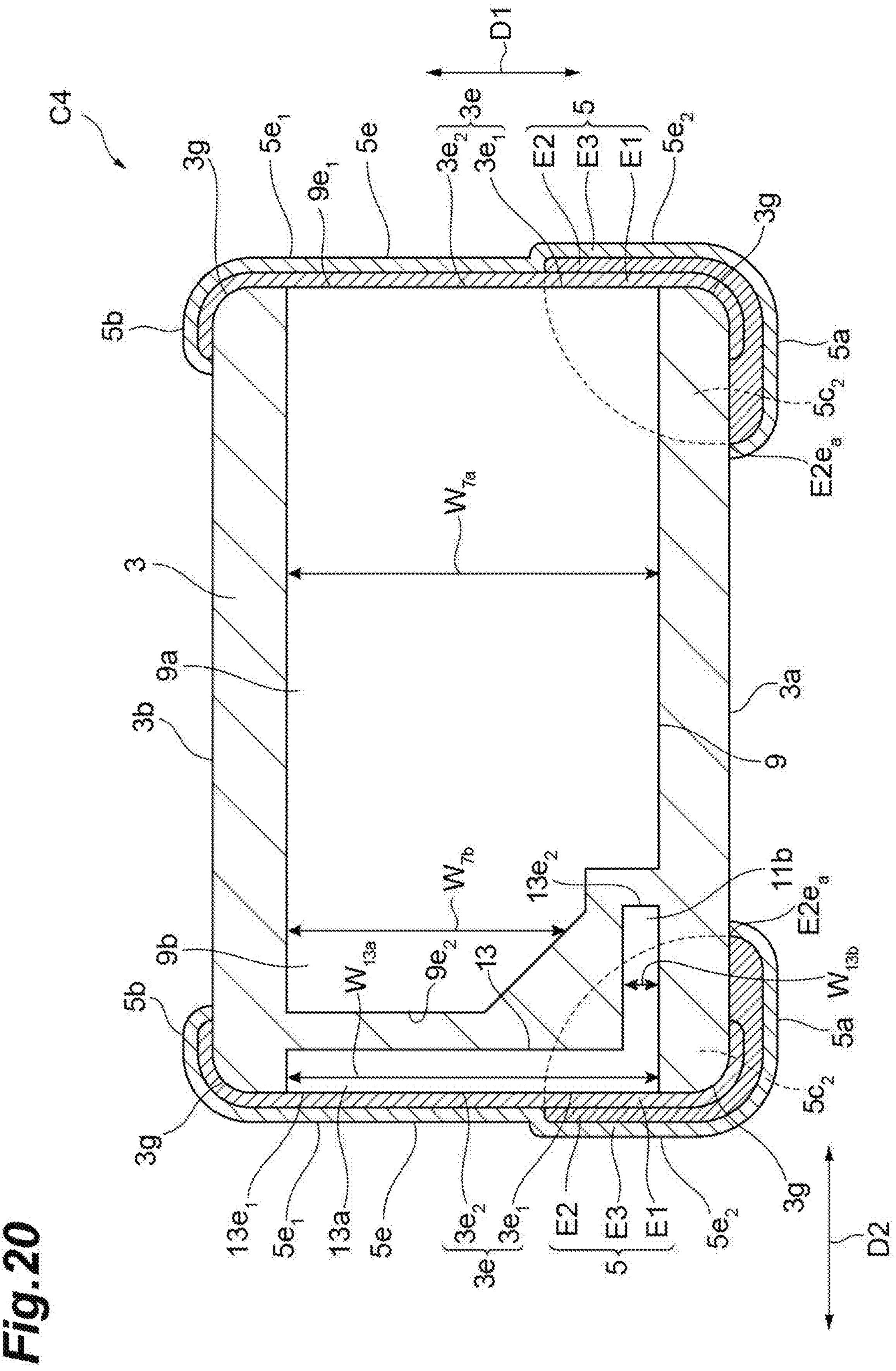
FIG. 20 is a view illustrating a cross-sectional configuration of the multilayer capacitor according to the fourth example.
Figure 21:
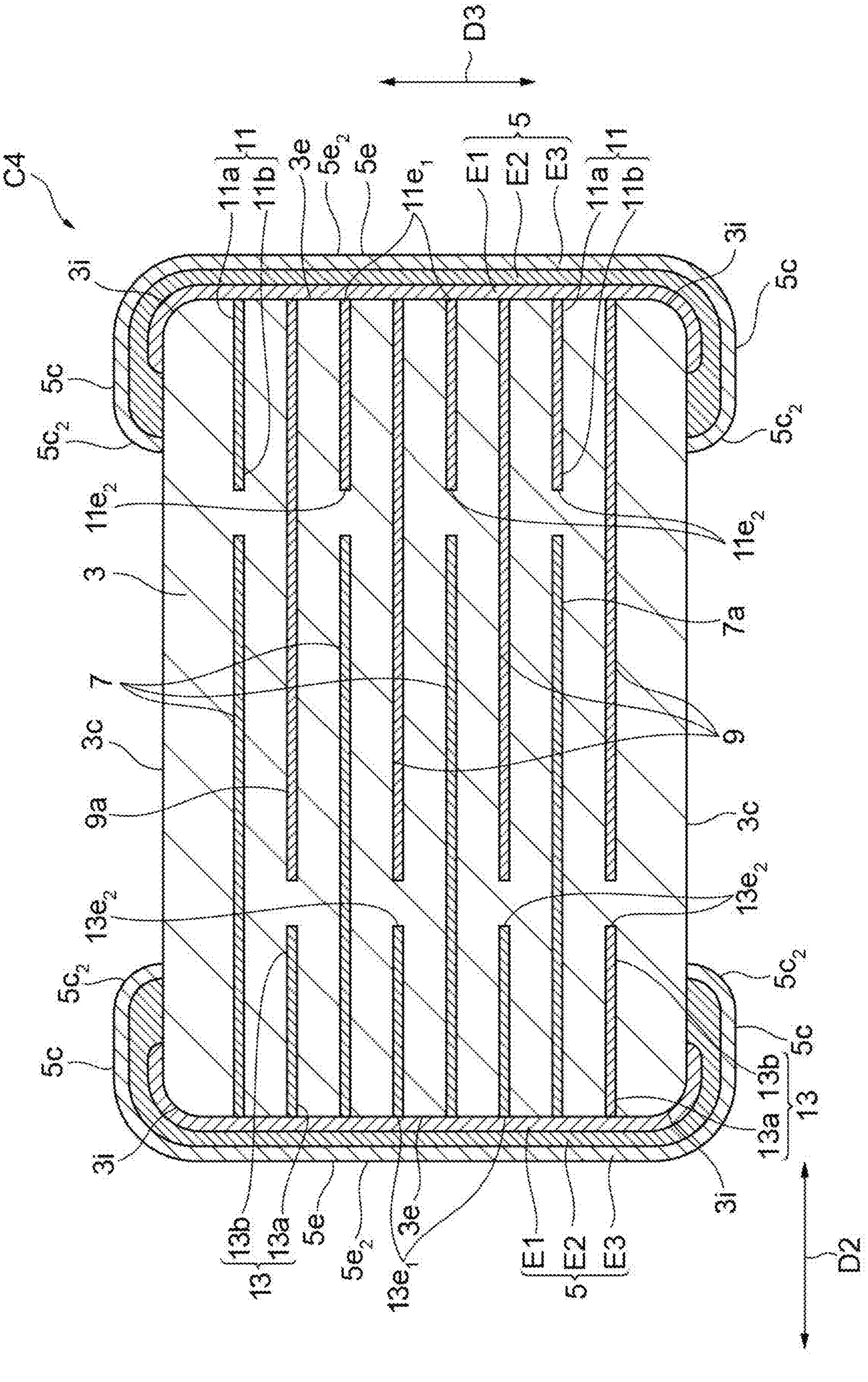
FIG. 21 is a view illustrating a cross-sectional configuration of the multilayer capacitor according to the fourth example.

A configuration of a multilayer capacitor Ca according to the fourth example will be described with reference to FIGS. 18 to 21. FIG. 18 is a perspective view of a multilayer capacitor according to the fourth example. FIGS. 19, 20, and 21 are views illustrating a cross-sectional configuration of the multilayer capacitor according to the fourth example. The multilayer capacitor C4 is generally similar to or the same as the above-described multilayer capacitor C1. However, the multilayer capacitor C4 is different from the above-described multilayer capacitor C1 in a configuration of the external electrodes 5 and the internal electrodes 7 and 9. Hereinafter, differences between the multilayer capacitor C1 and the multilayer capacitor C4 will be mainly described.

Also in the third example, an electronic component includes, for example, the multilayer capacitor C4.

In FIG. 19, the lengths $L1_1$, $L1_2$, $L1_3$, $L1_4$, and $L1_5$ and the distances $L_{7a1}$, $L_{7a2}$, $L_{7b1}$, $L_{7b2}$, and $L_{11a1}$ illustrated in FIG. 2 are omitted. The lengths $L1_1$, $L1_2$, $L1_3$, $L1_4$, and $L1_5$ and the distances $L_{7a1}$, $L_{7a2}$, $L_{7b1}$, $L_{7b2}$, and $L_{11a1}$ are defined in the same manner as in the above-described first example.

In FIG. 20, the lengths $L2_1$, $L2_2$, $L2_3$, $L2_4$, and $L2_5$ and the distances $L_{9a1}$, $L_{9a2}$, $L_{9b1}$, $L_{9b2}$, and $L_{13a1}$ illustrated in FIG. 3 are omitted. The lengths $L2_1$, $L2_2$, $L2_3$, $L2_4$, and $L2_5$ and the distances $L_{9a1}$, $L_{9a2}$, $L_{9b1}$, $L_{9b2}$, and $L_{13a1}$ are defined in the same manner as in the above-described first example.

The multilayer capacitor C4 includes the element body 3 of a rectangular parallelepiped shape, the plurality of external electrodes 5, the plurality of internal electrodes 7, the plurality of internal electrodes 9, the plurality of auxiliary internal electrodes 11, and the plurality of auxiliary internal electrodes 13. The multilayer capacitor C4 does not include the plurality of conductors 15 and 17.

A width of the region 502 in the second direction D2 decreases with an increase in distance from the main surface 3*a* (electrode portion 5*a*). A width of the region $5c_2$ in the first direction D1 decreases with an increase in distance from the end surface 3*e* (electrode portion 5*e*). For example, an end edge of the region 502 has an approximately arc shape when viewed from the third direction D3. The region $5c_2$ has an approximately fan shape when viewed from the third direction D3.

As illustrated in FIGS. 19 and 20, a width of the second electrode layer E2 in the second direction D2 decreases with an increase in distance from the main surface 3*a*. A width of the second electrode layer E2 in the first direction D1 decreases with an increase in distance from the end surface 3*e*. For example, the second electrode layer E2 included in the region $5c_2$ has an approximately fan shape when viewed from the third direction D3. The region $5c_2$ is positioned on the side surface 3*c*. The second electrode layer E2 included in the region 502 may have a substantially rectangular shape when viewed from the third direction D3.

The internal electrode 7 does not overlap the second electrode layer E2 that is included in the region $5c_2$ and is not electrically connected to the internal electrode 7 when viewed from the third direction D3. The electrode portion 7*a* does not overlap the second electrode layer E2 that is included in the region 502 and is not electrically connected to the internal electrode 7 when viewed from the third direction D3. The width $W_{7b}$ decreases with a decrease in distance to the end surface 3*e* to which the auxiliary internal electrode 11 is exposed.

The internal electrode 9 does not overlap the second electrode layer E2 that is included in the region $5c_2$ and is not electrically connected to the internal electrode 9 when viewed from the third direction D3. The electrode portion 9*a* does not overlap the second electrode layer E2 that is included in the region 502 and is not electrically connected to the internal electrode 9 when viewed from the third direction D3. The width $W_{9b}$ decreases with a decrease in distance to the end surface 3*e* to which the auxiliary internal electrode 13 is exposed.

Also in the multilayer capacitor C4, the electrode portion 11*b* is positioned between the second electrode layer E2 of the electrode portions 5*a* and the internal electrode 7 that are not electrically connected to each other. The electrode portion 13*b* is positioned between the second electrode layer E2 of the electrode portions 5*a* and the internal electrode 9 that are not electrically connected to each other.

Therefore, as with the multilayer capacitor C1, the multilayer capacitor C4 reduces occurrence of migration.

In the multilayer capacitor C4, the internal electrode 7 and the second electrode layer E2 included in the region $5c_2$ that are not electrically connected to each other do not overlap each other when viewed from the third direction D3. Therefore, electric field tends not to be generated between the internal electrode 7 and the second electrode layer E2 included in the region $5c_2$ that are not electrically connected to each other.

In the multilayer capacitor C4, the internal electrode 9 and the second electrode layer E2 included in the region $5c_2$ that are not electrically connected to each other do not overlap each other when viewed from the third direction D3. Therefore, electric field tends not to be generated between the internal electrode 9 and the second electrode layer E2 included in the region $5c_2$ that are not electrically connected to each other.

Consequently, the multilayer capacitor C4 reduces the occurrence of migration even in a configuration in which the external electrode 5 includes the second electrode layer E2 in the electrode portion 5*c*.

Figure 22:
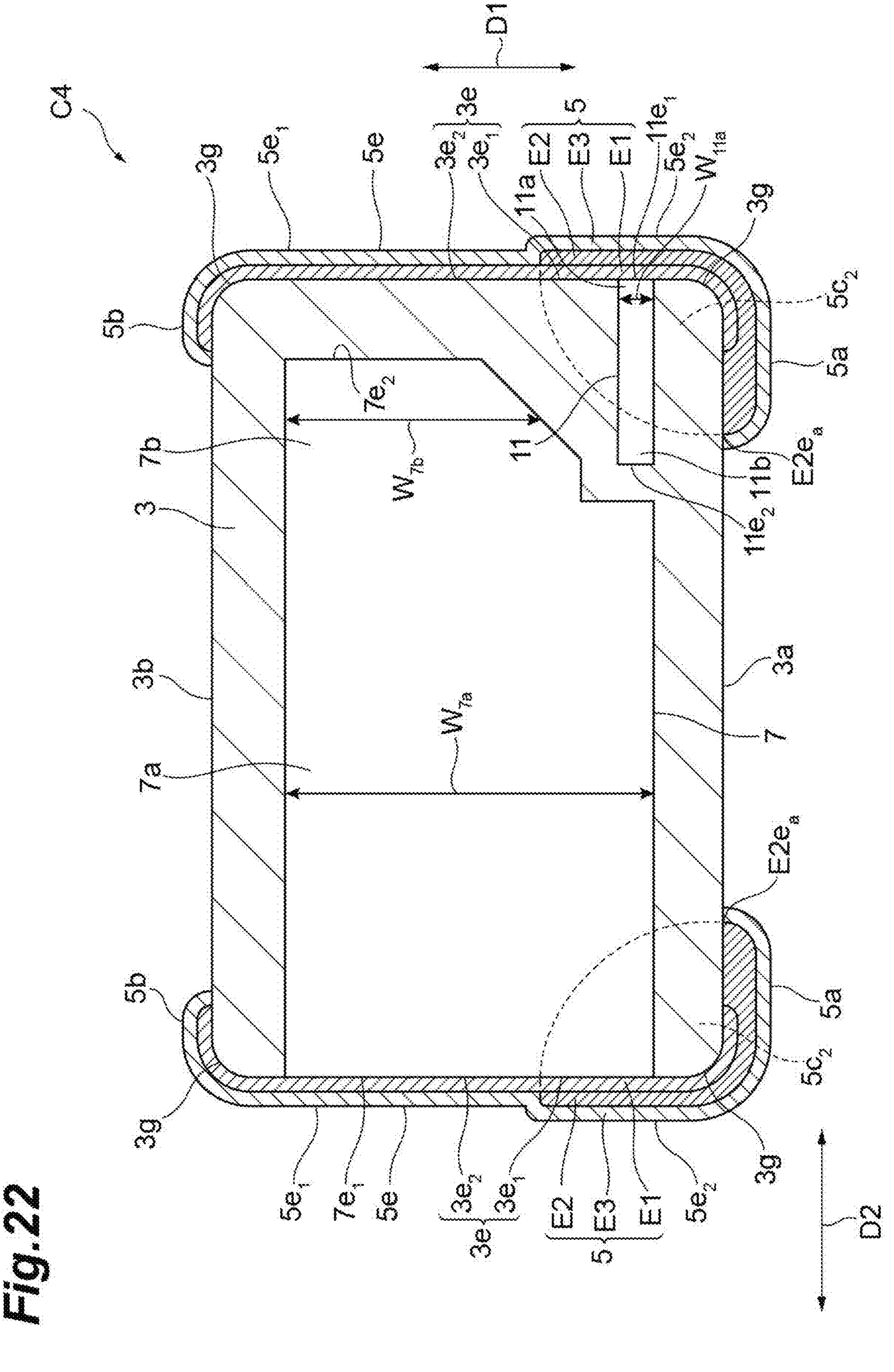
FIG. 22 is a view illustrating a cross-sectional configuration of a multilayer capacitor according to a modified example of the fourth example.
Figure 23:
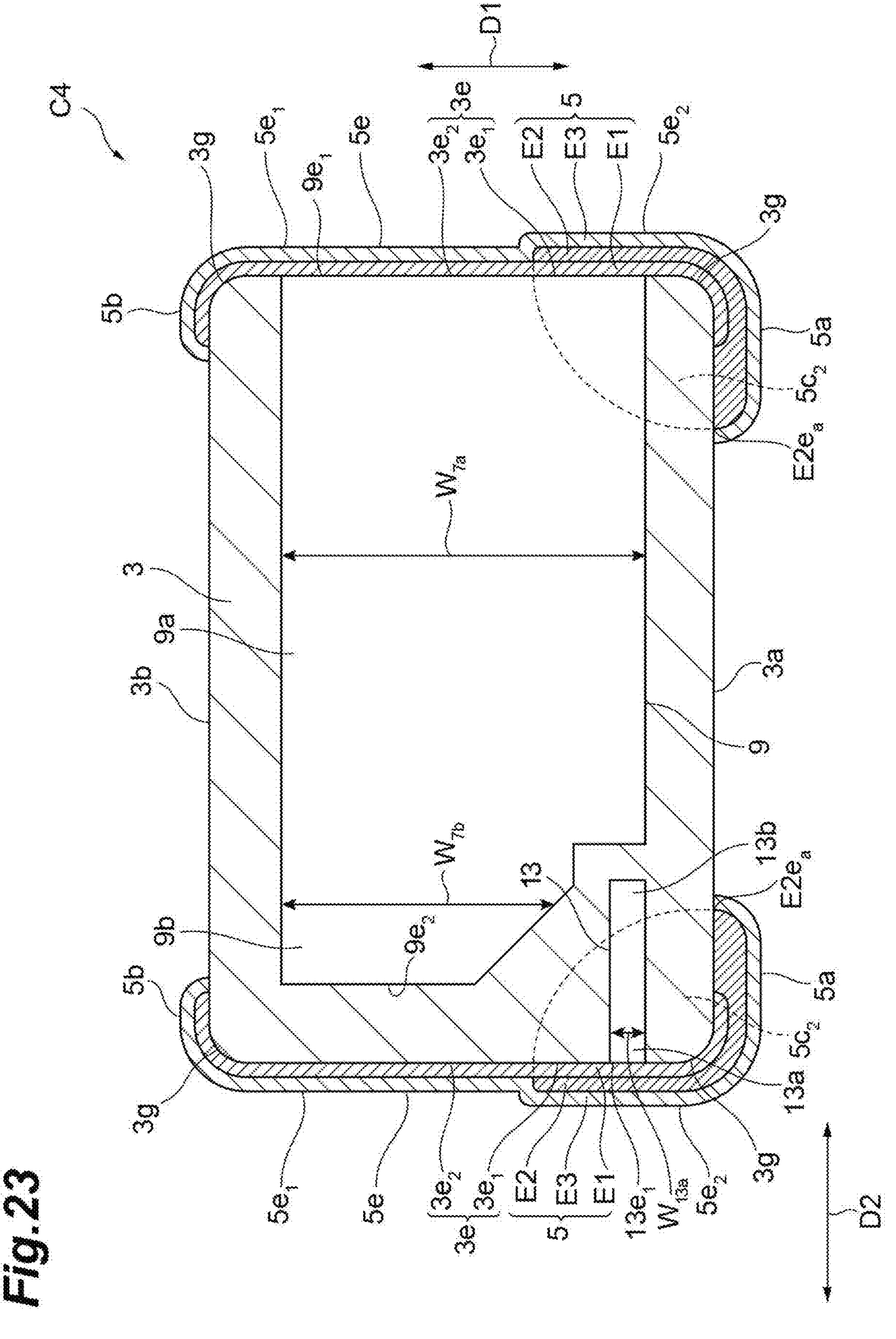
FIG. 23 is a view illustrating a cross-sectional configuration of the multilayer capacitor according to the modified example of the fourth example.
Figure 24:
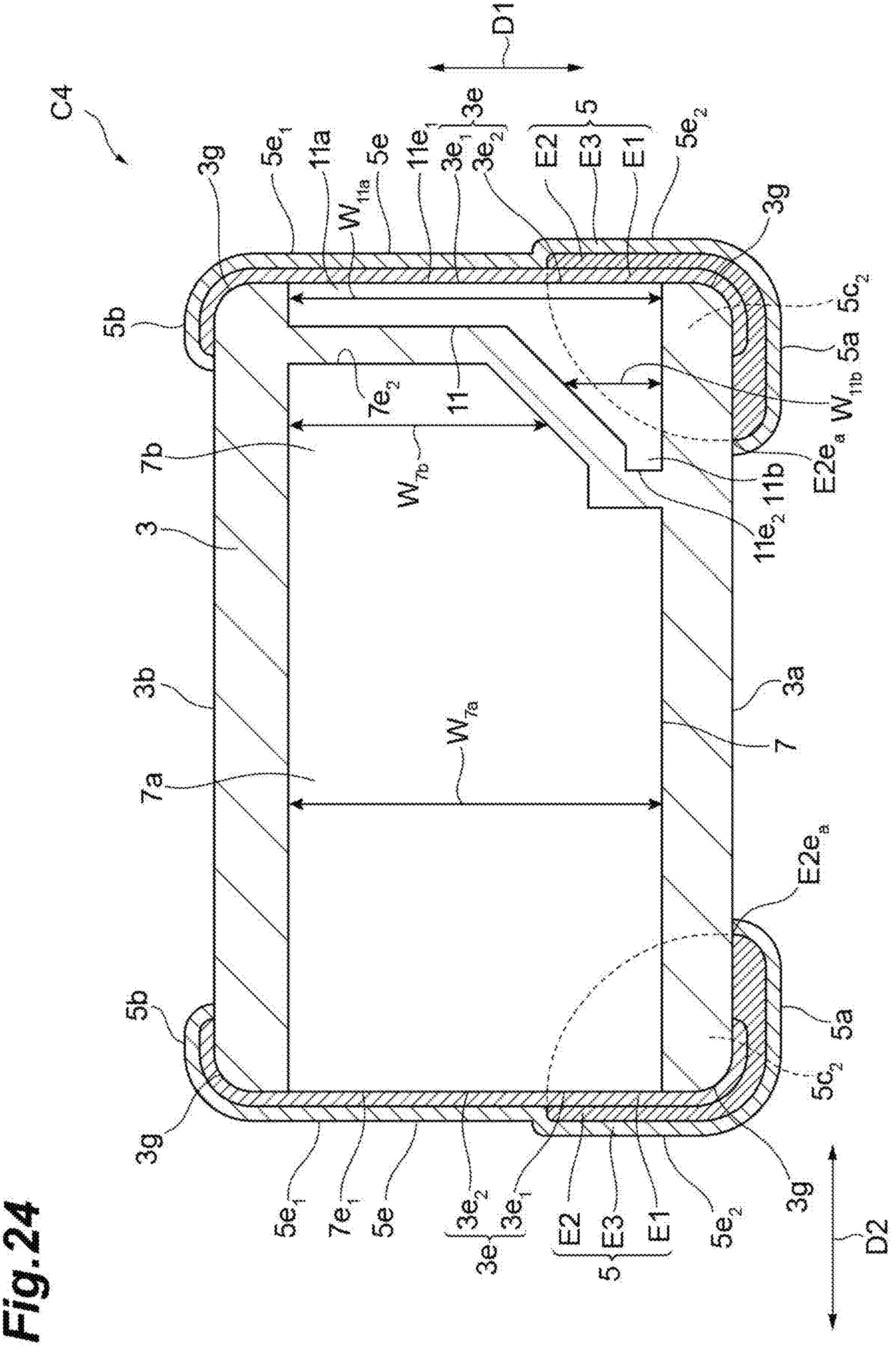
FIG. 24 is a view illustrating a cross-sectional configuration of a multilayer capacitor according to a modified example of the fourth example.
Figure 25:
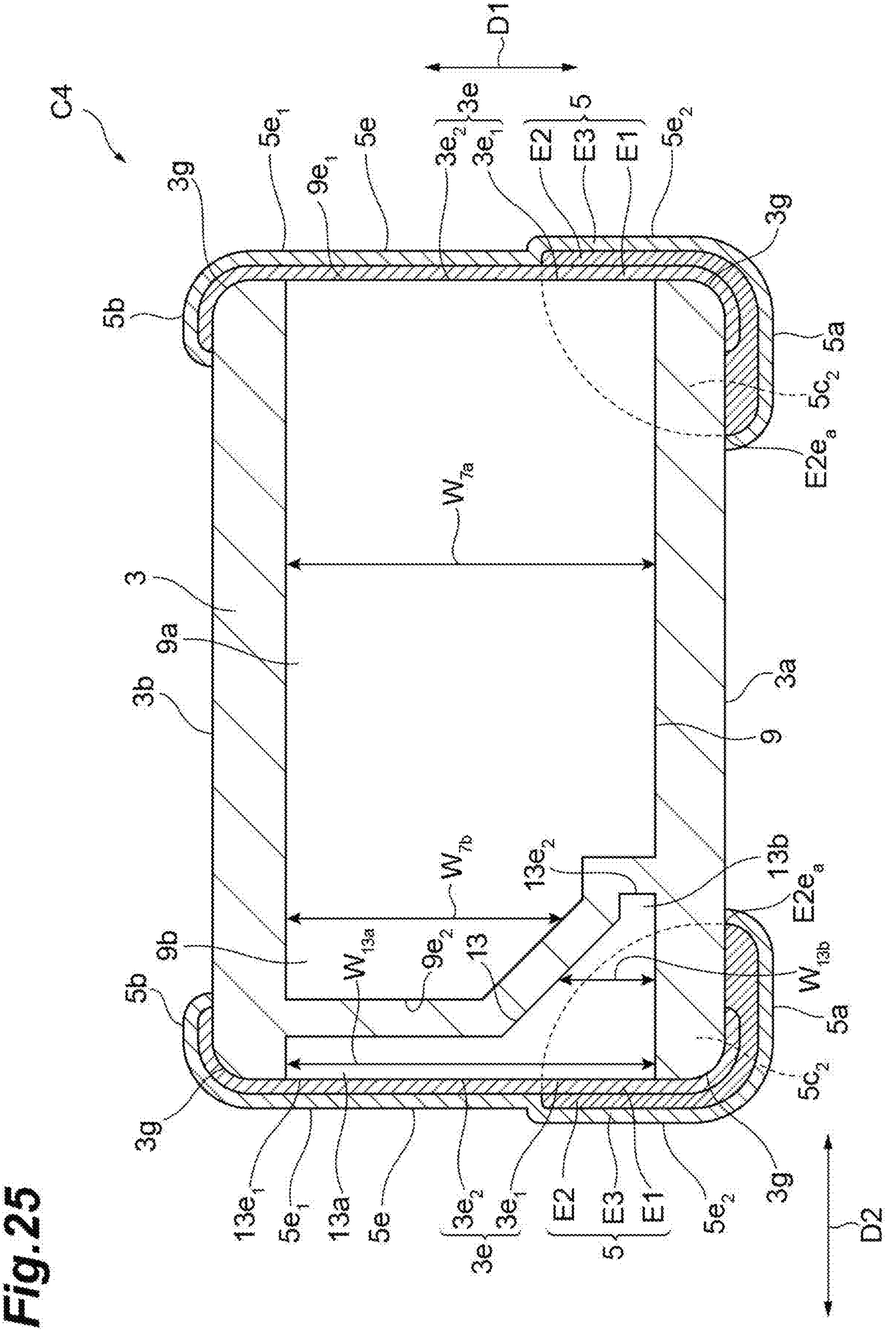
FIG. 25 is a view illustrating a cross-sectional configuration of the multilayer capacitor according to the modified example of the fourth example.
Figure 26:
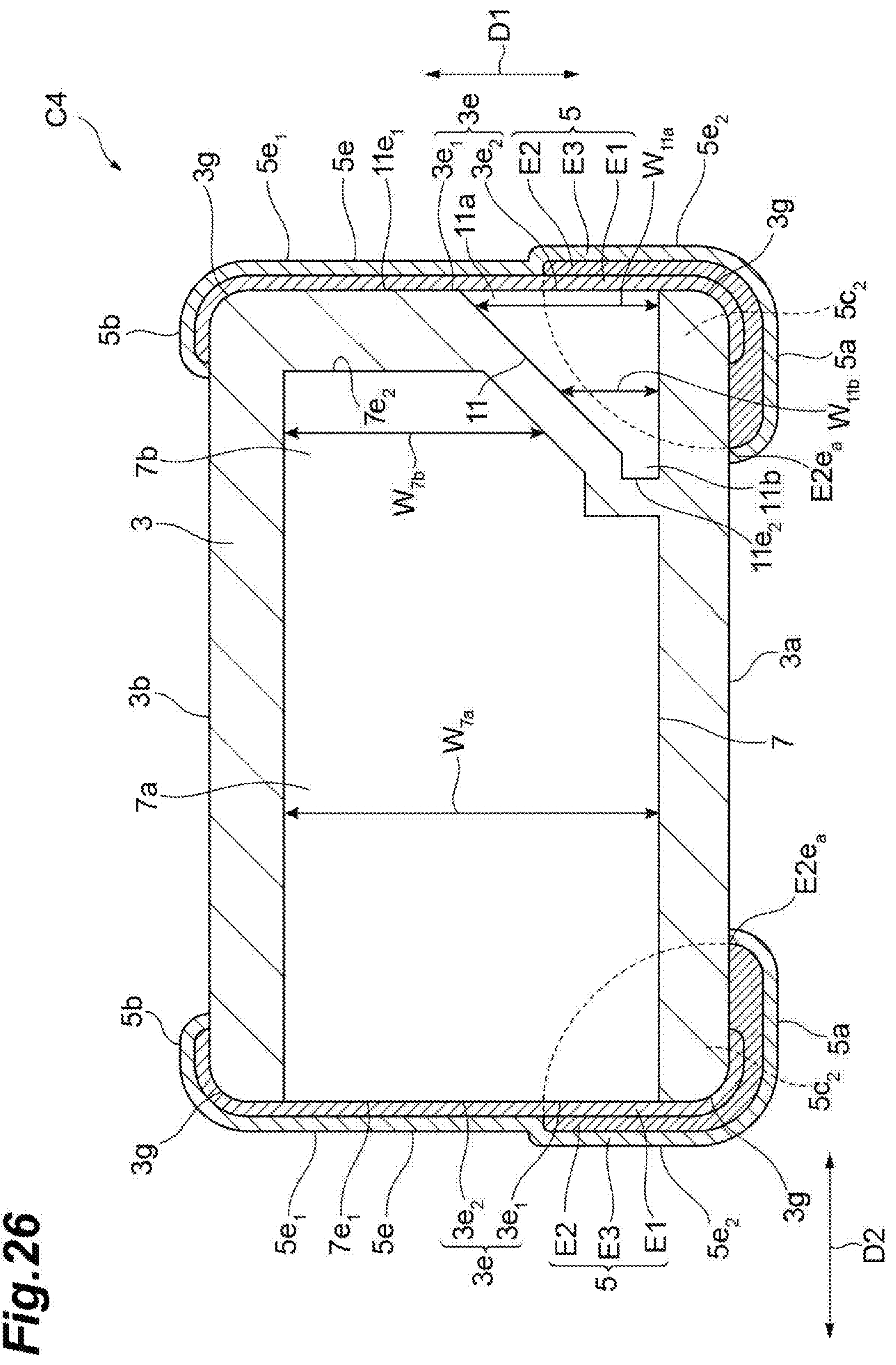
FIG. 26 is a view illustrating a cross-sectional configuration of a multilayer capacitor according to a modified example of the fourth example.
Figure 27:
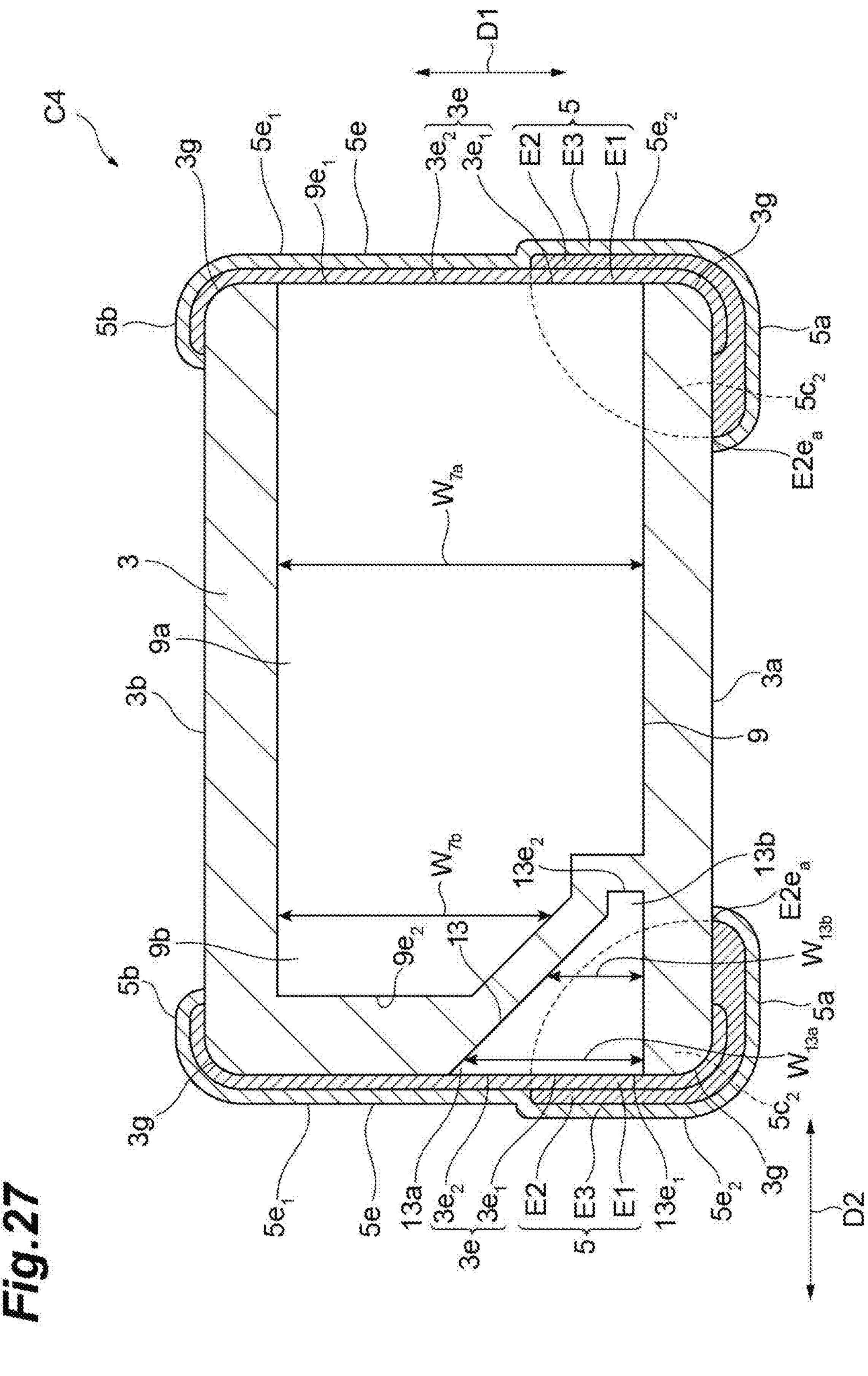
FIG. 27 is a view illustrating a cross-sectional configuration of the multilayer capacitor according to the modified example of the fourth example.

Next, a configuration of multilayer capacitors according to a plurality of modified examples of the fourth example will be described with reference to FIGS. 22 to 27. FIGS. 22 and 23 are views illustrating a cross-sectional configuration of a multilayer capacitor according to one modified example of the fourth example. FIGS. 24 and 25 are views illustrating a cross-sectional configuration of a multilayer capacitor according to another modified example of the fourth example. FIGS. 26 and 27 are views illustrating a cross-sectional configuration of a multilayer capacitor according to still another modified example of the fourth example. The multilayer capacitor according to each modified example of the fourth example is generally similar to or the same as the multilayer capacitor C4. However, the multilayer capacitor according to each modified example of the fourth example is different from the multilayer capacitor C4 in a configuration of the auxiliary internal electrodes 11 and 13. Hereinafter, differences between the multilayer capacitor according to each modified example of the fourth example and the multilayer capacitor C4 will be mainly described.

In one modified example of the fourth example, as illustrated in FIG. 22, the auxiliary internal electrode 11 has a substantially rectangular shape. The width $W_{11a}$ is substantially equal to the width $W_{11b}$. The electrode portion 11*a* is exposed to the end surface 3*e* with the width $W_{11a}$ substantially equal to the width $W_{11b}$ of the electrode portion 11*b*. As illustrated in FIG. 23, the auxiliary internal electrode 13 has a substantially rectangular shape. The width $W_{13a}$ is substantially equal to the width $W_{13b}$. The electrode portion 13*a* is exposed to the end surface 3*e* with the width $W_{13a}$ substantially equal to the width $W_{13b}$ of the electrode portion 13*b*. Also in this modified example, the width $W_{11a}$ may be substantially equal to the width $W_{11b}$, and the width $W_{13a}$ may be substantially equal to the width $W_{13b}$.

In another modified example of the fourth example, as illustrated in FIG. 24, the width $W_{11b}$ decreases with a decrease in distance to the electrode portion 11*a*. As illustrated in FIG. 25, the width $W_{13b}$ decreases with a decrease in distance to the electrode portion 13*a*. Also in this modified example, the width $W_{11a}$ may be substantially equal to the width $W_{11b}$, and the width $W_{13a}$ may be substantially equal to the width $W_{13b}$.

In still another modified example of the fourth example, as illustrated in FIG. 26, the width $W_{11b}$ decreases with a decrease in distance to the electrode portion 11*a*, and the width $W_{11a}$ decreases with a decrease in distance to the end surface 3*e* to which the electrode portion 11*a* is exposed. As illustrated in FIG. 27, the width $W_{13b}$ decreases with a decrease in distance to the electrode portion 13*a*, and the width $W_{13a}$ decreases with a decrease in distance to the end surface 3*e* to which the electrode portion 13*a* is exposed.

Fifth Example

Figure 28:
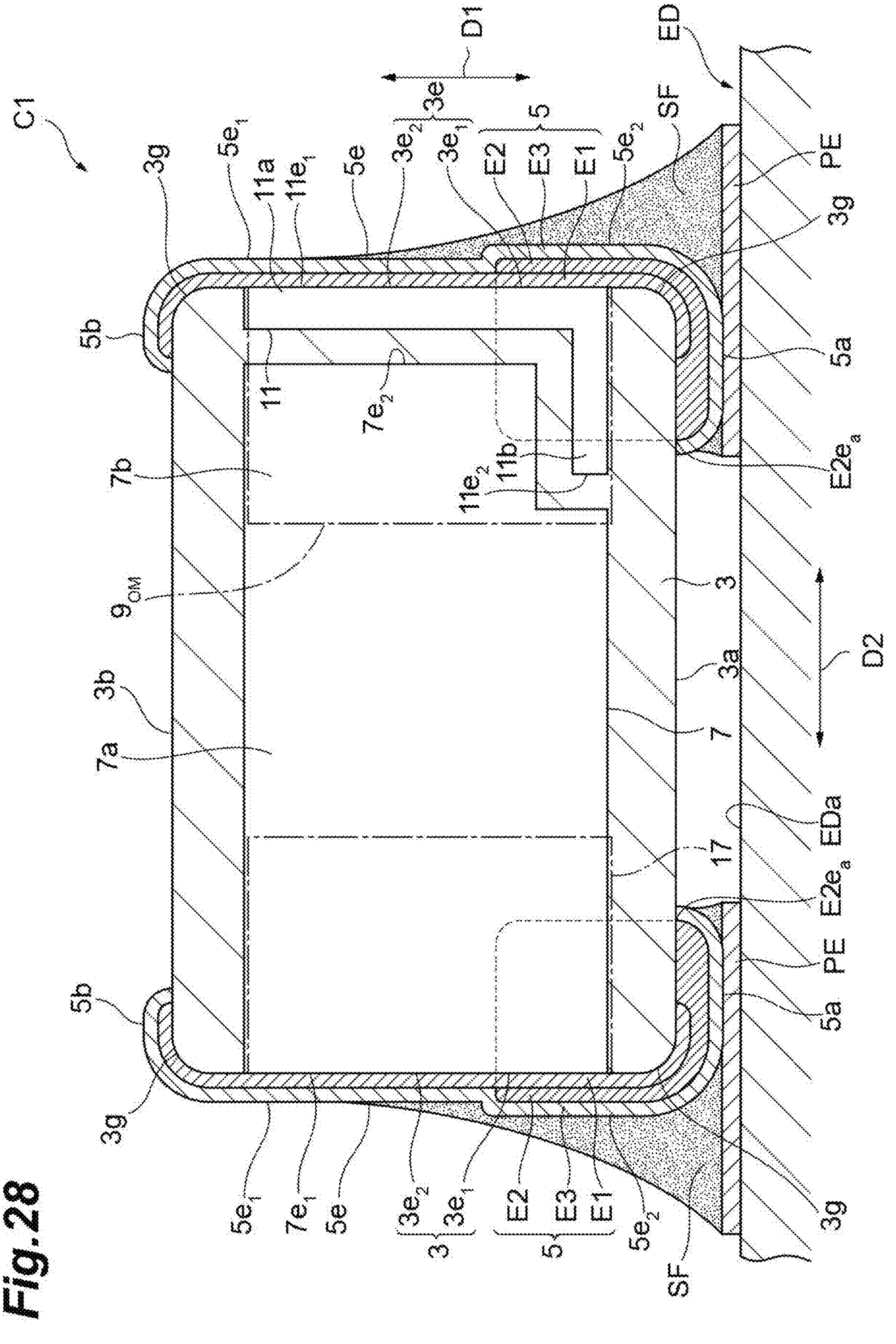
FIG. 28 is a view illustrating a cross-sectional configuration of an electronic component device according to a fifth example.

An electronic component device according to the fifth example will be described with reference to FIG. 28. FIG. 28 is a view illustrating a cross-sectional configuration of an electronic component device according to a fifth example.

The electronic component device includes the multilayer capacitor C1 and an electronic device ED. The electronic device ED includes, for example, a circuit board or an electronic component. The multilayer capacitor C1 is solder-mounted on the electronic device ED. The electronic device ED includes a main surface EDa and two pad electrodes PE. Each pad electrode PE is disposed on the main surface EDa. The two pad electrodes PE are separated from each other. The multilayer capacitor C1 is disposed on the electronic device ED in such a manner that the main surface 3*a* and the main surface EDa oppose each other.

In solder-mounting the multilayer capacitor C1, the molten solder wets the external electrode 5 (third electrode layer E3). Solidification of the wet solder causes a solder fillet SF to be formed on the external electrode 5. The external electrodes 5 and the pad electrodes PE that correspond to each other are connected to each other through the solder fillet SF.

The electronic component device may include the multilayer capacitor C2, the multilayer capacitor C3, or the multilayer capacitor C4 instead of the multilayer capacitor C1.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being positioned on another element, the element may be directly positioned on the other element or be indirectly positioned on the other element. In a case where an element is indirectly positioned on another element, an intervening element is present between the element and the other element. In a case where an element is directly positioned on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

It is to be understood that not all aspects, advantages and features described herein may necessarily be achieved by, or included in, any one particular example. Indeed, having described and illustrated various examples herein, it should be apparent that other examples may be modified in arrangement and detail.

In the modified example of the first example as well as the second and third examples, the auxiliary internal electrode 11 may include a plurality of electrode portions 11*a* separated from each other in the first direction D1. That is, the auxiliary internal electrode 11 may include an electrode portion 11*a* continuous with the electrode portion 11*b* and an electrode portion 11*a* continuous with the electrode portion 11*c*.

In the present examples and modified examples, the electronic component includes the multilayer capacitor. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, a multilayer solid-state battery component, or a multilayer composite component, or electronic components other than the multilayer electronic components.

The invention claimed is:

1. An electronic component, comprising:

an element body of a rectangular parallelepiped shape including a first main surface arranged to constitute a mounting surface, a second main surface opposing the first main surface in a first direction, a pair of end surfaces opposing each other in a second direction, and a pair of side surfaces opposing each other in a third direction;

a plurality of external electrodes disposed on both ends of the element body in the second direction;

a plurality of internal electrodes disposed in the element body to be distributed in the third direction and each electrically connected to a corresponding external electrode of the plurality of external electrodes; and a plurality of auxiliary internal electrodes each disposed in the same layer as a corresponding internal electrode of the plurality of internal electrodes and each electrically connected to the external electrode to which the corresponding internal electrode is not electrically connected, wherein each of the plurality of external electrodes includes a conductive resin layer positioned on the first main surface and a sintered metal layer disposed on the element body, and each of the plurality of auxiliary internal electrodes includes:

a first electrode portion exposed to a corresponding end surface of the pair of end surfaces and electrically and physically connected to the external electrode to which the corresponding internal electrode is not electrically connected; and a second electrode portion positioned between the conductive resin layer included in the external electrode to which the corresponding internal electrode is not electrically connected and the corresponding internal electrode, each of the plurality of auxiliary internal electrodes being in direct contact with the sintered metal layer included in the external electrode electrically connected to the auxiliary internal electrode.

2. The electronic component according to claim 1, wherein the first electrode portion is exposed to the corresponding end surface with a width larger than a width of the second electrode portion.

3. The electronic component according to claim 1, wherein each of the plurality of internal electrodes includes:

a third electrode portion including a first end exposed to a corresponding end surface of the pair of end surfaces, the third electrode portion having a first width and being separated from the first main surface by a first distance; and a fourth electrode portion including a second end positioned in the element body and opposing the first end in the second direction, the fourth electrode portion having a second width smaller than the first width and being separated from the first main surface by a second distance larger than the first distance, and the second electrode portion is positioned between the conductive resin layer included in the external electrode to which the corresponding internal electrode is not electrically connected and the fourth electrode portion.

4. The electronic component according to claim 3, wherein each of the plurality of external electrodes further includes a conductive resin layer positioned on the second main surface, the third electrode portion is separated from the second main surface by a third distance, the fourth electrode portion is separated from the second main surface by a fourth distance larger than the third distance, and each of the plurality of auxiliary internal electrodes further includes an electrode portion positioned between the conductive resin layer on the second main surface included in the external electrode to which the corresponding internal electrode is not electrically connected and the fourth electrode portion.

5. The electronic component according to claim 1, wherein the conductive resin layer includes an end edge positioned on the first main surface, the second electrode portion includes an end opposing an end included in the first electrode portion and exposed to the corresponding end surface in the second direction, and with a plane including the corresponding end surface as a reference plane, the auxiliary internal electrode and the conductive resin layer that are electrically connected to each other have a relationship in which a length from the reference plane to the end included in the second electrode portion is larger than a length from the reference plane to the end edge included in the conductive resin layer.

6. The electronic component according to claim 1, wherein when the auxiliary internal electrode and the conductive resin layer that are electrically connected to each other are viewed from a direction orthogonal to the first main surface, the second electrode portion includes a portion exposed from the conductive resin layer.

7. The electronic component according to claim 1, wherein with a plane including the corresponding end surface to which the auxiliary internal electrode is exposed as a reference plane, the internal electrode and the auxiliary internal electrode that are disposed in the same layer have a relationship in which a length of the auxiliary internal electrode from the reference plane is larger than a length from the reference plane to the internal electrode.

8. The electronic component according to claim 1, wherein the conductive resin layer includes an end edge positioned on the first main surface, and with a plane including the end surface to which the internal electrode is exposed as a reference plane, the internal electrode and the conductive resin layer that are not electrically connected to each other have a relationship in which a length of the internal electrode from the reference plane is larger than a length from the reference plane to the end edge included in the conductive resin layer.

9. The electronic component according to claim 1, wherein each of the plurality of external electrodes further includes a conductive resin layer positioned on the side surface, the plurality of internal electrodes includes an outermost internal electrode adjacent to the conductive resin layer on the side surface in the third direction and electrically connected to the conductive resin layer on the side surface, and the conductive resin layer on the side surface not electrically connected to the outermost internal electrode and the outermost internal electrode do not overlap each other when viewed from a direction orthogonal to the side surface.

10. The electronic component according to claim 1, wherein each of the plurality of external electrodes further includes a conductive resin layer positioned on the side surface, and the conductive resin layer on the side surface and the internal electrode that are not electrically connected to each other do not overlap each other when viewed from a direction orthogonal to the side surface.

11. The electronic component according to claim 1, wherein each of the plurality of external electrodes further includes a conductive resin layer positioned on the end surface, and when the conductive resin layer on the end surface and the end surface are viewed from a direction orthogonal to the end surface, the end surface includes:

a first region covered with the conductive resin layer on the end surface; and a second region exposed from the conductive resin layer on the end surface and closer to the second main surface than the first region.

12. The electronic component according to claim 1, wherein the conductive resin layer includes a plurality of silver particles.

13. The electronic component according to claim 1, wherein the sintered metal layer is at least partially covered with the conductive resin layer, and the conductive resin layer positioned on the first main surface includes a portion not covering the sintered metal layer.

14. The electronic component according to claim 4, wherein the sintered metal layer is at least partially covered with the conductive resin layer, and the conductive resin layer positioned on the second main surface includes a portion not covering the sintered metal layer.

15. The electronic component according to claim 9, wherein the sintered metal layer is at least partially covered with the conductive resin layer, and the conductive resin layer positioned on the side surface includes a portion not covering the sintered metal layer.

16. The electronic component according to claim 10, wherein the sintered metal layer is at least partially covered with the conductive resin layer, and the conductive resin layer positioned on the side surface includes a portion not covering the sintered metal layer.

17. The electronic component according to claim 11, wherein the sintered metal layer is at least partially covered with the conductive resin layer, and the sintered metal layer includes a portion covered with the conductive resin layer and a portion exposed from the conductive resin layer, on the end surface.

18. The electronic component according to claim 1, wherein each of the plurality of external electrodes includes a plating layer including an outermost layer of the external electrode.

19. The electronic component according to claim 1, wherein the second portion is separated from the first main surface.

* * * * *